(12) United States Patent
Chen et al.

(10) Patent No.: US 11,182,070 B2
(45) Date of Patent: *Nov. 23, 2021

(54) METHOD FOR DISPLAYING GRAPHICAL USER INTERFACE BASED ON GESTURE AND ELECTRONIC DEVICE

(71) Applicant: Huawei Technologies Co., Ltd., Shenzhen (CN)

(72) Inventors: Xi Chen, Shenzhen (CN); Xuefeng Li, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/990,656

(22) Filed: Aug. 11, 2020

(65) Prior Publication Data

US 2021/0026528 A1      Jan. 28, 2021

Related U.S. Application Data

(63) Continuation of application No. 16/479,799, filed as application No. PCT/CN2017/077756 on Mar. 22, 2017, now Pat. No. 10,768,808.

(30) Foreign Application Priority Data

Jan. 22, 2017   (CN) .......................... 201710053987.7

(51) Int. Cl.
G06F 3/041      (2006.01)
G06F 3/0488     (2013.01)
(Continued)

(52) U.S. Cl.
CPC .... *G06F 3/04883* (2013.01); *H04M 1/72454* (2021.01); *G06F 3/0482* (2013.01); *G06F 3/04817* (2013.01); *H04M 2201/42* (2013.01)

(58) Field of Classification Search
CPC .. G06F 3/04883; G06F 3/0481; G06F 3/0482; G06F 3/0485; G06F 3/04817; H04M 1/72454; H04M 2201/42
See application file for complete search history.

(56) References Cited

U.S. PATENT DOCUMENTS

| 5,969,706 A | 10/1999 | Tanimoto et al. |
| 8,537,180 B1 | 9/2013 | Grieve |

(Continued)

FOREIGN PATENT DOCUMENTS

| CN | 103858084 A | 6/2014 |
| CN | 104182117 A | 12/2014 |

(Continued)

*Primary Examiner* — Vijay Shankar
(74) *Attorney, Agent, or Firm* — Conley Rose, P.C.

(57) ABSTRACT

A method for displaying a graphical user interface (GUI) based on a gesture includes displaying a first GUI on the touchscreen, where the first GUI includes two or more entries, and the entry includes at least two interface elements; receiving, by the electronic device, a first gesture of a user on the touchscreen; and displaying a second GUI on the touchscreen in response to the first gesture, where the second GUI includes two or more entries, and the entry includes at least one interface element, where a quantity of entries in the second GUI is greater than a quantity of entries in the first GUI, and a quantity of interface elements in the second GUI is less than a quantity of interface elements in the first GUI.

20 Claims, 50 Drawing Sheets

(51) Int. Cl.
*H04M 1/72454* (2021.01)
*G06F 3/0481* (2013.01)
*G06F 3/0482* (2013.01)

(56) References Cited

U.S. PATENT DOCUMENTS

| | | | |
|---|---|---|---|
| 8,930,855 | B2 | 1/2015 | Yuan et al. |
| 9,626,077 | B2 | 4/2017 | Lan et al. |
| 9,704,230 | B2 | 7/2017 | Hofmann et al. |
| 9,983,664 | B2 | 5/2018 | Kim et al. |
| 10,768,808 | B2 * | 9/2020 | Chen .................. G06F 3/04883 |
| 2010/0134425 | A1 | 6/2010 | Storrusten |
| 2010/0192108 | A1 | 7/2010 | Liu et al. |
| 2010/0283743 | A1 | 11/2010 | Coddington |
| 2013/0036382 | A1 | 2/2013 | Yuan et al. |
| 2013/0036383 | A1 | 2/2013 | Yuan et al. |
| 2013/0120295 | A1 | 5/2013 | Kim et al. |
| 2013/0268875 | A1 | 10/2013 | Han et al. |
| 2013/0342443 | A1 | 12/2013 | Huang et al. |
| 2015/0074567 | A1 | 3/2015 | Lan et al. |
| 2015/0077357 | A1 | 3/2015 | Han |
| 2015/0109337 | A1 | 4/2015 | Hofmann et al. |
| 2016/0179355 | A1 | 6/2016 | K S |
| 2016/0283089 | A1 | 9/2016 | Han et al. |
| 2018/0285977 | A1 | 10/2018 | Cleary et al. |

FOREIGN PATENT DOCUMENTS

| | | | |
|---|---|---|---|
| CN | 104216616 | A | 12/2014 |
| CN | 104423830 | A | 3/2015 |
| CN | 105357451 | A | 2/2016 |
| CN | 105549837 | A | 5/2016 |

\* cited by examiner

METHOD FOR DISPLAYING GRAPHICAL USER INTERFACE BASED ON GESTURE AND ELECTRONIC DEVICE

CROSS-REFERENCE TO RELATED APPLICATIONS

This application is a continuation of U.S. patent application Ser. No. 16/479,799, filed on Jul. 22, 2019, which is a national stage of International Application No. PCT/CN2017/077756, filed on Mar. 22, 2017, which claims priority to Chinese Patent Application No. 201710053987.7, filed on Jan. 22, 2017. All of the aforementioned applications are hereby incorporated by reference in their entireties.

TECHNICAL FIELD

This application relates to the user interaction field, and in particular, to a method for displaying a graphical user interface based on a gesture and an electronic device.

BACKGROUND

Currently, a screen of an electronic device (for example, a mobile phone or a tablet computer) is becoming larger, more content such as a news list, a contact list, an image, and a song list is displayed on the screen, and many entries are displayed. If a user wants to find content of interest, it is quite inconvenient to flick through the list up and down, and the user needs to perform flicking a plurality of times with hand on a screen to find the content of interest. For example, if the content that is of interest to the user is on a $75^{th}$ line, and the screen of the electronic device displays seven lines each time, the user can view the content only after flicking through the list 11 times. Operation steps performed in the electronic device in this process are quite cumbersome, thereby greatly reducing a capability of intelligent interaction between the electronic device and the user and causing low efficiency of the electronic device.

SUMMARY

To resolve the foregoing technical problem, embodiments of this application provide a method for displaying a graphical user interface based on a gesture and an electronic device, so that the electronic device can automatically display a related entry based on a gesture of a user, thereby greatly improving a capability of intelligent interaction between the electronic device and the user.

According to a first aspect, an embodiment of this application provides a method for displaying a graphical user interface (GUI for short) based on a gesture, and the method may be implemented in an electronic device including a touchscreen. The method may include the following steps:

displaying a first GUI of an application (App for short) on the touchscreen, where $K_1$ entries are displayed in the first GUI, $M_1$ interface elements are displayed in each entry, $K_1$ is a natural number and $K_1 \geq 2$, and is a natural number and $M_1 \geq 2$;

receiving, by the electronic device, a first gesture of a user on the touchscreen; and displaying a second GUI of the application on the touchscreen in response to the first gesture, where $K_2$ entries are displayed in the second GUI, $M_2$ interface elements are displayed in each entry, $K_2$ is a natural number and $K_2 \geq 2$, and $M_2$ is a natural number and $M_2 \geq 1$; where $K_2 > K_1$ and $M_2 \leq M_1$, to be specific, a quantity of entries displayed in the second GUI is greater than a quantity of entries displayed in the first GUI, and a quantity of interface elements displayed in each entry in the second GUI is less than or equal to a quantity of interface elements displayed in each entry in the first GUI.

In the foregoing technical solution, the electronic device may increase a quantity of entries displayed on the touchscreen when receiving the first gesture (for example, a quick slide gesture) of the user, so that the user of the electronic device can quickly locate related content (for example, an entry) in a process of quickly searching for content, and can perform a subsequent touch operation on an entry (and an interface element of the entry) displayed in the second GUI. Therefore, the foregoing embodiment describes a quite flexible method for displaying a graphical user interface, and a capability of intelligent interaction between the electronic device and the user is greatly improved.

In a possible implementation, the method may further include: receiving, by the electronic device, a second gesture of the user on the touchscreen; and displaying a third GUI of the application on the touchscreen in response to the second gesture, where $K_3$ entries are displayed in the third GUI, $M_3$ interface elements are displayed in each entry, $K_3$ is a natural number and $K_3 \geq 2$, and $M_3$ is a natural number and $M_3 \geq 2$; where a. $K_3 < K_2$ and $M_3 \geq M_2$, or $K_3 < K_1$ and $M_3 \geq M_1$, to be specific, the quantity $K_3$ of entries displayed in the third GUI may be less than the quantity $K_2$ of entries displayed in the second GUI, and the quantity $M_3$ of interface elements displayed in the third GUI may be greater than or equal to the quantity $M_2$ of interface elements displayed in the second GUI; or the quantity $K_3$ of entries displayed in the third GUI may be less than the quantity $K_1$ of entries displayed in the first GUI, and the quantity $M_3$ of interface elements displayed in the third GUI may be greater than or equal to the quantity $M_1$ of interface elements displayed in the first GUI.

In the foregoing technical solution, the electronic device may reduce a quantity of entries displayed on the touchscreen when receiving the second gesture (for example, a slow slide gesture) of the user, so that the user of the electronic device can carefully search for content (for example, an entry). Therefore, compared with the first GUI and the second GUI, in the third GUI, fewer entries are displayed on the touchscreen based on the second gesture, but more interface elements are displayed in each entry. Such a graphical user interface helps the user slowly and carefully search for a related entry, so that the user can carefully search for a required entry by using more interface elements. In this way, a capability of intelligent interaction between the electronic device and the user is further improved.

In a possible implementation, all the entries in the first GUI have a same display size $S_1$, and $S_1 > 0$. The first GUI may be an initial home page of the application, for example, an initial home page of a Contacts App or an initial home page of an Email App. Because all the entries have a same display size, the entries displayed in the first GUI can be identified uniformly, so that the user can perform a quick search.

In a possible implementation, all the entries in the second GUI have a same display size $S_2$, $S_2 > 0$, and $S_2 < S_1$. To be specific, the size of the entry displayed in the second GUI is less than the size of the entry displayed in the first GUI. In other words, based on the first gesture, more entries are displayed in the second GUI, and the size of each entry is smaller, so that the electronic device can display more entries and therefore the user can perform a quick search.

In a possible implementation, all the entries in the third GUI have a same display size $S_3$, $S_3>0$, and $S_3>S_1$ or $S_3>S_2$. To be specific, the size of the entry displayed in the third GUI is greater than the size of the entry in the first GUI, or the size of the entry displayed in the third GUI is greater than the size of the entry displayed in the first GUI. In other words, the size of the entry in the third GUI is larger, so that the user can carefully search a plurality of entries.

In a possible implementation, the entry may be one of the following entries: a Contacts entry, an Email entry, an Instant Message entry, a Recent Calls entry, a Folder entry, a Settings entry, and an App Store entry. In addition, the entry in the first GUI, the entry in the second GUI, and the entry in the third GUI may be entries of a same type.

In a possible implementation, the interface element may be at least one of the following elements: a control, a link, an icon, a button, a text box, and a menu. It may be understood that various forms of interface elements may be displayed in the entry, so that the user can perform a specific operation on the entry, for example, make a call, or write an email.

In a possible implementation, a velocity of the first gesture may be greater than a velocity of the second gesture. This indicates that the user quickly searches for content in the case of the first gesture, and the user slowly and carefully searches for content in the case of the second gesture.

In a possible implementation, a velocity of the first gesture may be greater than a predetermined threshold, and a velocity of the second gesture may be less than the predetermined threshold.

In a possible implementation, the first gesture and the second gesture may be gestures of different types. For example, the first gesture may be a flick gesture, to be specific, a finger of the user taps a touch-sensitive surface of the touchscreen, quickly slides, and then quickly leaves the touch-sensitive surface, for example, the finger scrolls the touchscreen up and down. The second gesture may be a drag gesture, to be specific, the finger of the user taps the touch-sensitive surface, and moves slowly without leaving the touch-sensitive surface. In this implementation, the graphical user interfaces of the application may be displayed based on gestures of different types instead of velocities of the gestures. For example, the second GUI is displayed on the touchscreen in response to the first gesture (for example, a flick gesture), and the third GUI is displayed on the touchscreen in response to the second gesture (for example, a drag gesture). In this implementation, the electronic device may display different graphical user interfaces on the touchscreen based on gestures of different types, so that the user can flexibly search for related content. In a possible implementation, the application may be one of the following applications: Contacts, Gallery, Calendar, Messages, File Manager, Email, App Store, and the like.

In some other embodiments of this application, a virtual button for scrolling entries may be displayed on the touchscreen of the electronic device. In this case, the first gesture, the second gesture, and a third gesture may be gestures of touching the virtual button by the finger of the user in different touch times. For example, if a touch time is long, it indicates that the user wants to quickly scroll entries, and the electronic device displays entries on the touchscreen through quick scrolling. In the case of quick scrolling, more entries are displayed on the touchscreen, and a display size of each entry becomes smaller. For another example, if a time of touching the virtual button is short, it indicates that the user wants to slowly scroll entries, and the electronic device displays entries on the touchscreen through slow scrolling. In the case of slow scrolling, fewer entries are displayed on the touchscreen, and a display size of each entry becomes larger. In some other embodiments of this application, the electronic device may display different graphical user interfaces on the touchscreen based on a time of touching the virtual button by the finger of the user. For example, if the time of touching the virtual button by the finger of the user is longer, it indicates that the user wants to quickly scroll (or flick through) entries, so that more entries are displayed on the touchscreen, a display size of each entry is smaller, and fewer interface elements are displayed in each entry. For another example, if the time of touching the virtual button by the finger of the user is shorter, it indicates that the user wants to slowly scroll (or flick through) entries, so that fewer entries are displayed on the touchscreen, a display size of each entry is larger, and more interface elements are displayed in each entry.

According to a second aspect, an embodiment of this application provides an electronic device, including: a touchscreen including a touch-sensitive surface and a display; one or more processors; a memory; a plurality of applications; and one or more programs. The one or more programs are stored in the memory and are configured to be executed by the one or more processors, the one or more programs include an instruction, and the instruction may be used to perform various implementations in the first aspect.

It should be understood that a description of a technical feature, a technical solution, a beneficial effect, or similar language in this application does not imply that all features and advantages can be implemented in any single embodiment. On the contrary, it may be understood that a description of a feature or a beneficial effect means that at least one embodiment includes a specific technical feature, technical solution, or beneficial effect. Therefore, in this specification, a description of a technical feature, a technical solution, or a beneficial effect may not be specific to one embodiment. Further, technical features, technical solutions, or beneficial effects described in the embodiments may be combined in any proper manner. A person skilled in the art may understand that a specific embodiment may be implemented without using one or more specific technical features, technical solutions, or beneficial effects of the embodiment. In other embodiments, additional technical features and beneficial effects may also be identified in a specific embodiment that does not reflect all the embodiments.

DESCRIPTION OF EMBODIMENTS

Figure 1:
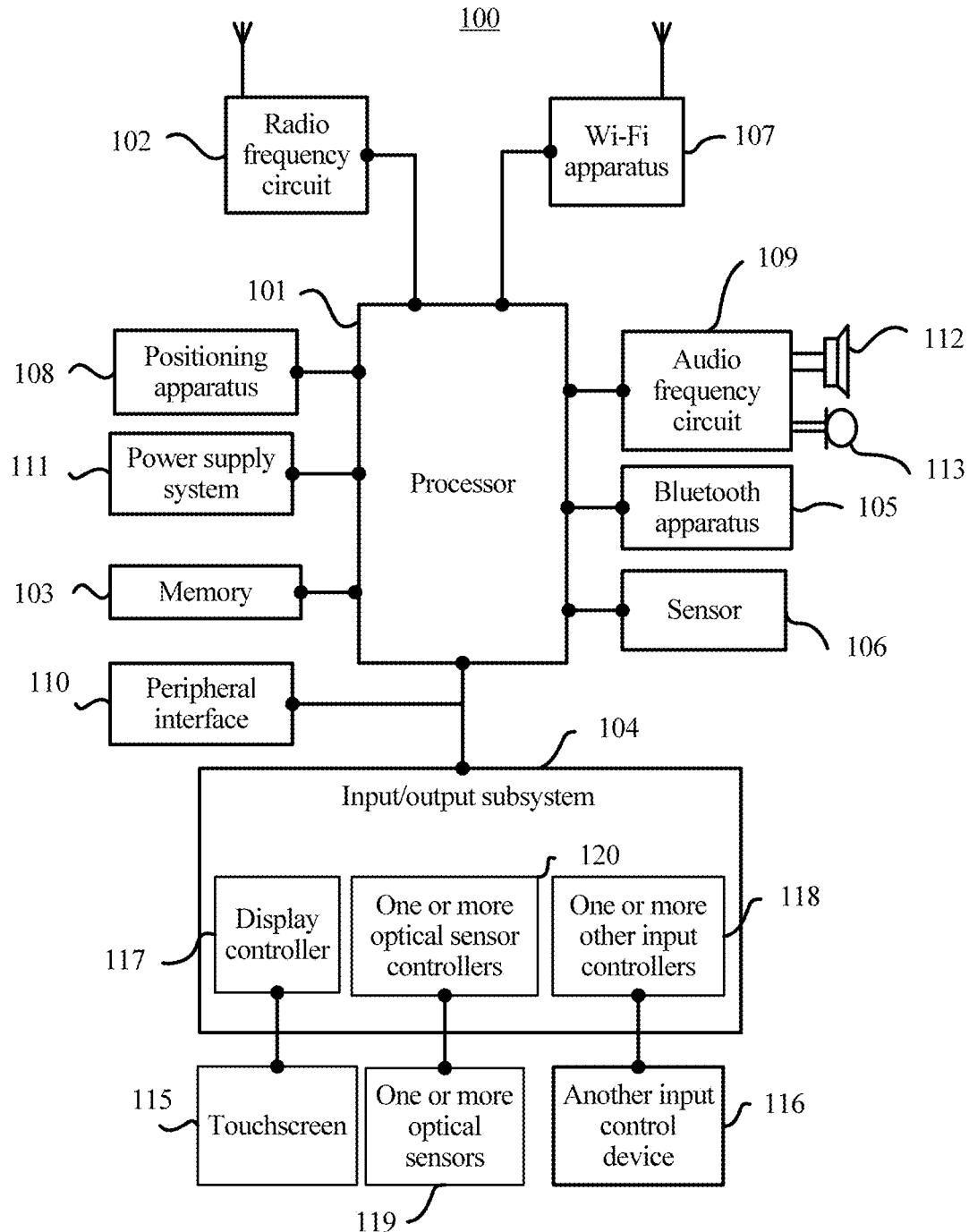
FIG. 1 is a schematic structural diagram of hardware of an electronic device according to some embodiments.

The terms used in the description of the present invention in this specification are merely for the purpose of describing specific embodiments, and are not intended to limit the present invention. The terms "one", "a", "the", and "this" of singular forms used in this specification and the appended claims of the present invention are also intended to include plural forms, unless otherwise specified in the context clearly. It should also be understood that, the term "and/or" used in this specification indicates and includes any or all possible combinations of one or more associated listed items.

An electronic device, a user interface used for such a device, and an embodiment used for an associated process in which such a device is used are described. In some embodiments, the electronic device is a portable electronic device that further includes other functions such as a personal digital assistant function and/or a music player function, for example, a mobile phone, a tablet computer, or a wearable electronic device having a wireless communication function (for example, a smartwatch). An example embodiment of the portable electronic device includes but is not limited to a portable electronic device using iOS®, Android®, Microsoft®, or another operating system. Another portable electronic device such as a laptop computer or a tablet computer including a touch-sensitive surface (for example, a touchscreen display and/or a touchpad) may be used. It should be further understood that in some embodiments, a device is not a portable electronic device, but a desktop computer including a touch-sensitive surface (for example, a touchscreen display and/or a touchpad).

An electronic device including a display and a touch-sensitive surface is described in the following discussion. However, it should be understood that the electronic device may include one or more other physical user interface devices such as a physical keyboard, a mouse, and/or a joystick.

The electronic device usually supports a plurality of applications, for example, one or more of the following: a drawing application, a word processing application, a webpage creation application, a spreadsheet application, a game application, a phone application, a video conference application, an email application, an instant message application, an exercise support application, an image management application, a gallery application, a digital video camera application, a network browsing application, a digital music player application, and/or a digital video player application.

Various applications that can be executed on the device may use at least one common physical user interface device such as a touch-sensitive surface. One or more functions of the touch-sensitive surface and corresponding information displayed on the electronic device may be displayed and/or changed from an application to a next application and/or may be displayed and/or changed in a corresponding application. In this way, a common physical architecture (for example, a touch-sensitive surface) of the electronic device can support various applications by using a user interface that is intuitive and clear to a user.

The following uses an electronic device 100 as an example to describe the embodiments of this application in detail. It should be understood that, the electronic device 100 shown in FIG. 1 is merely an example of the electronic device, and the electronic device 100 may include components more or fewer than those shown in the figure, or may include a combination of two or more components, or may include components differently arranged. Various components shown in the figure may be implemented in hardware that includes one or more signal processors and/or application-specific integrated circuits, in software, or in a combination of hardware and software. The electronic device 100 in FIG. 1 may be a mobile phone, a tablet computer, or the like.

As shown in FIG. 1, the electronic device 100 may include components such as a processor 101, a radio frequency circuit 102, a memory 103, an input/output subsystem 104, a Bluetooth apparatus 105, a sensor 106, a Wi-Fi apparatus 107, a positioning apparatus 108, an audio frequency circuit 109, a peripheral interface 110, and a power supply system 111. These components may communicate with each other by using one or more communications buses or signal cables. A person skilled in the art may understand that the hardware structure shown in FIG. 1 does not constitute a limitation on the electronic device, and the electronic device may include components more or fewer than those shown in FIG. 1, or may include a combination of some components, or may include components differently arranged.

The following describes the components of the electronic device 100 in detail with reference to FIG. 1.

The radio frequency circuit 102 may be configured to receive and send a wireless signal in an information receiving and sending process or in a call process. In particular, after receiving downlink data from a base station, the radio frequency circuit 102 sends the downlink data to the processor 101 for processing. In addition, the radio frequency circuit 102 sends uplink data to the base station. Generally, the radio frequency circuit includes but is not limited to an antenna, at least one amplifier, a transceiver, a coupler, a low noise amplifier, a duplexer, or the like. In addition, the radio frequency circuit 102 may further communicate with another device through wireless communication. Any communication standard or protocol may be used for the wireless communication, and includes but is not limited to a Global System for Mobile Communications, a general packet radio service, Code Division Multiple Access, Wideband Code Division Multiple Access, Long Term Evolution, email, a short message service message, or the like.

The memory 103 is configured to store an application, software, and data. The processor 101 performs various functions of the electronic device 100 and data processing by running the application and the data stored in the memory. The memory 103 mainly includes a program storage region and a data storage region. The program storage region may store an operating system, an application (for example, a sound playing function or an image playing function) required by at least one function, or the like. The data storage region may store data (for example, audio data, a phonebook, or a calendar event) created based on use of the electronic device 100, or the like. In addition, the memory may include a high-speed random access memory, and may further include a nonvolatile memory such as a magnetic disk storage component, a flash memory component, or another volatile solid-state storage component.

The input/output subsystem (I/O subsystem) 104 couples an input/output device of the device 100, for example, a touchscreen 115 and another input control device 116, to the processor 101. The I/O subsystem 104 may include a display controller 117 and one or more input controllers 118 that is applied to the another input control device 116. The one or more input controllers 118 receive an electrical signal from the another input control device 116/send an electrical signal to the another input control device 116. The another input control device 116 may include a physical button (for example, a push button or a rocker button), a dial pad, a slider switch, a joystick, a click wheel, and the like. In some other embodiments, the input controller 118 may (or may not) be coupled to any one of a keyboard, an infrared port, a USB port, and a pointer device such as a mouse. One or more buttons may include an up/down button used for volume control of a loudspeaker 112 and/or a microphone 113. The one or more buttons may include a push button.

The touch-sensitive display 115 provides an input interface and an output interface between the electronic device and a user. The display controller 117 receives an electrical signal from the touch-sensitive display 115 and/or sends an electrical signal to the touch-sensitive display 115. The touch-sensitive display 115 displays a visual output to the user. The visual output may include a graphic, a text, an icon, a video, and any combination thereof (collectively referred to a graphic). In some embodiments, some or all visual outputs may be corresponding to an interface element. For convenience, the touch-sensitive display 115 is sometimes referred to as a touchscreen, and the touch-sensitive display 115 may be referred to as a touch-sensitive display system, or may be referred to as a display system including a touch-sensitive surface and a display.

The touchscreen 115 has a touch-sensitive surface, a sensor, or a sensor group that receives an input from the user based on a touch sense and/or a touch-sense touch. The touchscreen 115 and the display controller 117 (together with any associated module and/or instruction set in the memory 103) detect a touch on the touchscreen 115 (and any movement or interruption of the touch), and convert the detected touch into interaction with an interface element (for example, one or more soft keys, icons, webpages, or images) displayed on the touchscreen 115. In an example embodiment, a touch point between the touchscreen 115 and the user is corresponding to a finger of the user.

The touchscreen 115 may use an LCD (liquid crystal display) technology, an LPD (light emitting polymer display) technology, or an LED (light emitting diode) technology, but another display technology may be used in another embodiment. The touchscreen 115 and the display controller 117 may detect a touch and any movement or interruption of the touch by using any one of known or a plurality of to-be-developed touch sensing technologies and another proximity sensor array or another element configured to determine one or more touch points on the touchscreen 115. The plurality of touch sensing technologies include but are not limited to capacitive, resistive, infrared, and surface acoustic wave technologies. In an example embodiment, a projected mutual-capacitance sensing technology is used.

The touchscreen 115 may have video resolution of over 100 dpi. In some embodiments, the touchscreen has video resolution of approximately 160 dpi. The user may touch the touchscreen 115 by using any appropriate object or accessory, for example, a stylus or a finger. In some embodiments, a user interface is designed to mainly work with a finger-based touch and gesture. In comparison with a stylus-based input, accuracy may be lower because a finger has a larger touch area on the touchscreen. In some embodiments, the device interprets a rough finger-based input as an accurate pointer/cursor location or command, to perform an action expected by the user.

In some embodiments of this application, the touchscreen may include a sensor group with pressure sensing.

In some other embodiments of this application, in addition to the touchscreen, the electronic device 100 may include a touchpad (not shown) configured to activate or deactivate a specific function. In some embodiments, the touchpad is a touch-sensitive region of the electronic device. Different from the touchscreen, the touch-sensitive region does not display a visual output. The touchpad may be a touch-sensitive surface separated from the touchscreen 115, or may be an extension part of the touch-sensitive surface of the touchscreen.

The electronic device 100 may further include one or more optical sensors 119. FIG. 1 shows an optical sensor 119 coupled to an optical sensor controller 120 in the I/O subsystem 104. The optical sensor 119 may include a charge-coupled device (CCD) or a complementary metal-oxide-semiconductor (CMOS) phototransistor. The optical sensor 119 receives, from an external environment, light projected by one or more lenses, and converts the light into data representing an image. The optical sensor 119 may capture a still image or a video by using a camera module 213. In some embodiments, one or more optical sensors are located at the rear of the electronic device 100, and are opposite to the touchscreen 115 in the front of the device, so that the touchscreen 115 can be used as a viewfinder for collecting a still image and/or a video image. In some embodiments, one or more other optical sensors are in the front of the device, so that the user can obtain an image of another video conference participant for a video conference while viewing the user on a touchscreen display.

The Bluetooth apparatus 105 is configured to establish a wireless connection to another electronic device (for example, a smartwatch or a tablet computer) by using a Bluetooth communication protocol, and exchange data with the another electronic device.

The electronic device 100 may further include at least one sensor 106 such as the optical sensor 119, a motion sensor, and another sensor. Specifically, the optical sensor 119 may include an ambient light sensor and a proximity sensor. The ambient light sensor may adjust luminance of a display panel of the touchscreen 115 based on brightness of ambient light. The proximity sensor may power off the display panel when the electronic device 100 moves to an ear. As a motion sensor, an accelerometer sensor may detect an acceleration value in each direction (generally, three axes), may detect a value and a direction of gravity when the accelerometer sensor is static, and may be used in an application for recognizing a posture (such as screen switching between landscape and portrait modes, a related game, or magnetometer posture calibration) of the electronic device, a function related to vibration recognition (such as a pedometer or a knock), or the like. For another sensor such as a gyroscope, a barometer, a hygrometer, a thermometer, or an infrared sensor that may be further disposed on the electronic device 100, details are not described herein.

The Wi-Fi apparatus 107 is configured to provide Wi-Fi network access for the electronic device 100. The electronic device 100 may help, by using the Wi-Fi apparatus 107, the user receive and send an email, browse a webpage, access a streaming media, and the like, to provide a wireless broadband Internet access for the user.

The positioning apparatus 108 is configured to provide geographical location information for the electronic device 100, and the geographical location information may indicate a current geographical location of the electronic device 100. It may be understood that the positioning apparatus 108 may be specifically a receiver of a positioning communications system such as the Global Positioning System, the BeiDou Navigation Satellite System, or the Russian GLONASS. After receiving the geographical location information sent by the positioning communications system, the positioning apparatus 108 sends the information to the processor 101 for further processing, or sends the information to the memory 103 for storage. In some embodiments of this application, the positioning apparatus 108 may be a receiver of the Assisted Global Positioning System (AGPS), and the AGPS is a running manner in which GPS positioning is performed with specific assistance. By using a signal of a base station together with a GPS satellite signal, the AGPS can enable a positioning speed of the electronic device 100 to be higher. In the AGPS system, the positioning apparatus 108 may obtain positioning assistance through communication with an assisted positioning server (for example, a mobile phone positioning server). As an assisted server, the AGPS system assists the positioning apparatus 108 in completing ranging and positioning services. In this case, the assisted positioning server provides positioning assistance through communication with the positioning apparatus 108 (that is, a receiver of the GPS) of the electronic device 100 by using a wireless communications network. In some other embodiments of this application, the positioning apparatus 108 may be a positioning technology based on a Wi-Fi access point. Each Wi-Fi access point has a globally unique MAC address, and the electronic device can scan and collect a broadcast signal of a surrounding Wi-Fi access point when Wi-Fi is enabled. Therefore, the electronic device can obtain a MAC address broadcast by the Wi-Fi access point. The electronic device sends such data (for example, the MAC address) that can identify the Wi-Fi access point to a location server by using the wireless communications network. The location server retrieves a geographical location of each Wi-Fi access point, calculates a geographical location of the electronic device with reference to strength of the Wi-Fi broadcast signal, and sends the geographical location of the mobile device to the positioning apparatus 108 of the mobile device.

The audio frequency circuit 109, the loudspeaker 112, and the microphone 113 may provide an audio interface between the user and the electronic device 100. The audio frequency circuit 109 may transmit, to the loudspeaker 112, an electrical signal converted from received audio data, and the loudspeaker 112 converts the electrical signal into a sound signal for output. In addition, the microphone 113 converts a collected sound signal into an electrical signal, and the audio frequency circuit 109 receives the electrical signal, converts the electrical signal into audio data, and outputs the audio data to the radio frequency circuit 102 to send the audio data to, for example, another mobile phone, or outputs the audio data to the memory 103 for further processing.

The processor 101 is a control center of the electronic device 100, connects all parts of the electronic device by using various interfaces and lines, and performs various functions of the electronic device 100 and data processing by running or executing the application stored in the memory 103 and invoking the data stored in the memory 103, to perform overall monitoring on the electronic device. In some embodiments, the processor 101 may include one or more processing units. An application processor and a modem processor may be integrated into the processor 101. The application processor mainly processes an operating system, a user interface, an application, and the like. The modem processor mainly processes wireless communication. It may be understood that alternatively, the modem processor may not be integrated into the processor 101.

The electronic device 100 may further include the power supply system 111 that supplies power to each component (which may include a power failure detection circuit, a power converter or an inverter, a power status indicator, a battery, a power supply management chip, and the like). The battery may be logically connected to the processor 101 by using the power supply management chip, to implement functions such as charging management, discharging management, and power consumption management by using the power supply system 111.

The electronic device 100 may further include the peripheral interface 110, configured to provide an interface for an external input/output device (for example, a mouse, a keyboard, an external display, or an external memory). The peripheral interface 110 may be configured to couple an input and output peripheral device of the device to the processor 101 and the memory 103. The processor 101 performs various functions of the electronic device 100 and data processing by running or executing various applications and/or instruction sets stored in the memory 103. In some embodiments, the processor 101 may include an image signal processor and a dual-core or multi-core processor.

A camera, a subscriber identity module (SIM) card slot, and the like may also be included in the electronic device 100 although they are not shown. Details are not described herein.

Figure 2:
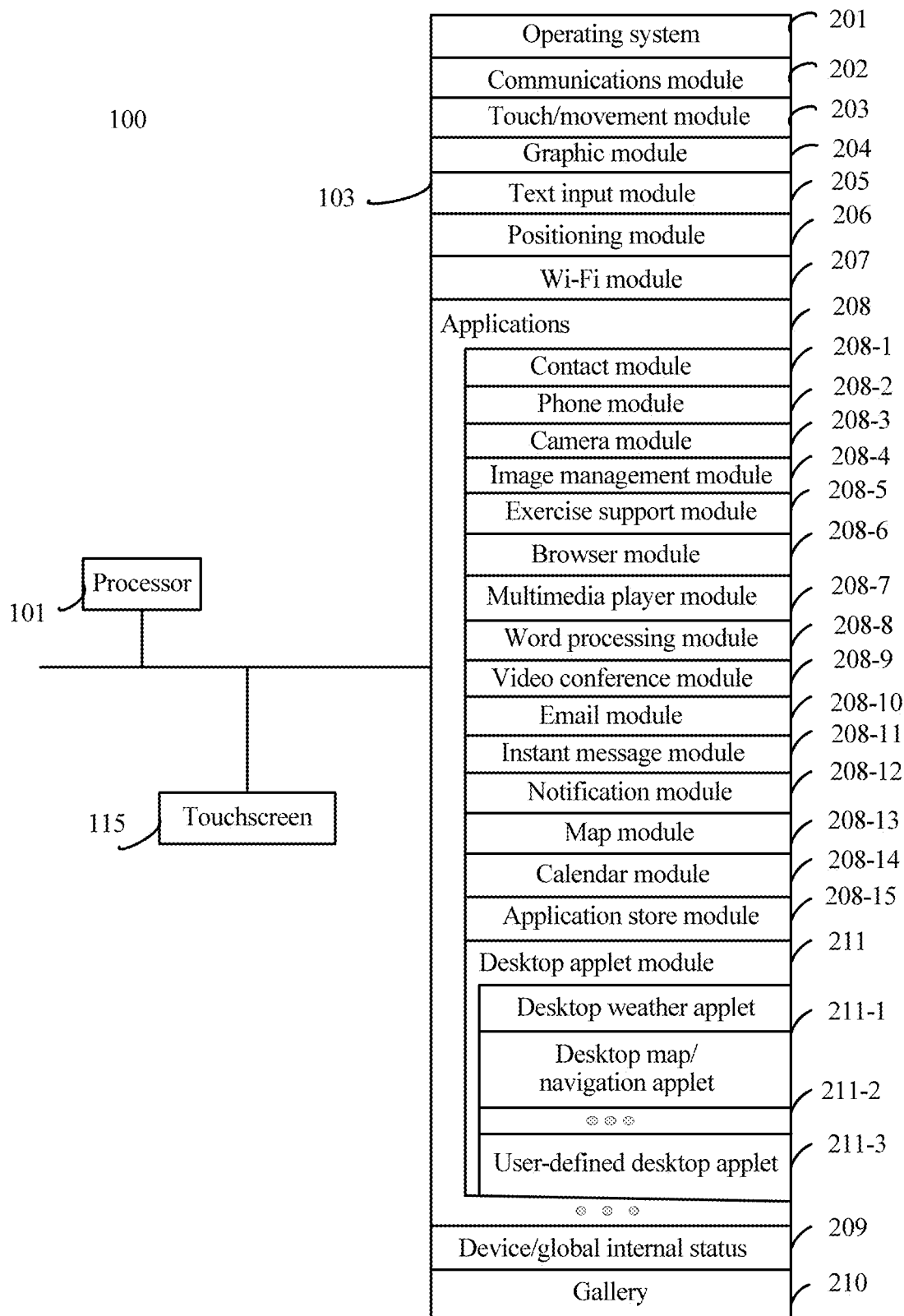
FIG. 2 is a schematic diagram of a part of hardware and software of an electronic device according to some embodiments.

In some embodiments of this application, as shown in FIG. 2, software stored in the memory 103 may include an operating system 201, a communications module (or instruction set) 202, a touch/movement module (or instruction set) 203, a graphic module (or instruction set) 204, a text input module (or instruction set) 205, a positioning module (or instruction set) 206, a Wi-Fi module (or instruction set) 207, and an application (or instruction set) 208. In addition, in some embodiments, the memory 103 may also store a device/global internal status 209, as shown in FIG. 1 and FIG. 2. The device/global internal status 209 may include at least one of the following statuses: an active application status used to indicate a currently active application (if any); a display status used to indicate an application, a view, or other information that occupies each region of the touchscreen 115; a sensor status including information obtained from each sensor and the peripheral interface 110 of the electronic device; and information about a geographical location and a posture of the electronic device.

The operating system 201 (for example, Darwin, RTXC, Linux, Unix, OS X, Windows, Android, or another embedded operating system (for example, VxWorks)) includes various types of software and/or drives configured to control and manage general system tasks (for example, memory management, storage device control, and power management), and is conducive to communication between hardware and software. In addition, in some embodiments, the memory 103 may further store a gallery 210.

The communications module 202 may communicate with another electronic device by using the peripheral interface 110, and may further include various types of software configured to process data received by the radio frequency circuit 102 and/or the peripheral interface 110. The peripheral interface (for example, a Universal Serial Bus (USB) or a live line) is suitable to be directly coupled to another electronic device or indirectly coupled to another electronic device by using a network (for example, the Internet or a wireless LAN). In some embodiments, the peripheral interface 110 may be a multi-pin (for example, 30-pin) connector that is the same as or similar to a 30-pin connector used on an iPod (a trademark of Apple Inc.) device and/or compatible with a 30-pin connector used on an iPod device.

The touch/movement module 203 may detect a touch on the touchscreen 115 and another touch-sensitive device (for example, a touchpad or a physical click wheel). The touch/movement module 203 may include a plurality of pieces of software configured to perform various operations associated with touch detection, for example, to determine whether a touch has occurred (for example, detect a finger pressing event), to determine whether the touch moves and track this movement on a touch panel (for example, detect one or more finger drag events), and to determine whether the touch has been terminated (for example, detect a finger release event or touch interruption). The touch/movement module 203 receives touch data from the touch panel. Determining movement of a touch point may include: determining a speed (value), a velocity (value and direction), and/or acceleration (change of the value and/or the direction) of the touch point, and the movement of the touch point is indicated by a series of touch data. These operations may be applied to a single-point touch (for example, a one-finger touch) or a multi-point simultaneous touch (for example, a multi-point touch/a multi-finger touch).

The touch/movement module 203 may further detect a gesture input of the user. Gestures of different types on the touch-sensitive surface have different touch patterns. Therefore, a type of a gesture may be detected by detecting a specific touch pattern. For example, detecting a single-finger tap gesture includes detecting a finger pressing event and then detecting a finger release event (releasing from the touch-sensitive interface of the touchscreen 115) at a same location (or a basically same location) (for example, at an icon location) as the finger pressing event. For another example, detecting a finger flick gesture on the touch-sensitive surface includes detecting a finger pressing event, then detecting one or more finger drag events, and subsequently detecting a finger release event (releasing from the touch-sensitive interface of the touchscreen 115).

There may be various types of gestures. For example, the gesture may be a flick gesture. To be specific, a single finger taps the touch-sensitive surface of the touchscreen 115, quickly slides, and then quickly leaves the touch-sensitive surface, for example, the finger scrolls a screen up and down or switches images between left and right. The gesture may be a slide gesture. To be specific, a single finger taps the touch-sensitive surface, and then keeps touching and moving, for example, the finger slides to unlock a screen. The gesture may be a swipe gesture. To be specific, a plurality of fingers touch the touch-sensitive surface, and then keep touching and moving, for example, three fingers swipe to return to a home screen. The gesture may be a tap gesture. To be specific, a single finger taps the touch-sensitive surface, and then immediately leaves the touch-sensitive surface. The gesture may be a double tap gesture. To be specific, an operation of performing a tap gesture twice is performed in a quite short time. The gesture may be a touch and hold gesture. To be specific, a finger taps the touch-sensitive surface and keeps still. The gesture may be a drag gesture. To be specific, a finger taps the touch-sensitive surface, and slowly moves without leaving the touch-sensitive surface (there is usually a definite target location, for example, the finger drags a file to a recycle bin to delete the file). The gesture may be a pinch gesture. To be specific, two fingers (usually a thumb and an index finger) pinch on the touch-sensitive surface. The gesture may be an unpinch gesture. To be specific, two fingers (usually a thumb and an index finger) unpinch on the touch-sensitive surface. It may be understood that the gesture may be another type of gesture other than the gestures listed above. A type of the gesture is not limited in this embodiment of this application.

The graphic module 204 includes a plurality of pieces of known software configured to render and display a graphic on the touchscreen 115 or another display, including a component configured to change strength of a displayed graphic. As used in this specification, a term "graphic" includes any object that can be displayed to the user, and includes but is not limited to a text, a webpage, an icon (for example, a user interface object including a soft key), a digital image, a video, an animation, and the like.

In some embodiments of this application, the graphic module 204 stores to-be-used data to represent a graphic. A corresponding code may be allocated to each graphic. The graphic module 204 receives, from an application or the like, one or more codes of a graphic that is specified for display, further receives coordinate data and other graphic attribute data if necessary, and then generates screen image data and outputs the screen image data to the display controller 117.

The text input module 205 that may be used as a component of the graphic module 204 provides a soft keyboard for entering a text in a plurality of applications 208 (for example, a contact 208-1, a browser 208-6, and any other application requiring a text input).

The positioning module 206 is configured to: determine the geographical location of the electronic device, and provide such information for use in various applications 208 (for example, provide the information for a phone 208-2 for geographical location-based dialing, provide the information for a camera 208-3 as image/video metadata, and provide the information for another geographical location service-based application such as a desktop weather applet 211-1 or a desktop map/navigation applet 211-2).

The Wi-Fi module 207 is configured to run various instructions required by the Wi-Fi apparatus 107.

The application 208 may include the following modules (or instruction sets), subsets of the following modules, or supersets of the following modules:

the contact module 208-1 (sometimes also referred to as an address book or a contact), configured to manage a stored contact;

the phone module 208-2;

the camera module 208-3 used for a still image and/or a video image, configured to receive a user instruction and perform digital imaging (photographing) by using the optical sensor 119;

an image management module 208-4, configured to perform operations such as editing, deleting, moving, and renaming on the gallery 210 stored in the memory 103;

an exercise support module 208-5;

the browser module 208-6;

a desktop applet module 211, which may include one or more of the following: the desktop weather applet 211-1, the desktop map/navigation applet 211-2, another desktop applet obtained by the user, and a user-defined desktop applet 211-3;

a multimedia player module (namely, a video and music player module) 208-7, which may include a video player module and a music player module;

a word processing module 208-8;

a video conference module 208-9;

an email module 208-10;

an instant message module 208-11;

a notification module 208-12;

a map module 208-13;

a calendar module 208-14; and/or an application store module 208-15.

Examples of the another application 208 that can be stored in the memory 103 include another word processing application, another image editing application, a drawing application, an application enabled by Java, an encryption application, a digital right management application, a voice recognition application, and a voice replication application.

In combination with the touchscreen 115, the touch module 203, the graphic module 204, and the text input module 205, the contact module 208-1 may be configured to manage an address book or a contact list (for example, the address book or the contact list is stored in an application internal status of the contact module 208-1 in the memory 103), including: adding a name to the address book; deleting a name from the address book; associating a phone number, an email address, a home address, or other information with a name; associating an image with a name; classifying names; providing a phone number or an email address to initiate and/or facilitate communication by using the phone 208-2 and the email; and the like.

In combination with the radio frequency circuit 102, the audio frequency circuit 109, the loudspeaker 112, the microphone 113, the touchscreen 115, the display controller 117, the touch/movement module 203, the graphic module 204, and the text input module 205, the phone module 208-2 may be configured to: enter a character sequence corresponding to a phone number, access one or more phone numbers in the contact module 208-1, modify an entered phone number, dial a corresponding phone number, make a call, and hang up when the call is completed. As described above, any one of a plurality of communication standards, communication protocols, and communications technologies may be used for wireless communication.

In combination with the radio frequency circuit 102, the audio frequency circuit 109, the loudspeaker 112, the microphone 113, the touchscreen 115, the display controller 117, the optical sensor 119, the optical sensor controller 120, the touch/movement module 203, the graphic module 204, the text input module 205, the contact module 208-1, and the phone module 208-2, the video conference module 208-9 includes executable instructions used to initiate, perform, and end a video conference between the user and one or more other participants according to a user instruction.

In combination with the radio frequency circuit 102, the touchscreen 115, the display controller 117, the touch/movement module 203, the graphic module 204, and the text input module 205, the email client module 208-10 includes executable instructions used to create, send, receive, and manage an email in response to a user instruction. In combination with the image management module 208-4, the email client module 208-10 makes it quite easy to create and send an email with a still image or a video image captured by the camera module 208-3.

In combination with the radio frequency circuit 102, the touchscreen 115, the display controller 117, the touch module 203, the graphic module 204, and the text input module 205, the instant message module 208-11 may include executable instructions used to enter a character sequence corresponding to an instant message, modify a previously entered character, transmit a corresponding instant message (for example, transmit a phone-based instant message by using the short message service (SMS) or multimedia messaging service (MMS) protocol, or an Internet-based instant message by using the XMPP, the SIMPLE, or an IMPS), receive an instant message, and view the received instant message. In some embodiments, the transmitted and/or received instant message may include a graphic, a photo, an audio file, a video file, and/or another attachment supported in an MMS and/or an enhanced messaging service (EMS). As used in this specification, the "instant message" includes a phone-based message (for example, a message sent by using the SMS or the MMS) and an Internet-based message (for example, a message sent by using the XMPP, the SIMPLE, or the IMPS).

In combination with the radio frequency circuit 102, the touchscreen 115, the display controller 117, the touch/movement module 203, the graphic module 204, the text input module 205, the positioning module 206, the map module 208-13, and the multimedia player module 208-7, the exercise support module 208-5 includes executable instructions used to: create exercise (for example, with a time, a distance, and/or target calorie consumption); communicate with an exercise sensor (a sports device); receive data from the exercise sensor; calibrate a sensor configured to monitor exercise; select and play music for exercise; and display, store, and transmit exercise data.

In combination with the touchscreen 115, the display controller 117, the optical sensor 119, the optical sensor controller 120, the touch/movement module 203, the graphic module 204, and the image management module 208-4, the camera module 208-3 includes executable instructions used to capture a still image or a video (including a video stream) and store the still image or the video in the memory 103 (for example, the gallery 210), modify a feature of a still image or a video, or delete a still image or a video from the memory 103 (for example, the gallery 210).

In combination with the touchscreen 115, the display controller 117, the touch/movement module 203, the graphic module 204, the text input module 205, and the camera module 208-3, the image management module 208-4 includes executable instructions used to: arrange, modify (for example, edit), or control, tag, delete, and present (for example, in a digital slideshow or an album) in another manner, and store a still image and/or a video image (including a still image and/or a video image stored in the gallery 210).

In combination with the radio frequency circuit 102, the touchscreen 115, the display controller 117, the touch/movement module 203, the graphic module 204, and the text input module 205, the browser module 208-6 includes executable instructions used to browse the Internet (including: searching, linking to, receiving, and displaying a webpage or a part of the webpage; and linking to a webpage attachment and another file) according to a user instruction.

In combination with the radio frequency circuit 102, the touchscreen 115, the display controller 117, the touch/movement module 203, the graphic module 204, the text input module 205, the email client module 208-10, and the browser module 208-6, the calendar module 208-14 includes executable instructions used to create, display, modify, and store a calendar and calendar-related data (for example, a calendar entry and a to-be-done task list) according to a user instruction.

In combination with the radio frequency circuit 102, the touchscreen 115, the display controller 117, the touch/movement module 203, the graphic module 204, the text input module 205, and the browser module 208-6, the desktop applet module 211 may be a mini application that can be downloaded and used by the user (for example, the desktop weather applet 211-1 or the desktop map/navigation applet 211-2) or a mini application created by the user (for example, the user-defined desktop applet 211-3). In some embodiments, a desktop applet includes an HTML (Hypertext Markup Language) file, a CSS (cascading style sheet) file, and a JavaScript file. In some embodiments, a desktop applet includes an XML (Extensible Markup Language) file and a JavaScript file (for example, a desktop applet of Yahoo!).

In combination with the touchscreen 115, the display controller 117, the touch/movement module 203, the graphic module 204, the audio frequency circuit 109, the loudspeaker 112, the radio frequency circuit 102, and the browser module 208-6, the multimedia player module 208-7 includes executable instructions that allow the user to download and play back recorded music and another recorded sound file that are stored in one or more file formats (for example, an MP3 or AAC file), and executable instructions used to display, present, or play back a video in another manner (for example, on the touchscreen 115 or on an external display connected to the peripheral interface 110). In some embodiments, the electronic device 100 may include functionality of an MP3 player.

In combination with the radio frequency circuit 102, the touchscreen 115, the display controller 117, the touch/movement module 203, the graphic module 204, the text input module 205, the positioning module 206, and the browser module 208-6, the map module 208-13 may be configured to receive, display, modify, and store a map and map-related data (for example, a driving route; data of a shop or another point of interest at or near a specific geographical location; and other geographical location-based data) according to a user instruction.

In combination with the radio frequency circuit 102, the touchscreen 115, the display controller 117, the touch/movement module 203, the graphic module 204, the text input module 205, and the browser module 208-6, the application store module 208-15 may be configured to receive and display application store-related data such as a price and content according to a user instruction.

In combination with the touchscreen 115, the display controller 117, the touch/movement module 203, and the graphic module 204, the notification module 208-12 includes executable instructions used to display a notification or an alarm (for example, an incoming message or an incoming call, a calendar event reminder, or an application event) on the touchscreen 115.

Each of the foregoing modules and applications is corresponding to a set of executable instructions used to perform one or more of the foregoing functions and the method described in this application (for example, the computer-implemented method and another information processing method described in this specification). These modules (instruction sets) do not need to be implemented as separate software programs, processes, or modules. Therefore, various subsets of these modules may be combined or rearranged in another manner in various embodiments. In some embodiments, the memory 103 may store a subset of the foregoing module and data structure. In addition, the memory 103 may store another module and another data structure that are not described above.

Each of the foregoing identified elements in FIG. 2 may be stored in one or more memories 103 described above. Each of the foregoing identified modules is corresponding to a set of instructions used to perform the foregoing functions. The foregoing identified modules or programs (instruction sets) do not need to be implemented as separate software programs, processes, or modules. Therefore, various subsets of these modules may be combined or rearranged in another manner in various embodiments. In some embodiments, the memory 103 may store a subset of the foregoing module and data structure. In addition, the memory 103 may further store another module and another data structure that are not described above.

In some embodiments, the electronic device 100 is a device on which operations of a set of functions predefined on the device are uniquely performed by using a touchscreen and/or a touchpad. The touchscreen and/or the touchpad are or is used as a major input control device for operations of the electronic device 100, to reduce a quantity of physical input control devices (such as a push button and a dial pad) on the electronic device 100.

The set of predefined functions that may be performed by using the touchscreen and/or the touchpad includes navigation between user interfaces. In some embodiments, when the touchpad is touched by the user, the device 100 is navigated from any graphical user interface that can be displayed on the device 100 to a main menu or a root menu. In such embodiments, the touchpad may be referred to as a "menu button". In some other embodiments, the menu button may be a physical push button or another physical input control device instead of the touchpad.

Figure 3:
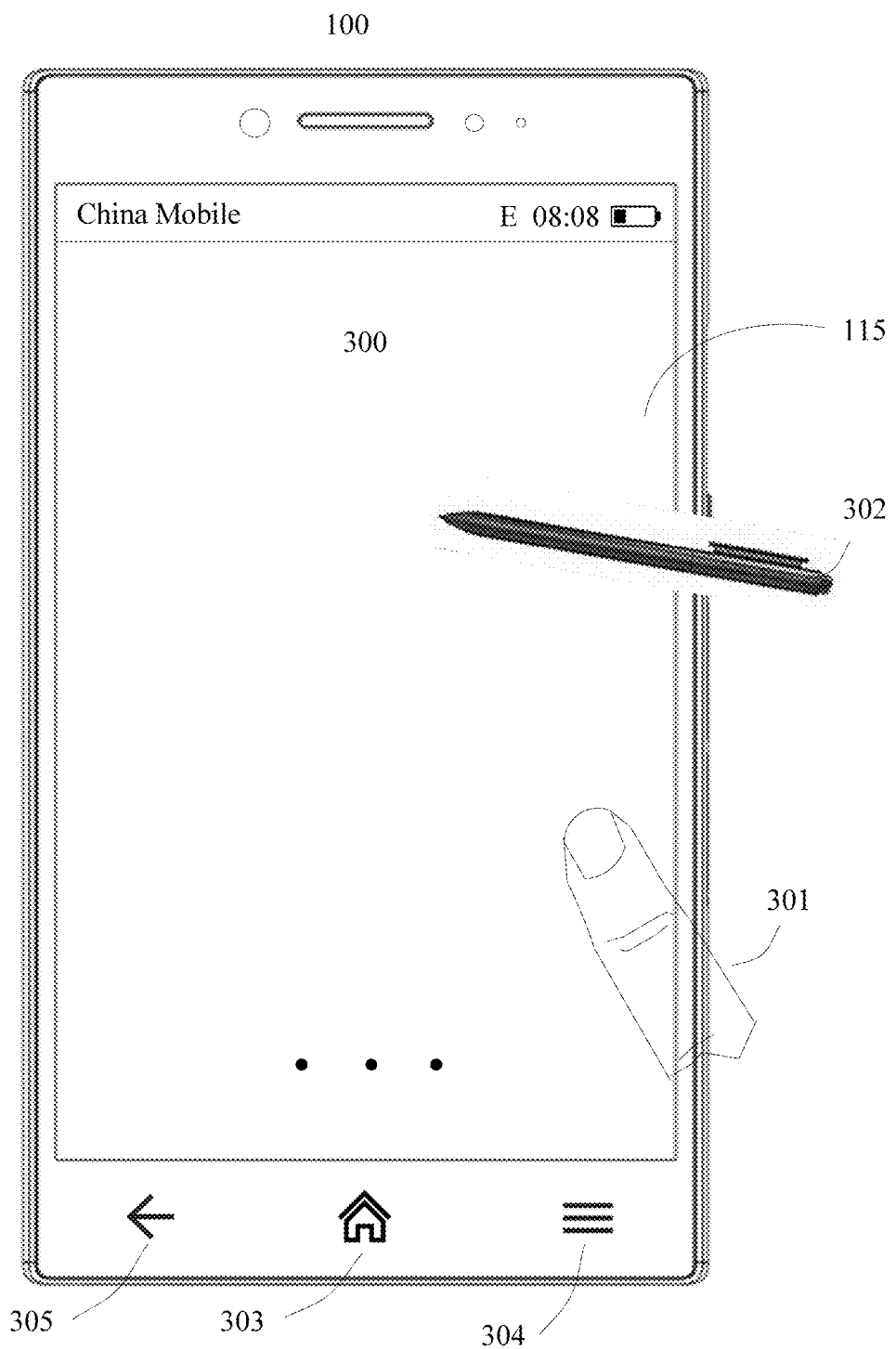
FIG. 3 is a schematic diagram of an electronic device according to some embodiments.

FIG. 3 shows an electronic device 100 including a touchscreen 115 according to some embodiments. The touchscreen may display one or more graphics on a graphical user interface (GUI) 300. In this embodiment and other embodiments described below, a user may select one or more of these graphics by making a gesture on the graphics, for example, by using one or more fingers 301 (not drawn to scale in the accompanying drawings) or one or more styluses 302 (not drawn to scale in the accompanying drawings). In some embodiments, one or more graphics are selected when the user interrupts a touch on the one or more graphics. In some embodiments, the gesture may include one or more taps, one or more slides (from left to right, from right to left, upwards, and/or downwards), and/or dragging of a finger touching the device 100 (from right to left, from left to right, upwards, and/or downwards). In some embodiments, a graphic is not selected when the graphic is unintentionally touched. For example, when a gesture corresponding to selection is a tap, a corresponding application is not selected when a flick gesture is performed on an application icon.

The device 100 may further include one or more physical buttons such as a home screen button 303, a menu button 304, and a back button 305. As described above, the menu button 304 may be used for navigation to any application 208 in a set of applications running on the electronic device 100. In some other embodiments of this application, each of the buttons may be implemented as a virtual key displayed on the graphical user interface (GUI) on the touchscreen 115.

The following describes an embodiment of the graphical user interface (GUI) that may be implemented on the electronic device 100.

Figure 4:
FIG. 4 is a schematic diagram of a graphical user interface on an electronic device according to some embodiments.

FIG. 4 shows an example graphical user interface of an electronic device 100 according to some embodiments. In some embodiments, the graphical user interface 400 includes the following elements, subsets of the following elements, or supersets of the following elements:
- a wireless communication operator name identifier 401;
- a time and battery status indicator 402;
- a home page indicator 403;
- a home screen button 303;
- a menu button 304;
- a back button 305; and
- an application icon, for example:
  - a. Email 404;
  - b. Calendar 405;
    - i. Settings 406, providing access to settings of the device 100 and of various applications 208 of the device 100;
  - c. Camera 407;
  - d. Phone 408;
  - e. Contacts 409;
  - f. Messages 410;
  - g. Gallery 411;
  - h. Weather 412;
  - i. Reader 413;
  - j. App Store 414;
  - k. Map 415;
  - l. Browser 416; and
  - m. Video and Music Player 417.

In addition, although the following examples are provided mainly with reference to finger inputs (for example, a single-finger touch, a single-finger tap gesture, and a single-finger flick gesture), it should be understood that in some embodiments, one or more of the finger inputs are replaced with an input from another input device (for example, a stylus input).

Example graphical user interfaces and associated processes related to the embodiments of this application The following describes an embodiment of a graphical user interface (GUI for short) that can be implemented on an electronic device (for example, an electronic device 100) including a touchscreen and associated processes.

Figure 5A:
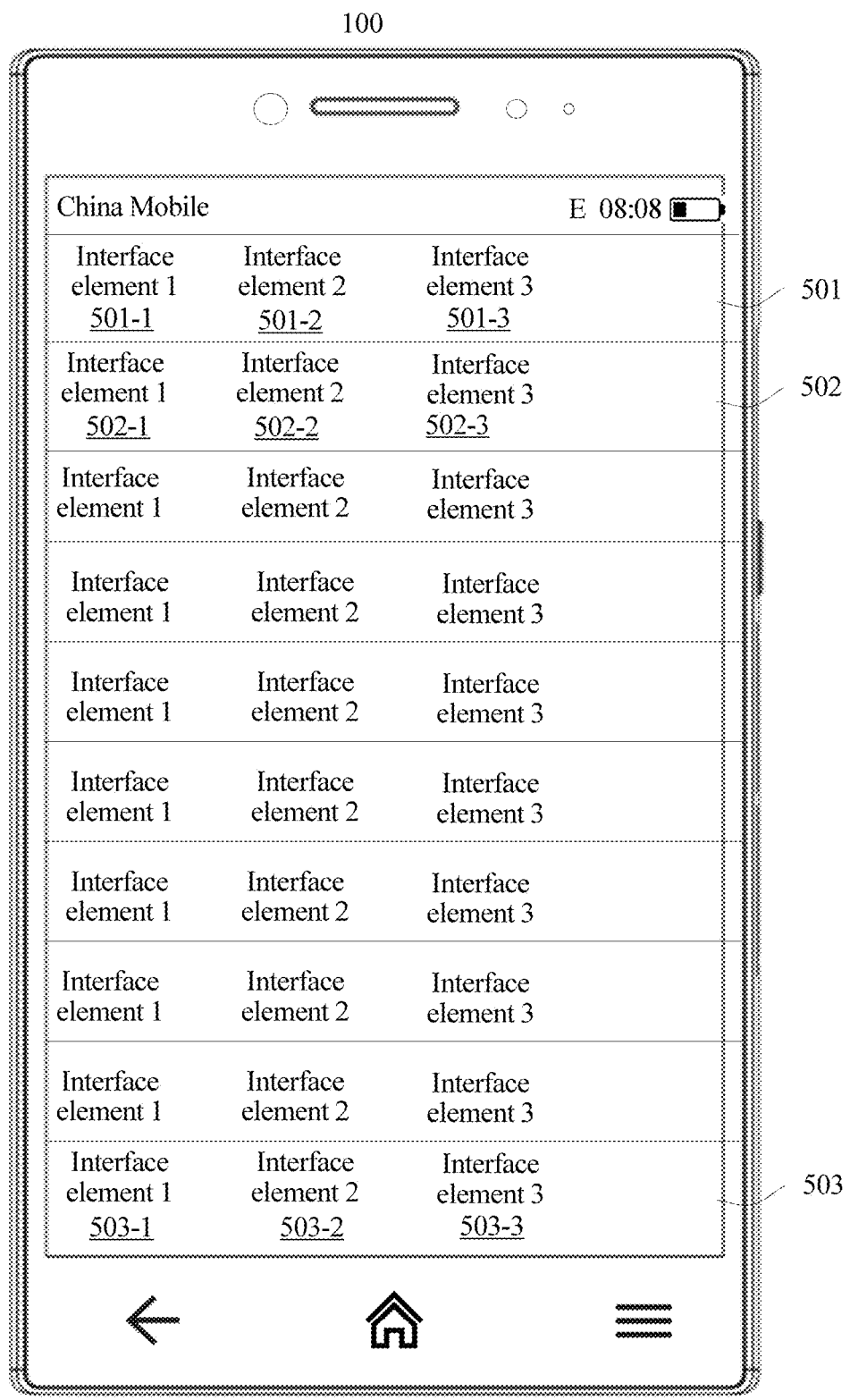
FIG. 5A to FIG. 5E are schematic diagrams of a series of graphical user interfaces on an electronic device according to some embodiments.

As shown in FIG. 5A, an example first graphical user interface (first GUI) for quickly searching for an entry in some embodiments is displayed on the touchscreen 115. The first GUI may be a graphical user interface of an application, and may be specifically an initial home page of the application, for example, an initial home page displayed after a Contacts App is opened, or an initial home page displayed after an App Store App is opened. Rows of a plurality of entries may be displayed in the first graphical user interface. The entries may be considered as a list, and the list includes rows of entries. Three interface elements may be displayed in each entry, and the interface element may be a button, a text box, an icon, a menu, a link, a control, or the like. These different interface elements are arranged in order in different locations in the entry, and the interface elements may be a response to different events that define the graphical user interface, so as to implement interaction between the graphical user interface and a user. For example, if the user taps an interface element 1 (501-1) with a finger, a next-level submenu of the interface element 1 (501-1) pops up in response to the touch operation of the user. It may be understood that because a display region (namely, a display) of the touchscreen 115 is limited, only some entries are displayed in the first graphical user interface, and there are still many entries that are not displayed in the graphical user interface in FIG. 5A. An application to which the first graphical user interface belongs may include more entries than those displayed on the touchscreen. When the touchscreen 115 receives a gesture input (for example, a flick gesture) related to the user, some other entries that are not displayed in the first GUI in FIG. 5A may be displayed.

Rows of a plurality of entries are displayed in the first GUI, and the entries may be of a same type, for example, each entry may be one of a contact, a gallery, and a folder. Specifically, the interface element 1 (501-1) belongs to an entry 501 displayed on the touchscreen 115, and content displayed by the interface element 1 (501-1) may be specifically a contact profile photo, an application icon, an image/video thumbnail, or the like. The entry 501 may further include an interface element 2 (501-2), and the interface element 2 (501-2) may be specifically a contact name, an application name, an image/video name, or the like. The entry 501 may further include an interface element 3 (501-3), and the interface element 3 (501-3) may be specifically a contact phone number, an application capacity, an image/video capacity, or the like. An entry 502, an entry 503, and the like each may have an interface element and a layout similar to those of the entry 501. All entries may have a same display size on the touchscreen 115. For example, the entry 501, the entry 502, and the entry 503 have a same display size. In other words, these entries may have a same shape, or a same area, for example, a same length and a same width. A same quantity of interface elements may also be displayed in all the entries. In other embodiments of this application, for the entry 501, the entry 502, the entry 503, and the like, or for entries of different types, different quantities of interface elements may be displayed in all the entries, and an interface element displayed in an entry may also be different from an interface element displayed in another entry.

When the user needs to search for a related entry in various entries in FIG. 5A, generally, a finger of the user performs a gesture operation on the touchscreen 115, for example, a quick slide or a slow slide, so as to quickly find, on the touchscreen 115, content (for example, an entry) to which the user pays attention.

Figure 5B:
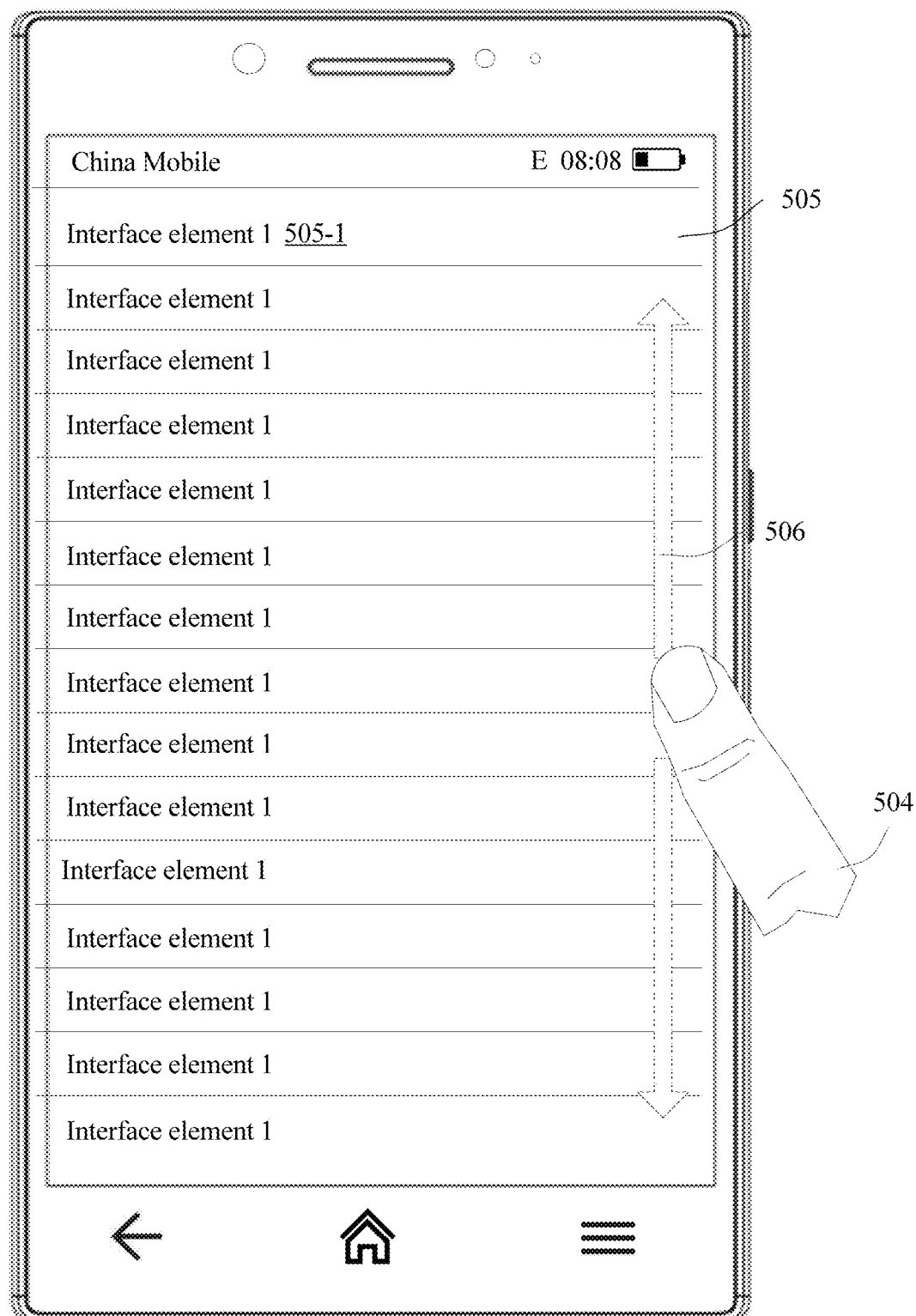

As shown in FIG. 5B, the touch-sensitive surface of the touchscreen 115 detects a first gesture 506 of a finger 504 of the user on the touchscreen 115. A second graphical user interface (second GUI) is displayed on the touchscreen 115 in response to the first gesture 506. Specifically, the electronic device 100 may display the second GUI based on a velocity $V_1$ (including a direction) of the first gesture 506. In some other embodiments, the electronic device 100 may display the second GUI based on a type of the first gesture 506. For example, if the first gesture 506 is a flick gesture, the second GUI is displayed on the touchscreen 115. Rows of a plurality of entries are displayed in the second graphical user interface displayed on the touchscreen 115. All the entries may have a same display size on the touchscreen 115, and a same quantity of interface elements may be displayed in all the entries. The entries may be of a same type, for example, each entry may be one of a contact, a gallery, and a folder. Specifically, an entry 505 may include an interface element 1 (505-1), and the interface element 1 (505-1) may be a contact profile photo, an application icon, or the like. Because the second graphical user interface in FIG. 5B is displayed when the first gesture 506 is detected, more entries are displayed in FIG. 5B compared with FIG. 5A, in other words, a quantity of entries displayed in FIG. 5A may be less than a quantity of entries displayed in FIG. 5B. In addition, because more entries are displayed in FIG. 5B, all the entries may have a same display size on the touchscreen 115, and a size of the display region (namely, the display) of the touchscreen 115 is fixed, a size of each entry shown in FIG. 5B is less than a size of each entry shown in FIG. 5A. In some other embodiments, fewer interface elements are displayed in each entry in FIG. 5B, in other words, a quantity of interface elements displayed in each entry in FIG. 5A is greater than a quantity of interface elements displayed in each entry in FIG. 5B. For example, a quantity of interface elements in each entry in FIG. 5B may be only one (for example, only a contact profile photo is displayed), and is less than a quantity (3) of interface elements displayed in each entry in FIG. 5A.

In some other embodiments of this application, a plurality of entries in an application may be displayed on the touchscreen 115 through scrolling in response to the velocity of the first gesture 506. A graphical user interface displayed through scrolling may have a same layout as an entry in the second GUI and an element interface in the entry at each moment. Duration of the scrolling display may be determined based on the velocity of the first gesture 506. For example, a higher velocity of the first gesture 506 indicates longer duration of the scrolling display, and on the contrary, a lower velocity of the first gesture 506 indicates shorter duration of the scrolling display. In whatever case, the scrolling display gradually slows down until scrolling stops and a static graphical user interface is displayed. The graphical user interface may be the same as the second GUI.

Figure 5C:
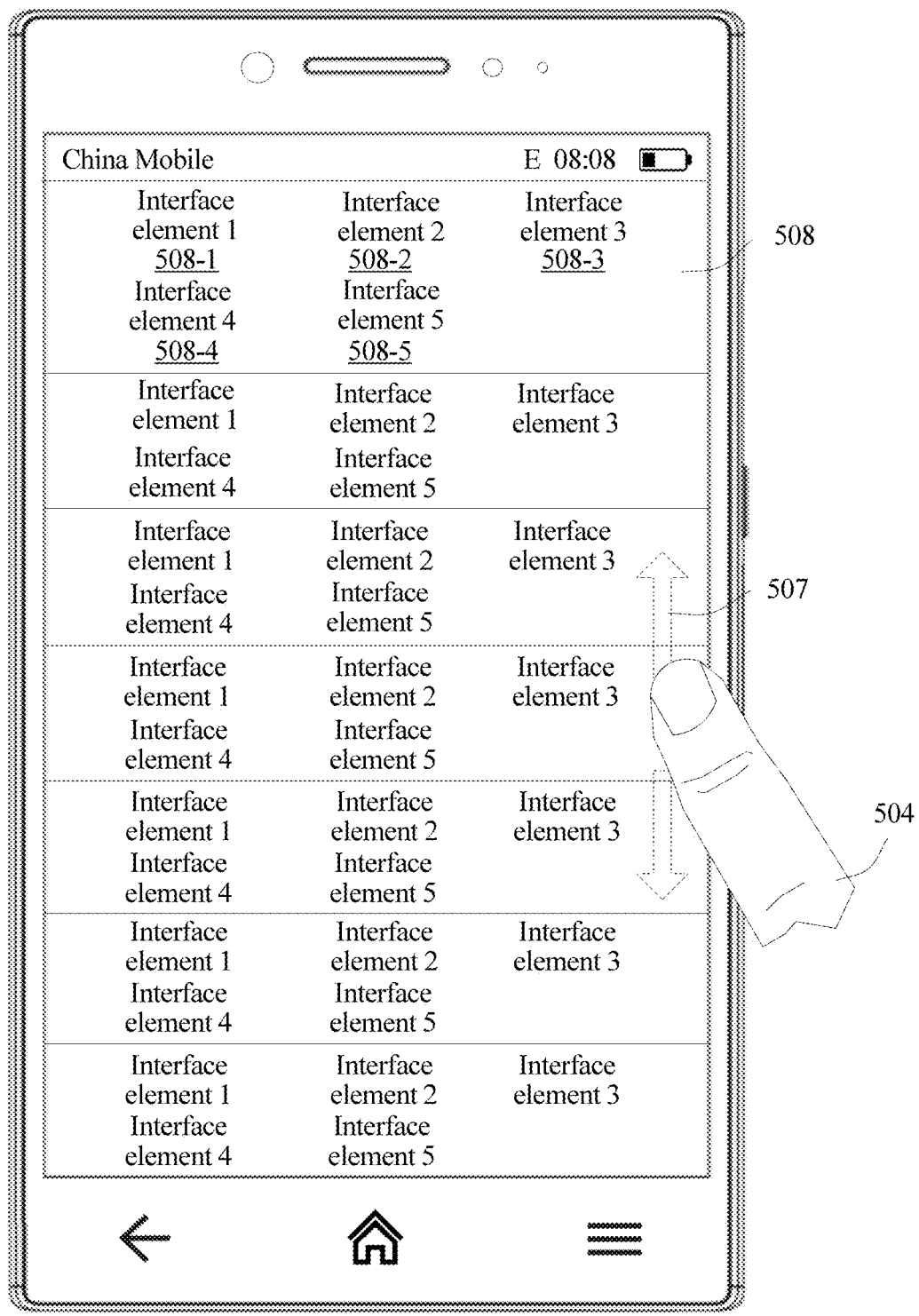

In some other embodiments of this application, the touch-sensitive surface of the touchscreen 115 detects a second gesture 507 of the finger 504 of the user on the touchscreen 115. A third graphical user interface (third GUI) shown in FIG. 5C is displayed on the touchscreen 115 in response to the second gesture 507. Specifically, the electronic device 100 may display the third GUI based on a velocity (including a direction) of the second gesture 507. The velocity $V_2$ of the second gesture 507 may be less than the velocity $V_1$ of the first gesture 506. The direction of the second gesture 507 may be the same as the direction of the first gesture 506, or may be opposite to the direction of the first gesture 506. As indicated above, the user is close to an entry for which the user needs to search, and therefore the gesture velocity is slower. In some other embodiments of this application, the electronic device 100 may display the third GUI based on a type of the second gesture 507. For example, the second gesture 507 may be a drag gesture. The first gesture 506 and the second gesture 507 may be gestures of different types.

Rows of entries are also displayed in the third GUI, and the entries may be of a same type, for example, each entry is one of a contact, a gallery, and a folder. Specifically, an entry 508 may include an interface element 1 (508-1), an interface element 2 (508-2), an interface element 3 (508-3), an interface element 4 (508-4), and an interface element 5 (508-5). The interface element 1 (508-1) may be a contact profile photo, an application icon, or the like. The interface element 2 (508-2) may be a one-touch easy dialing icon, an application download link, or the like. The interface element 3 (508-3) may be contact group information, an application capacity, or the like. The interface element 4 (508-4) may be a contact phone number, an application category, or the like. Because the third graphical user interface in FIG. 5C is displayed when the second gesture 507 is detected, fewer entries than those displayed in FIG. 5A or FIG. 5B may be displayed in FIG. 5C compared with FIG. 5A and FIG. 5B. In addition, because fewer entries are displayed in FIG. 5C through comparison between FIG. 5A, FIG. 5B, and FIG. 5C, all the entries have a same display size on the touchscreen 115, and the size of the display region (namely, the display) of the touchscreen 115 is fixed, a size of each entry shown in FIG. 5C is greater than a size of each entry shown in FIG. 5A or FIG. 5B. In some other embodiments, a quantity of entries displayed in FIG. 5C may be less than a quantity of entries displayed in the first GUI in FIG. 5A. A quantity of interface elements in each entry displayed in FIG. 5C may be greater than a quantity of interface elements displayed in FIG. 5A or FIG. 5B.

Figure 5D:
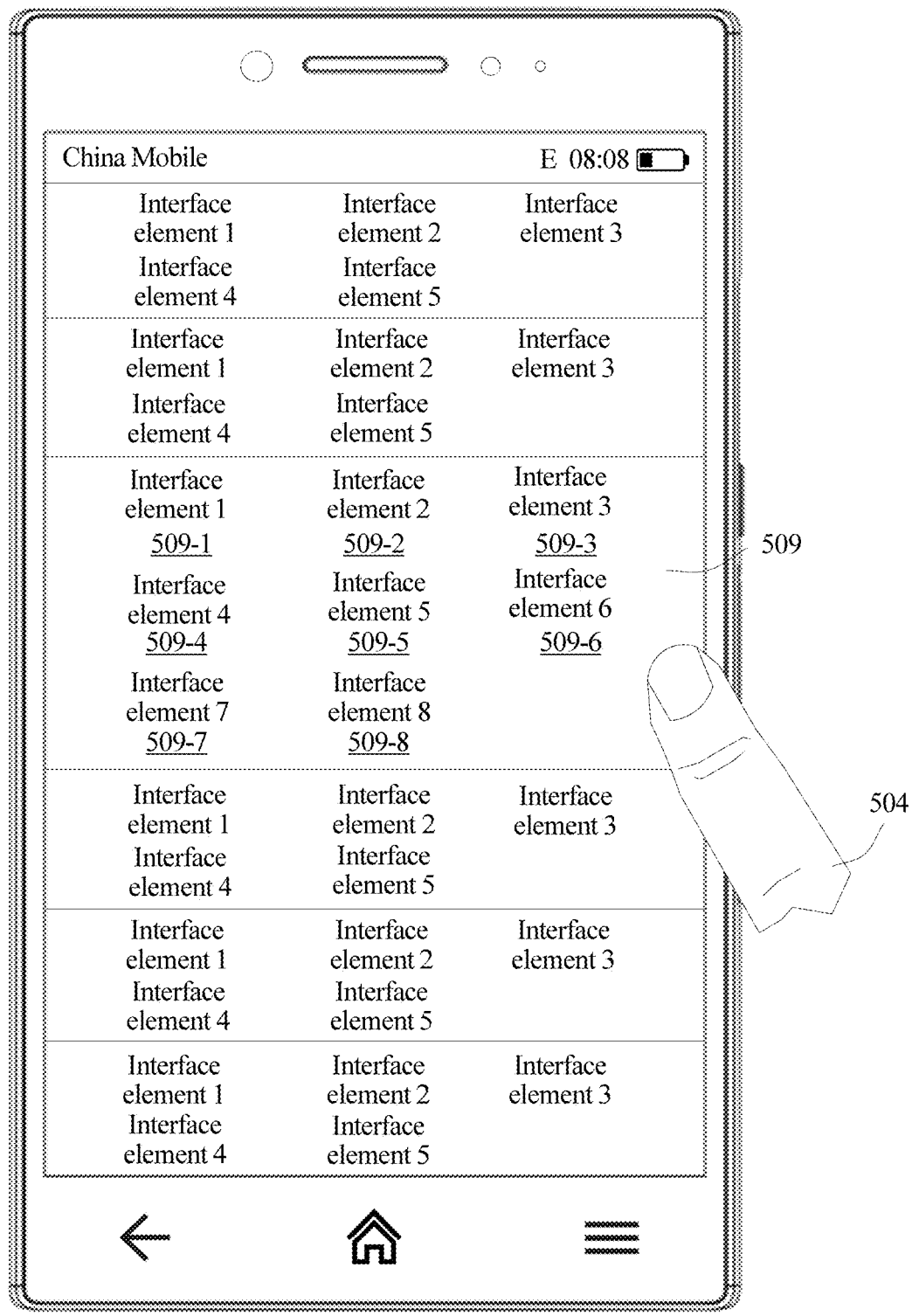

In some other embodiments of this application, as shown in FIG. 5D, when the electronic device 100 detects that the second gesture 507 is terminated, an entry on a location at which the second gesture 507 is terminated may be enlarged for display, so that the user mainly views the enlarged entry. In FIG. 5D, the enlarged entry 509 may include an interface element 1 (509-1), an interface element 2 (509-2), an interface element 3 (509-3), an interface element 4 (509-4), an interface element 5 (509-5), an interface element 6 (509-6), an interface element 7 (509-7), an interface element 8 (509-8), and the like. More interface elements may be displayed in the enlarged entry compared with another entry that is not enlarged. This helps the user perform a specific subsequent operation after finding a required entry, for example, perform one-touch easy dialing or download an application. In addition, because the entry 509 is enlarged for display, and display sizes of other entries are unchanged, only six entries are displayed in a graphical user interface shown in FIG. 5D, and are one less than the entries shown in FIG. 5C.

Figure 5E:
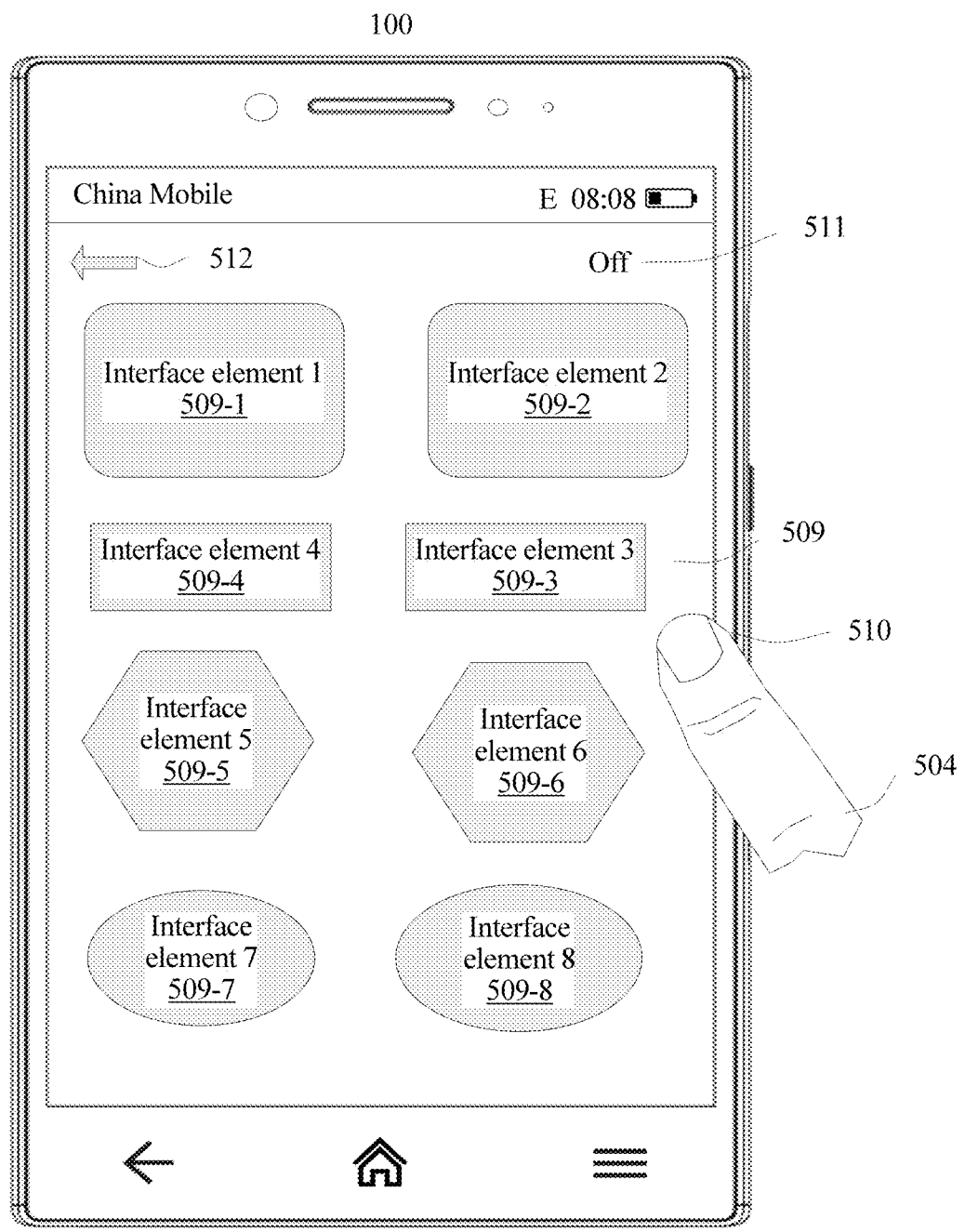

In some other embodiments of this application, the enlarged entry 509 may be enlarged to occupy the entire touchscreen 115 in response to a third gesture 510 of the user that is detected by the electronic device 100, as shown in FIG. 5E. The third gesture 510 may be a gesture with specific pressure. When the specific pressure is greater than (or equal to) a pressure threshold prestored in the electronic device 100, the enlarged entry 509 may be enlarged to the entire touchscreen 115. Therefore, more interface elements in the entry are displayed. This embodiment may indicate that the enlarged entry 509 is the entry for which the user needs to search. In the entry 509 displayed in FIG. 5E, there are eight interface elements, and certainly there may be more interface elements. It may be understood that if the entry 509 is not the entry for which the user needs to search, the electronic device 100 may detect a touch operation performed by the user on a control 511 or 512. In response to the touch operation, a graphical user interface of the entry 509 is closed, and a GUI displayed on the touchscreen 115 returns to the GUI shown in FIG. 5C or FIG. 5D. In this case, the user may continue to perform a gesture operation for a further search based on FIG. 5C or FIG. 5D.

In the foregoing and the following embodiments of this application, various graphical user interfaces (for example, the first GUI and the second GUI) of an application may automatically adapt to different sizes of the display region (namely, the display) of the touchscreen 115 of the electronic device 100. For example, a larger size of the display indicates a larger quantity of entries displayed in the first GUI, and a smaller size of the display indicates a smaller quantity of entries displayed in the first GUI.

It should be understood that although terms such as "first" and "second" may be used to describe various graphical user interfaces in the foregoing embodiments, the graphical user interfaces should not be limited by these terms. The terms are merely used to distinguish one GUI from another GUI. For example, the first GUI may be named the second GUI, and similarly, the second GUI may also be named the first GUI, without departing from the scope of the embodiments of this application.

In some other embodiments of this application, the graphical user interfaces displayed in FIG. 5A to FIG. 5E may be different graphical user interfaces of one application. The application may be one of the following applications: Contacts, Gallery, Calendar, Messages, File Manager, Instant Message, Email, App Store, and the like. The interface element may be at least one of the following elements: a control, a link, an icon, a button, a text box, a menu, and the like.

The following provides examples of a detailed description of the foregoing embodiment by using some specific applications.

Example graphical User Interfaces Related to Contacts

Figure 6A:
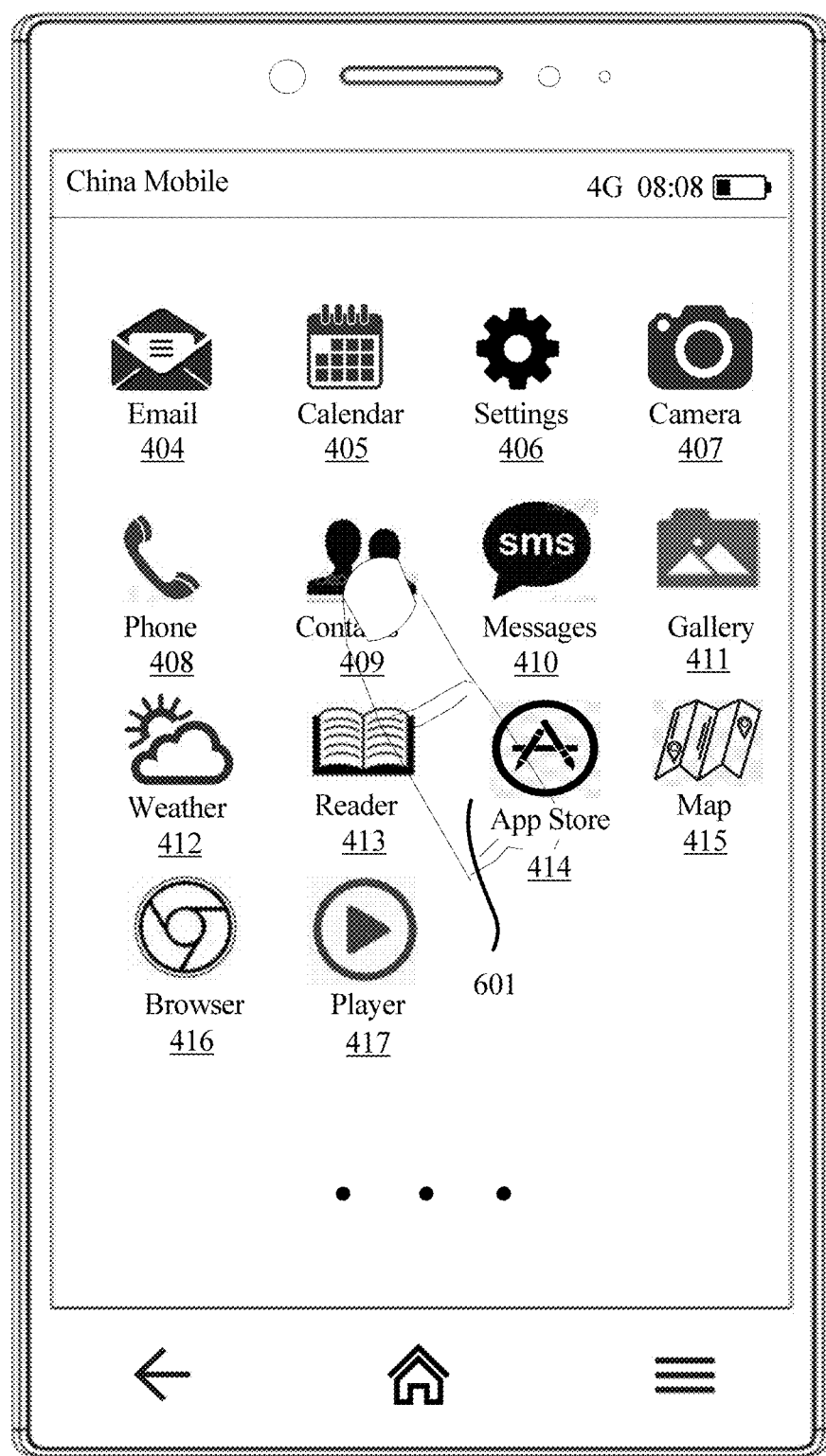
FIG. 6A to FIG. 6G are schematic diagrams of a series of graphical user interfaces displayed in Address Book of an electronic device according to some embodiments.
Figure 6B:
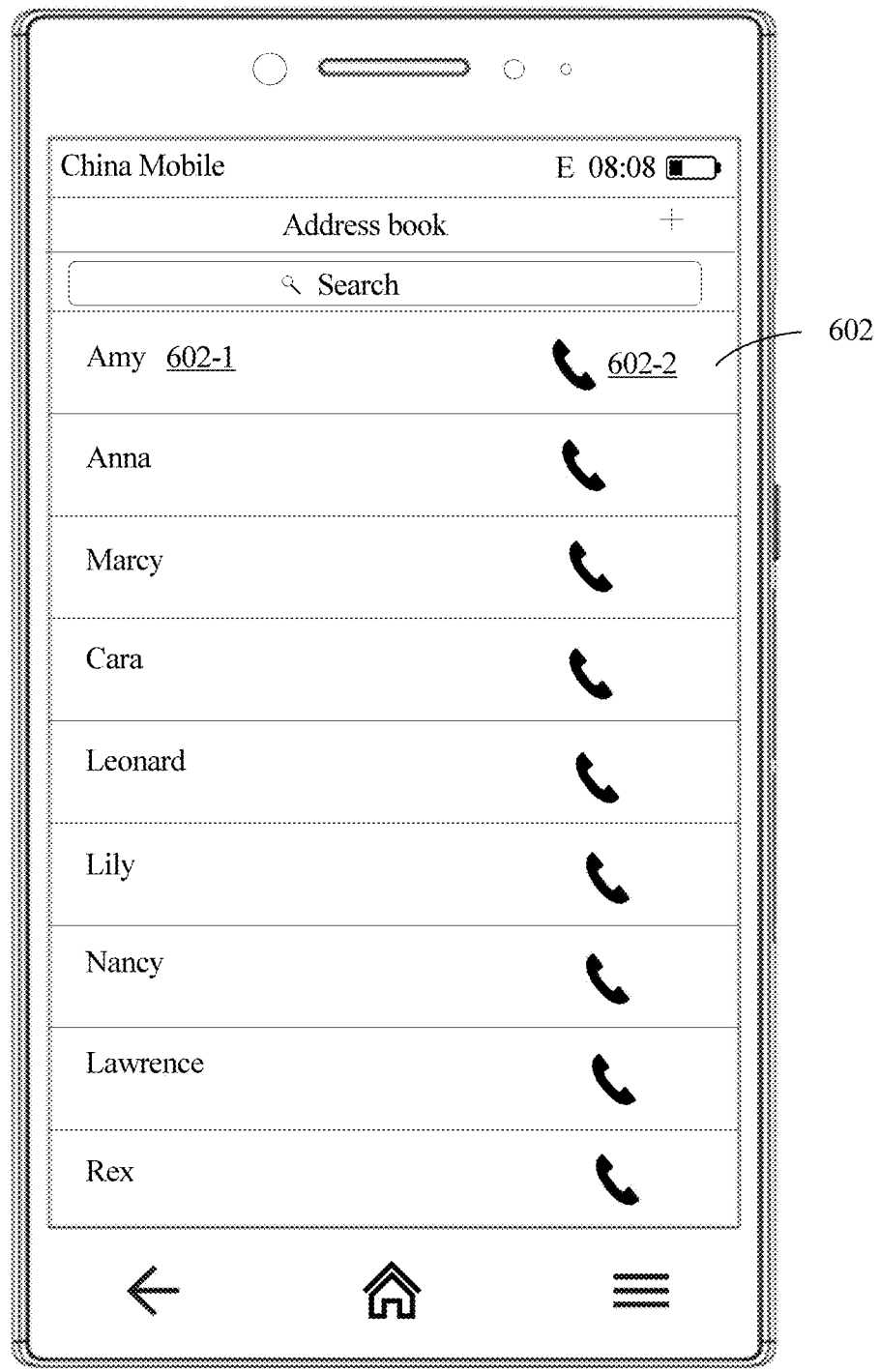
Figure 6C:
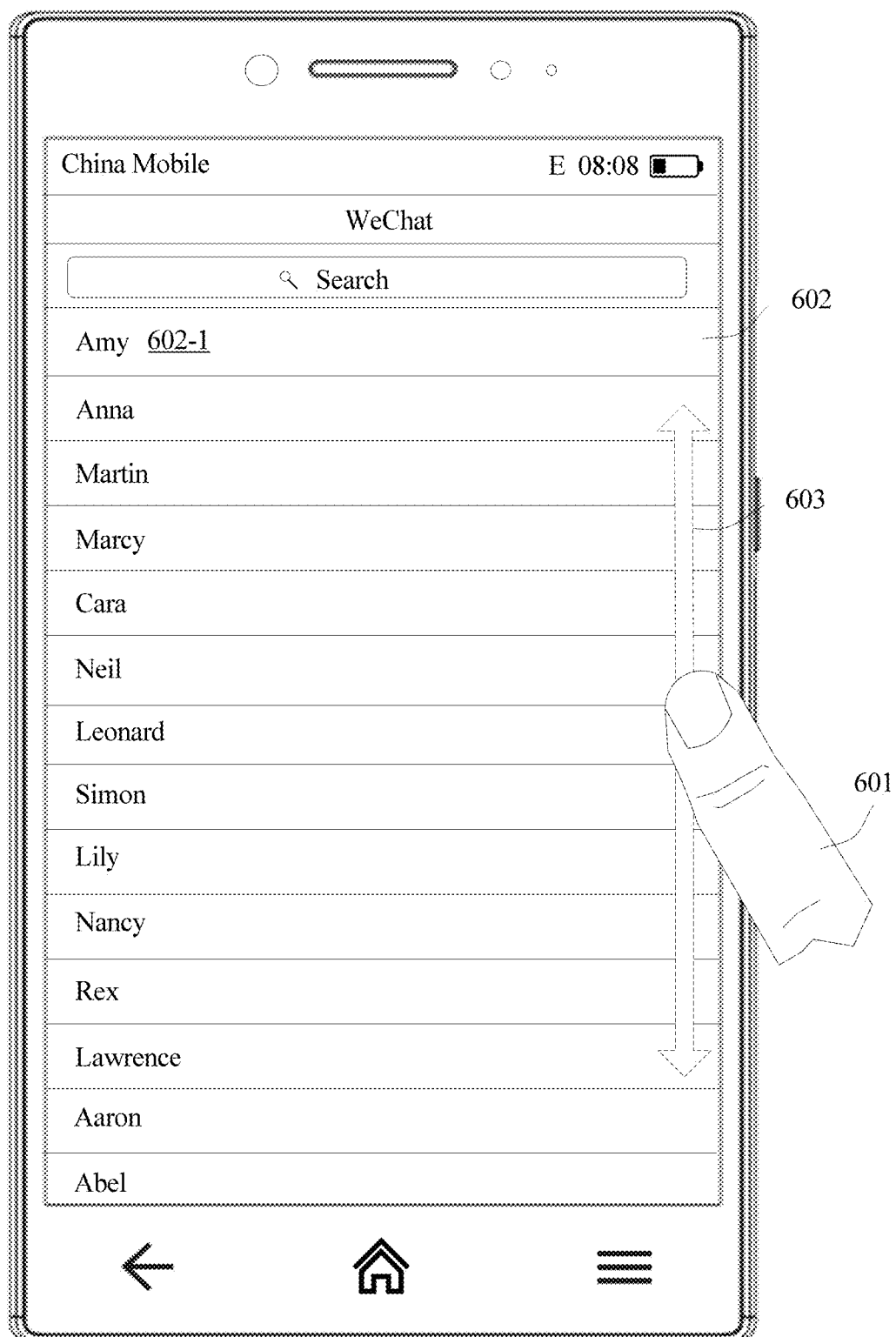

As shown in FIG. 6A, the touch-sensitive surface of the touchscreen 115 receives a touch of a finger 601 of a user on the touchscreen 115. An application icon 409 corresponding to the touch operation is Contacts. As shown in FIG. 6B, a first graphical user interface of the Contacts application (App) is displayed on the touchscreen 115 in response to the touch operation. In the first GUI, a status bar in the upper part is displayed, and rows of a plurality of contacts are further displayed. The Contacts App may include a plurality of contacts. The plurality of contacts may be considered as a contact list, and the contact list includes rows of contacts. A quantity of contacts may be greater than a quantity of contacts displayed in the first GUI. All the contacts have a same display size on the touchscreen, and a same quantity of interface elements may be displayed in all the contacts. In the first GUI of the Contacts App, at least two interface elements may be displayed in each contact. For example, a contact name Amy (an icon 602-1) is displayed in a contact 602, and a one-touch easy dialing icon 602-2 may be further displayed. The electronic device 100 detects a first gesture 603 of the finger 601 of the user on the touchscreen 115. In response to the first gesture 603 (which may be specifically a velocity or the like of the first gesture 603), a quick flick is performed on the first GUI of the Contacts App, and a second GUI of the App is displayed on the touchscreen 115, as shown in FIG. 6C. A quantity of contacts displayed in the second GUI is greater than the quantity of contacts displayed in the first GUI in this embodiment. Because more contacts are displayed in FIG. 6C, all the contacts may have a same display size on the touchscreen 115, and the size of the display region (that is, the display) of the touchscreen 115 is fixed, a display size of each contact displayed in FIG. 6C is less than a size of each entry displayed in FIG. 6B. In some other embodiments, a quantity of interface elements displayed in each contact is less than a quantity of interface elements displayed in each contact in FIG. 6B. For example, in FIG. 6B, there are two interface elements displayed in each contact: a contact name and one-touch easy dialing, and in FIG. 6C, each contact may include only one interface element such as a contact name (the icon 602-1). Such display processing on the graphical user interfaces helps the user focus on a main interface element when quickly searching for an entry.

Figure 6D:
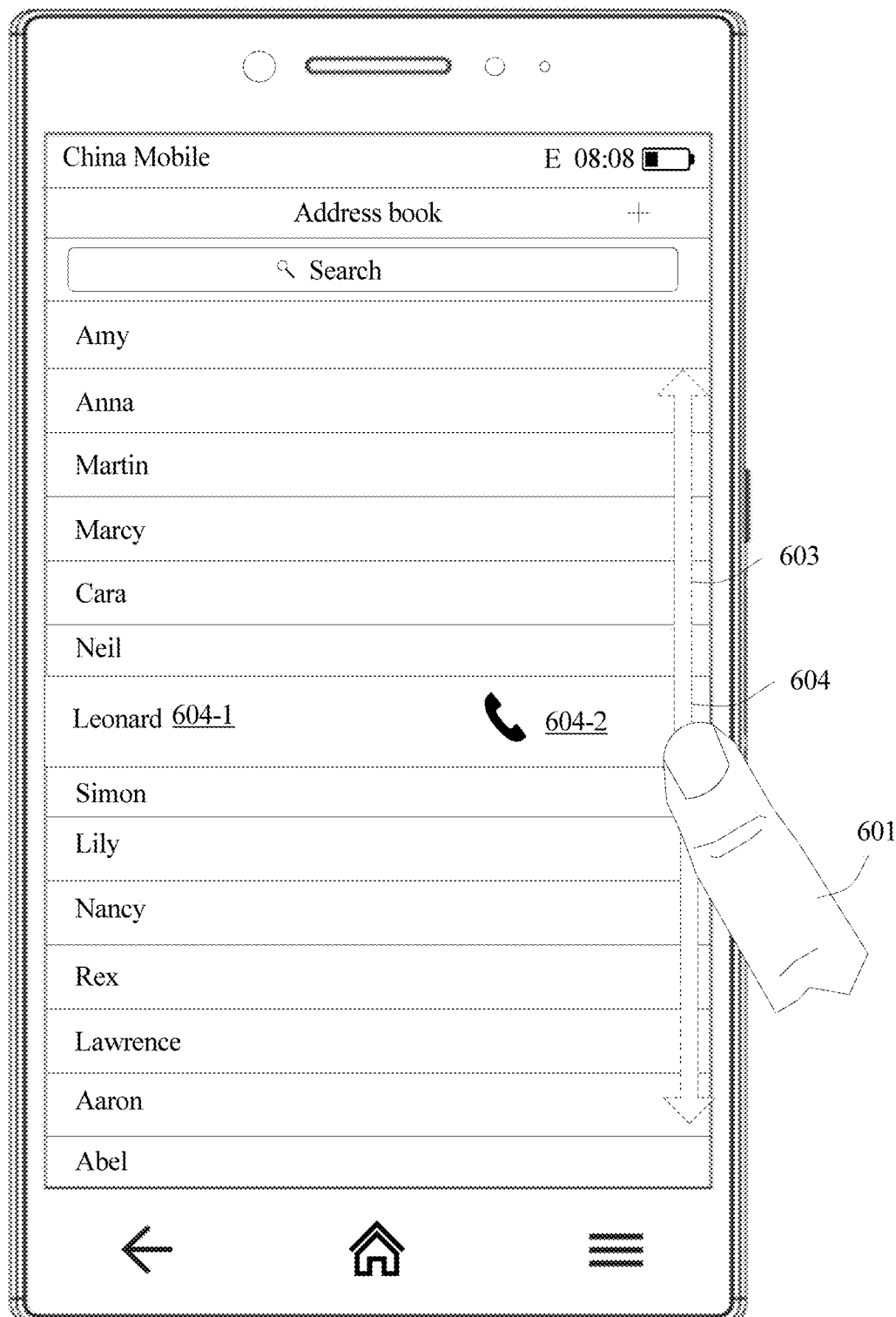

In some embodiments of this application, in the second GUI of the Contacts App, a contact touched by the finger 601 of the user may be enlarged for display. For example, as shown in FIG. 6D, a contact 604 currently touched by the finger 601 of the user is enlarged for display, and more interface elements are displayed in the contact 604 that is enlarged for display: a contact name 604-1 and one-touch easy dialing 604-2. Only one interface element is displayed in another contact that is not enlarged: a contact name. Such a display processing manner further helps the user quickly search for a contact. In addition, in FIG. 6D, because the contact 604 is enlarged for display, two contacts (two contacts named Neil and Simon) adjacent to the contact 604 may be reduced accordingly, to ensure that a quantity of contacts displayed in FIG. 6D is the same as a quantity of contacts displayed in FIG. 6C.

In some other embodiments of this application, a plurality of contacts in the Contacts App may be displayed on the touchscreen 115 through scrolling in response to the velocity of the first gesture 603. A graphical user interface displayed through scrolling may have a same layout as a contact in the second GUI and an element interface in the contact at each moment. Duration of the scrolling display may be determined based on the velocity of the first gesture 603.

Figure 6E:
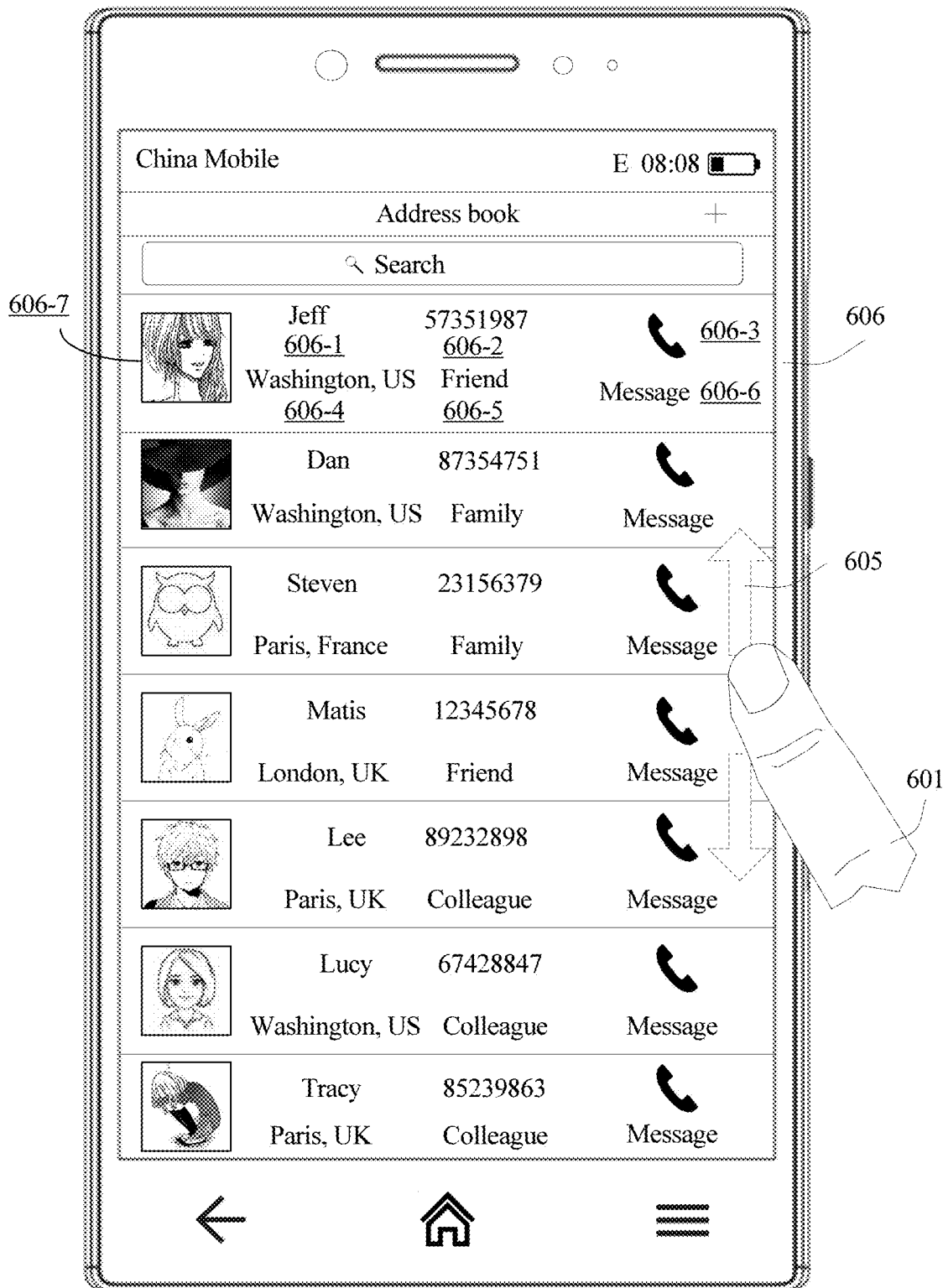

In some other embodiments of this application, as shown in FIG. 6E, a third GUI of the Contacts App is displayed in response to a second gesture 605 of the finger 601 of the user on the touchscreen 115. A velocity of the second gesture 605 may be less than the velocity of the first gesture 603, and therefore this may indicate that the user is close to an entry for which the user needs to search. Therefore, a quantity of contacts displayed in the third GUI is less than that of contacts displayed in the first GUI and the second GUI, all the contacts have a same display size on the touchscreen 115, and more interface elements are displayed in each contact. This further helps the user quickly search for an entry and perform a subsequent operation based on an interface element in the entry. In addition, because fewer contacts are displayed in FIG. 6E, and the size of the display region (namely, the display) of the touchscreen 115 is fixed, a size of each contact displayed in FIG. 6E is greater than a size of each contact displayed in FIG. 6B and FIG. 6C. The following interface elements are displayed in a contact 606 in FIG. 6E: Jeff (a contact name: an icon 606-1), 57351987 (a contact phone number: an icon 606-2), one-touch easy dialing (an icon 606-3), Washington, US (a contact address: an icon 606-4), friend (a contact group: an icon 606-5), message (send a message to the contact: an icon 606-6), and a contact profile photo (an icon 606-7). Interface elements that are the same as or similar to those in the contact 606 may also be displayed in other contacts. In the third GUI, a quantity of interface elements displayed in each contact is significantly greater than a quantity of interface elements in FIG. 6B, FIG. 6C, and FIG. 6D. This helps the user carefully search for a specific contact and perform one-touch easy dialing or send a message to a contact without entering another page to perform an operation.

Figure 6F:
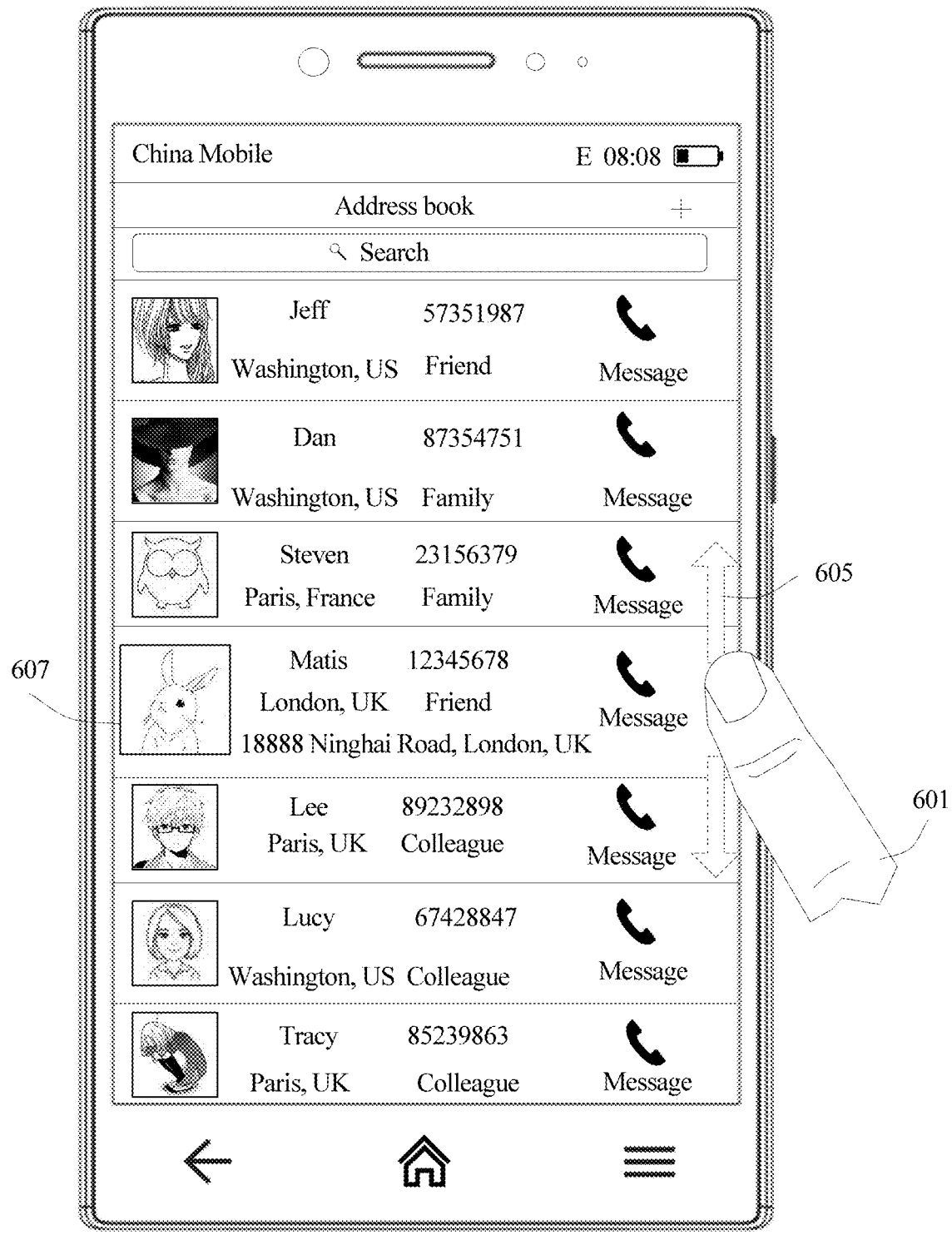
Figure 6G:
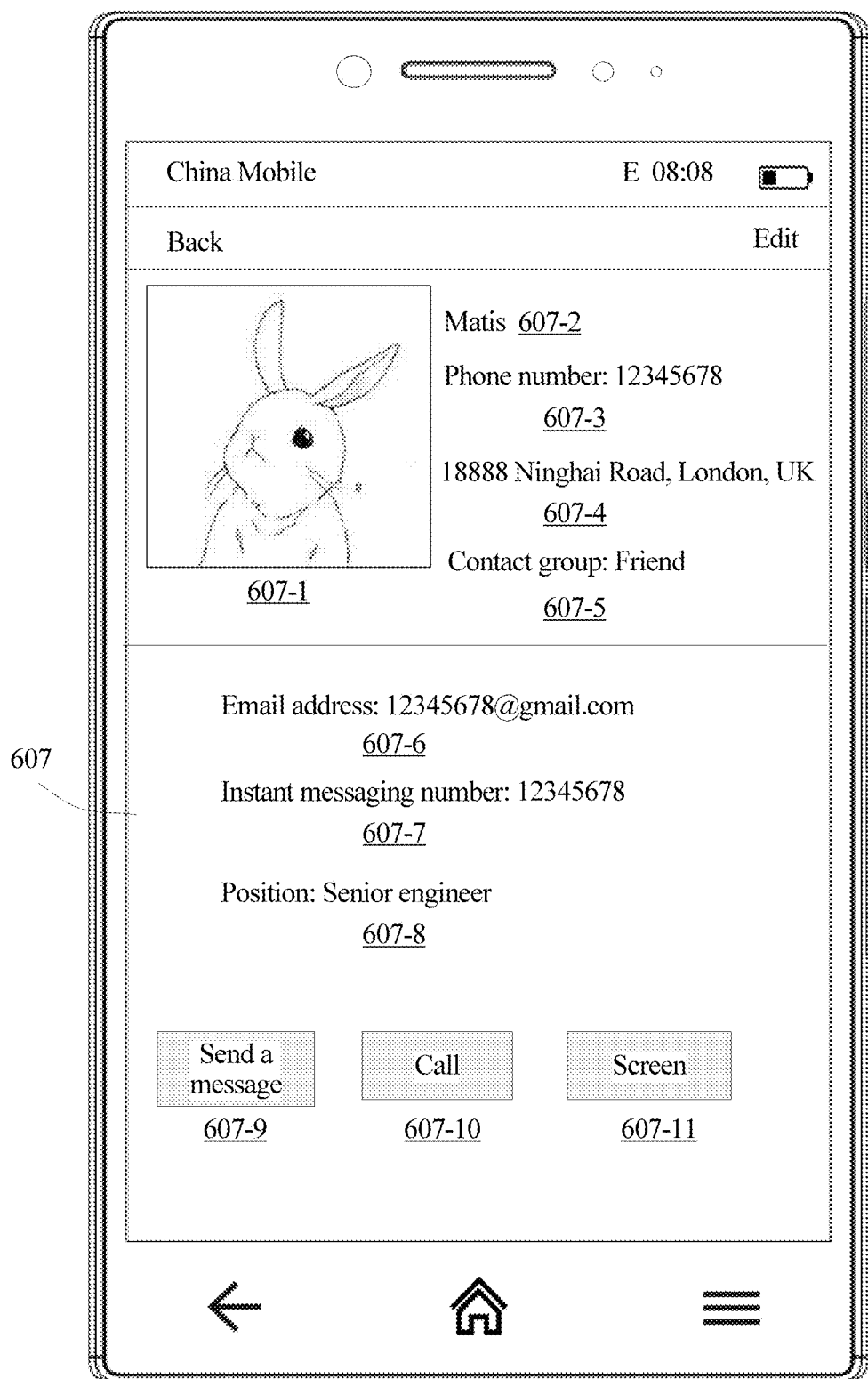

In some other embodiments of this application, in the third GUI, a contact touched by the finger 601 of the user may be enlarged for display. For example, as shown in FIG. 6F, a contact 607 that is currently touched by the finger 601 of the user is enlarged for display, and more interface elements are displayed in the contact 607 that is enlarged for display. Not only all the interface elements are enlarged but also a specific address of the contact is displayed. Interface elements displayed in another contact that is not enlarged are the same as those in the previous graphical user interface. Such a display processing manner further helps the user quickly search for a contact. In this case, when the finger 601 of the user heavily presses the touch-sensitive surface of the touchscreen 115 with pressure sensing, the electronic device 100 may display the contact, to be specific, specific content of the contact 607 on the touchscreen 115 when determining that pressure applied by the user to the touchscreen 115 is greater than a predetermined value. FIG. 6G shows a specific contact manner of the contact 607. The manner specifically includes a contact profile photo (607-1), a name (607-2), a phone number (607-3), an address (607-4), a contact group (607-5), an email address (607-6), an instant messaging number (607-7), and a position (607-8), and may further include several controls for quick operations: Send a message (607-9), Call (607-10), Screen (607-11), and the like. The user may tap a "Back" button at the upper left corner of the GUI to return to the third GUI in FIG. 6F, or may tap an "Edit" button at the upper right corner to edit the contact.

Example Graphical User Interfaces Related to Recent Calls

Figure 7A:
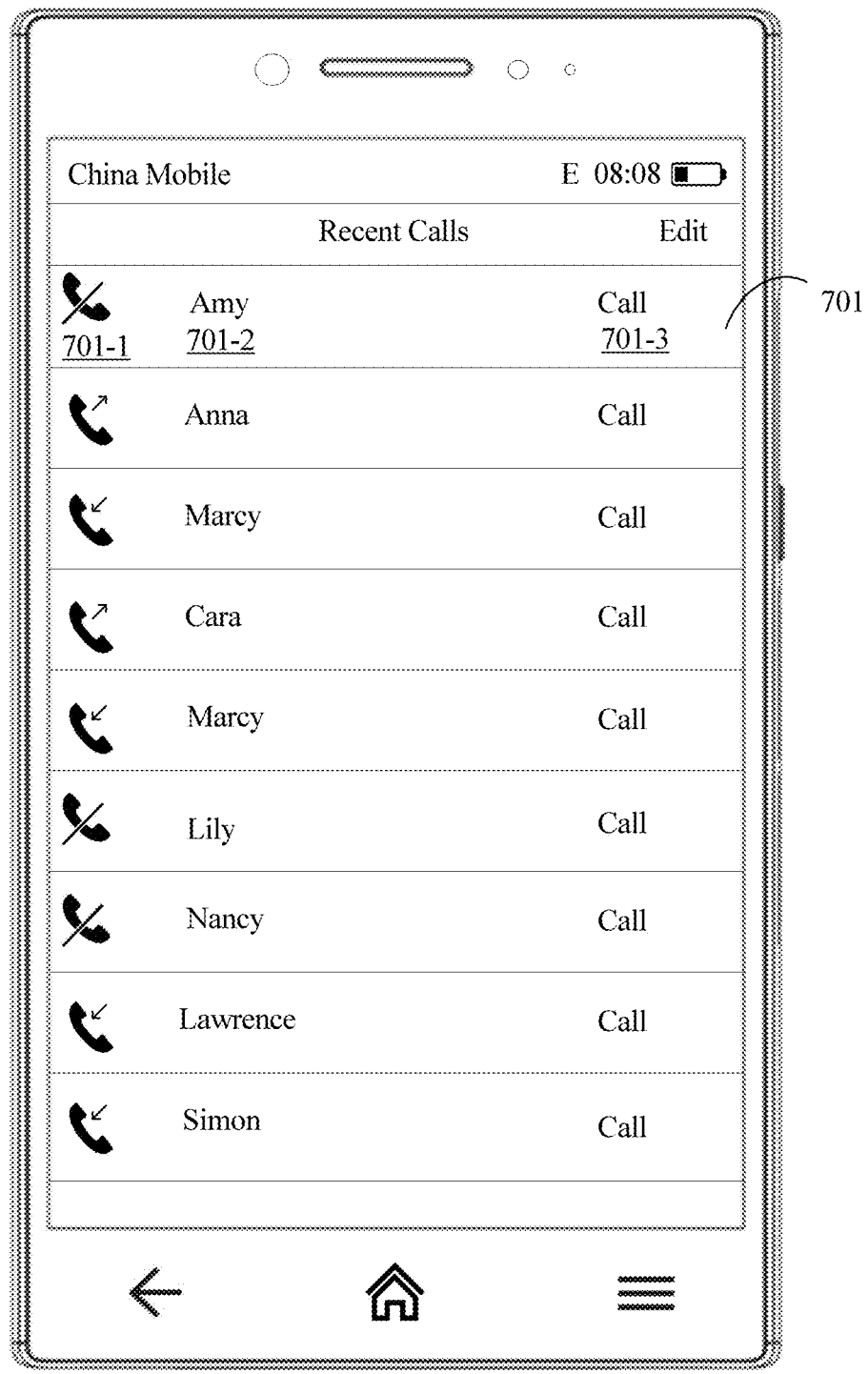
FIG. 7A to FIG. 7E are schematic diagrams of a series of graphical user interfaces displayed in Recent Calls of an electronic device according to some embodiments.
Figure 7B:
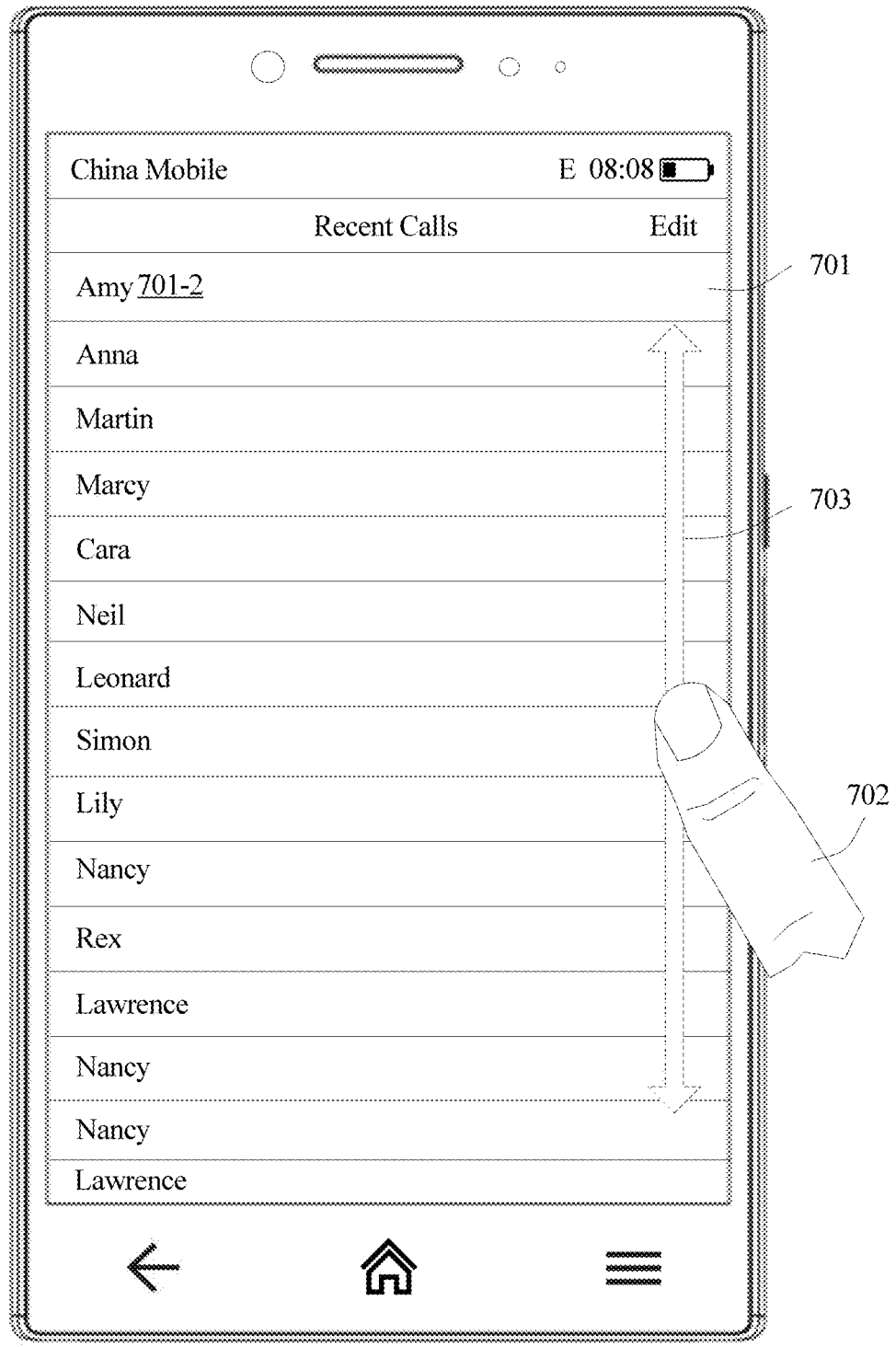

The electronic device 100 detects a touch operation of a finger of a user on the touchscreen 115, and in response to the touch operation, the electronic device 100 opens Phone represented by an icon 408 in FIG. 4. FIG. 7A shows a first GUI of Phone. In the first GUI, a status bar in the upper part is displayed, and recent calls are further displayed. The plurality of displayed recent calls may be considered as a recent call list, and the recent call list includes rows of recent calls. All the recent calls may have a same display size on the touchscreen 115, and a same quantity of interface elements may be displayed in all the recent calls. A plurality of interface elements may be displayed in each recent call. For example, a recent call 701 includes an icon 701-1 indicating a missed call, a contact name Amy (an icon 701-2), and a contact call control (an icon 701-3). The electronic device 100 detects a first gesture 703 of the finger 702 of the user on the touchscreen 115, and displays a second GUI of Recent Calls on the touchscreen 115 in response to the first gesture 703, as shown in FIG. 7B. More recent calls than those displayed in the first GUI are displayed in the second GUI, and all the recent calls may have a same display size on the touchscreen 115. Because more recent calls are displayed in FIG. 7B, and the size of the display region (namely, the display) of the touchscreen 115 is fixed, a size of each recent call displayed in FIG. 7B is less than a size of each recent call displayed in FIG. 7A. A quantity of interface elements in each recent call is less than that in FIG. 7A. For example, only the contact name (the icon 701-2) may be displayed in the recent call 701 in the second GUI.

Figure 7C:
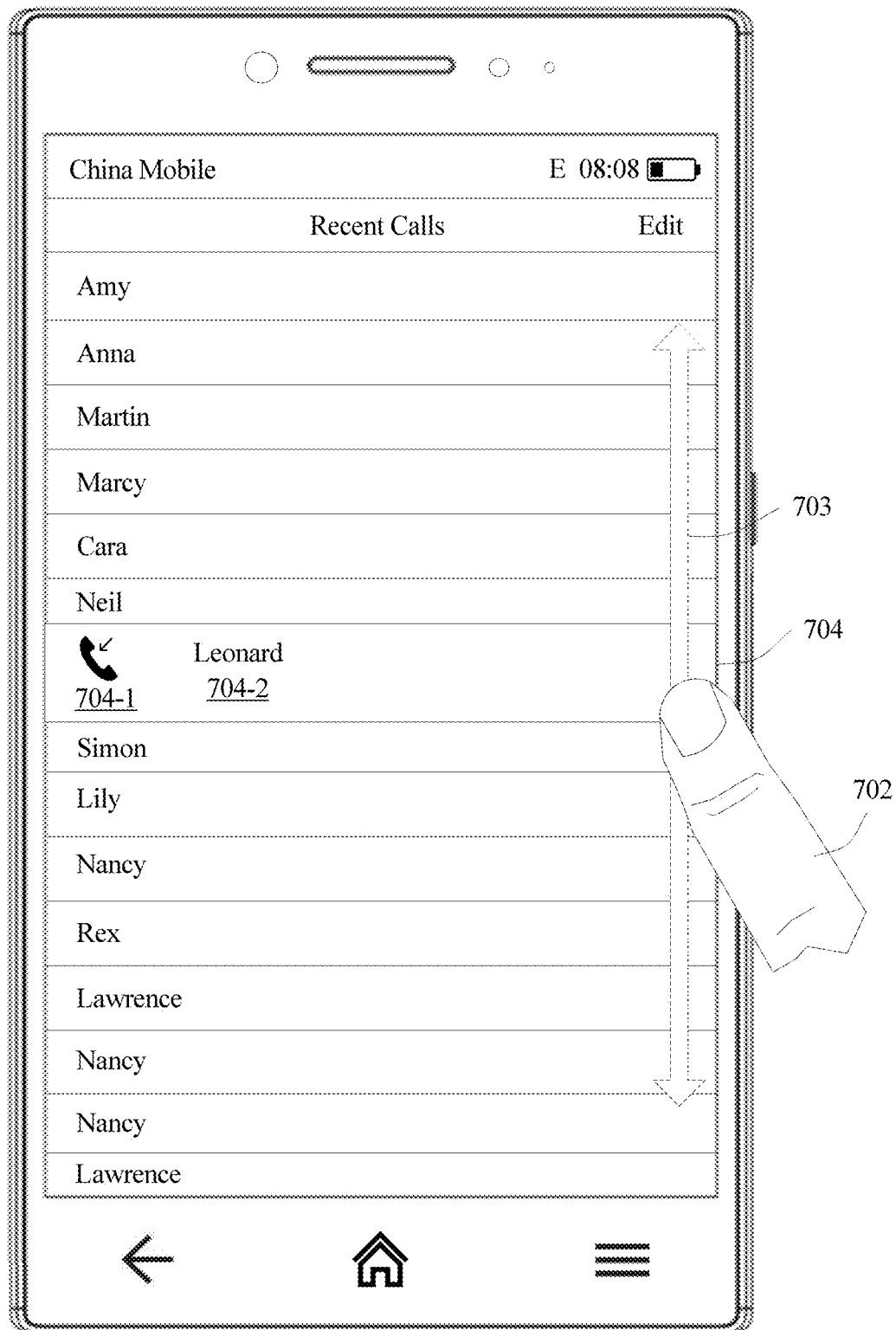

In some embodiments of this application, in the second GUI, a recent call 704 touched by the finger 702 of the user may be enlarged for display. For example, as shown in FIG. 7C, the recent call 704 that is currently touched by the finger 702 of the user is enlarged for display. More interface elements are displayed in the recent call 704 that is enlarged for display: an icon 704-1 indicating a received call and a contact name Leonard (an icon 704-2). Only one interface element is displayed in another contact that is not enlarged: a contact name. Such a display processing manner further helps the user quickly search for a related recent call. In addition, in FIG. 7C, because the recent call 704 is enlarged for display, two recent calls (two recent calls named Neil and Simon) adjacent to the recent call 704 may be reduced accordingly, to ensure that a quantity of recent calls displayed in FIG. 7C is the same as a quantity of recent calls displayed in FIG. 7B.

In some other embodiments of this application, a plurality of entries in the Recent Calls App may be displayed on the touchscreen 115 through scrolling in response to a velocity of the first gesture 703. A graphical user interface displayed through scrolling may have a same layout as an entry in the second GUI and an element interface in the entry at each moment. Duration of the scrolling display may be determined based on the velocity of the first gesture 703.

Figure 7D:
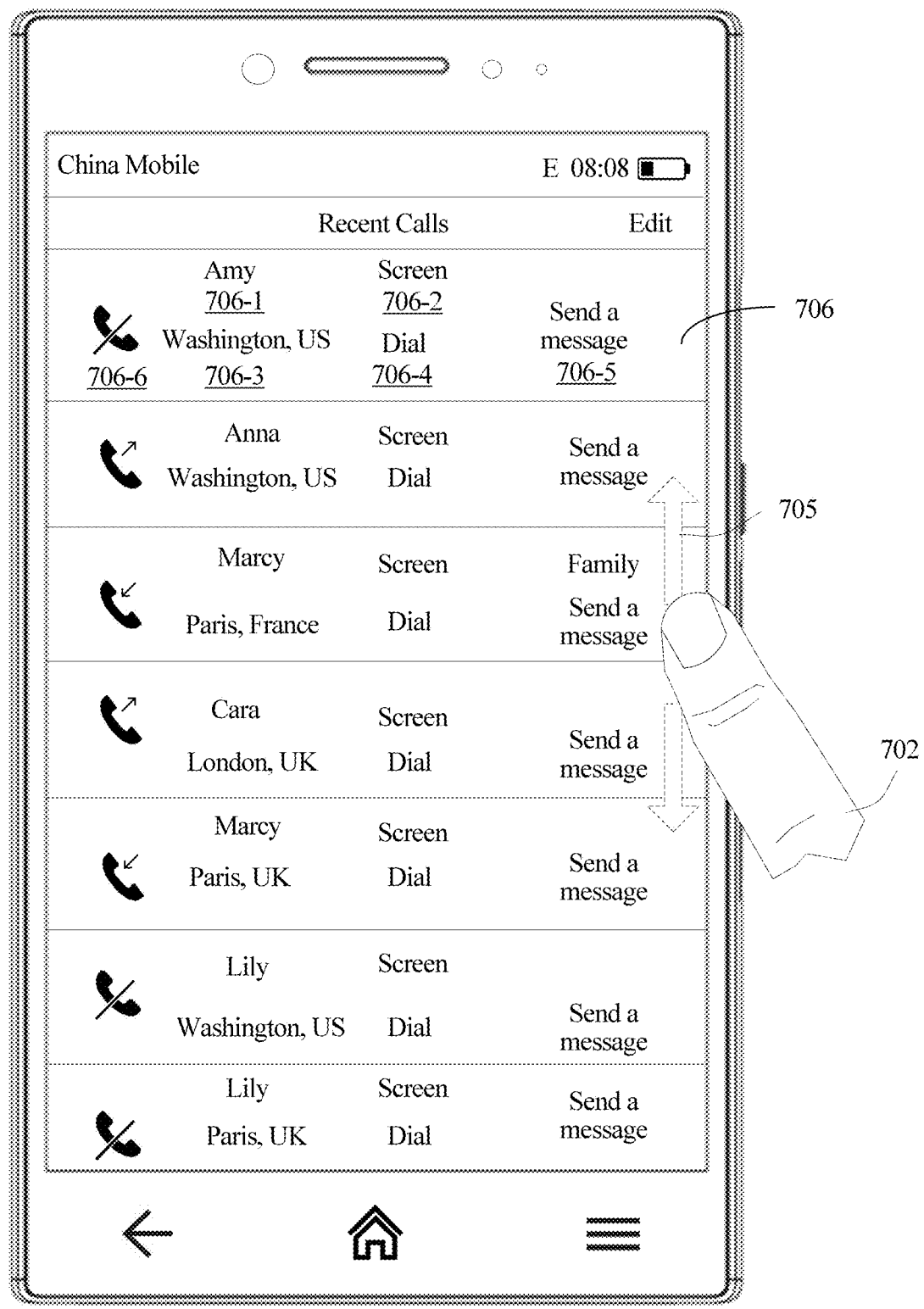

In some other embodiments of this application, as shown in FIG. 7D, a third GUI of Recent Calls is displayed on the touchscreen 115 in response to a second gesture 705 of the finger 702 of the user on the touchscreen 115. A velocity of the second gesture 705 may be less than the velocity of the first gesture 703, and therefore this may indicate that the user is close to an entry for which the user needs to search. Therefore, fewer recent calls are displayed in the third GUI, all the recent calls may have a same display size on the touchscreen 115, and a same quantity of interface elements may be displayed in all the recent calls. More interface elements are displayed in each recent call, and this further helps the user quickly search for an entry and perform a subsequent operation based on an interface element in the entry. As shown in FIG. 7D, a recent call 706 may include the following interface elements: a contact name (706-1), a quick operation of screening out a contact (706-2), a contact address (706-3), a quick dial operation (706-4), a quick operation of sending a message (706-5), and a missed-call icon (706-6). The interface elements may also be displayed in another recent call. It can be learned that, compared with the second GUI in FIG. 7B, in the third GUI in FIG. 7D, although there are fewer recent calls, more interface elements are displayed in each recent call. This further helps the user to perform a search. In FIG. 7D, all the recent calls have a same display size on the touchscreen 115. Because fewer recent calls are displayed in FIG. 7D, and the size of the display region (namely, the display) of the touchscreen 115 is fixed, a size of each recent call displayed in FIG. 7D is greater than a size of each recent call displayed in the second GUI in FIG. 7B.

Figure 7E:
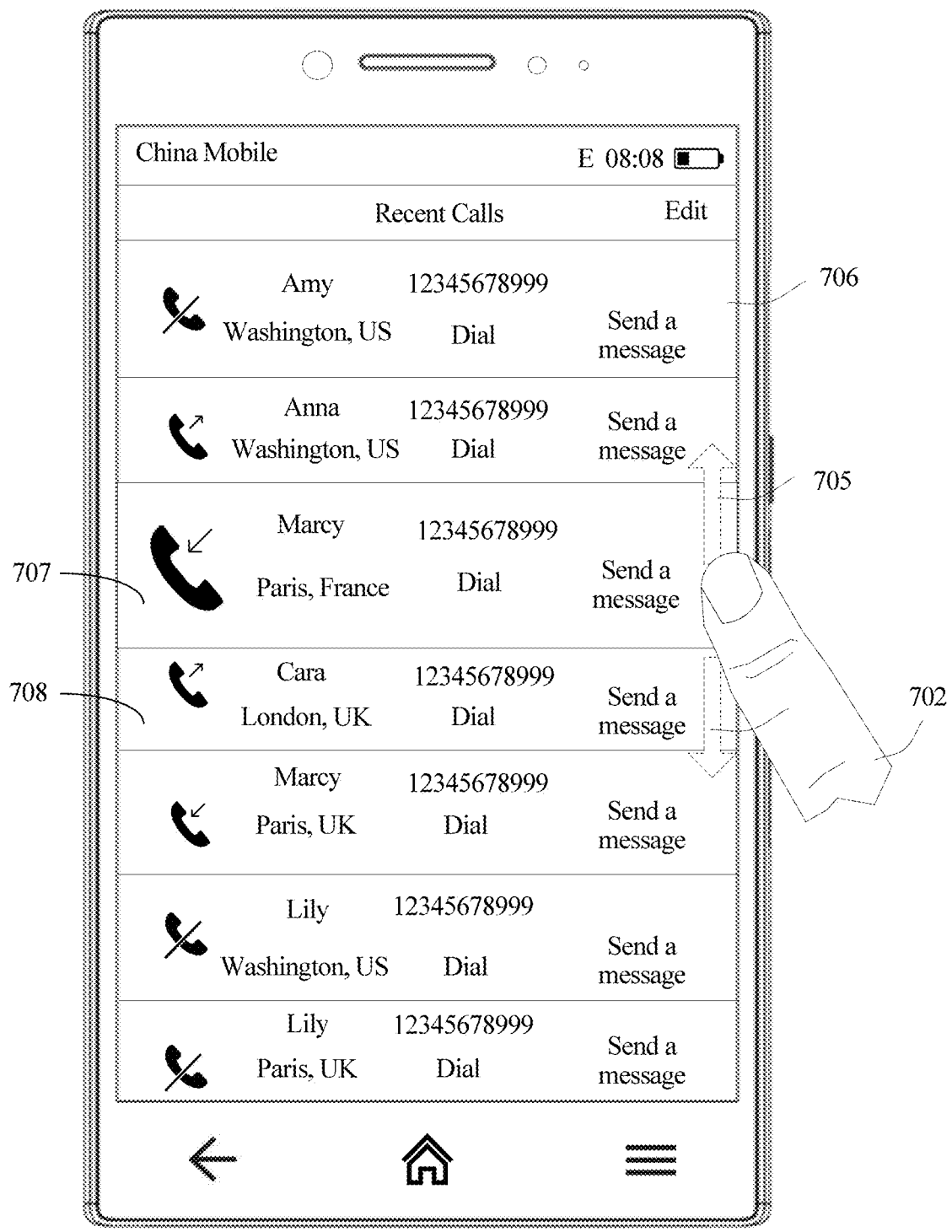

In some other embodiments of this application, when the finger 702 of the user slides slowly on the touchscreen 115 by using the second gesture 705, a recent call touched by the finger 702 of the user may be enlarged for display. As shown in FIG. 7E, a recent call 707 touched by the finger 702 of the user is enlarged for display. It may be understood that more interface elements than those in FIG. 7D may be displayed in the enlarged recent call. In addition, when the finger 702 of the user slides slowly to a recent call 708, the recent call 708 may be enlarged for display, and the recent call 707 that is previously enlarged for display is restored to a same shape as another recent call. In some other embodiments, when detecting that the finger 702 of the user heavily presses the touchscreen 115, the electronic device 100 determines whether applied pressure is greater than a predetermined threshold, and if the pressure is greater than the predetermined threshold, the electronic device 100 performs a dial operation on a contact related to the recent call 707.

Example Graphical User Interfaces Related to Email

Figure 8A:
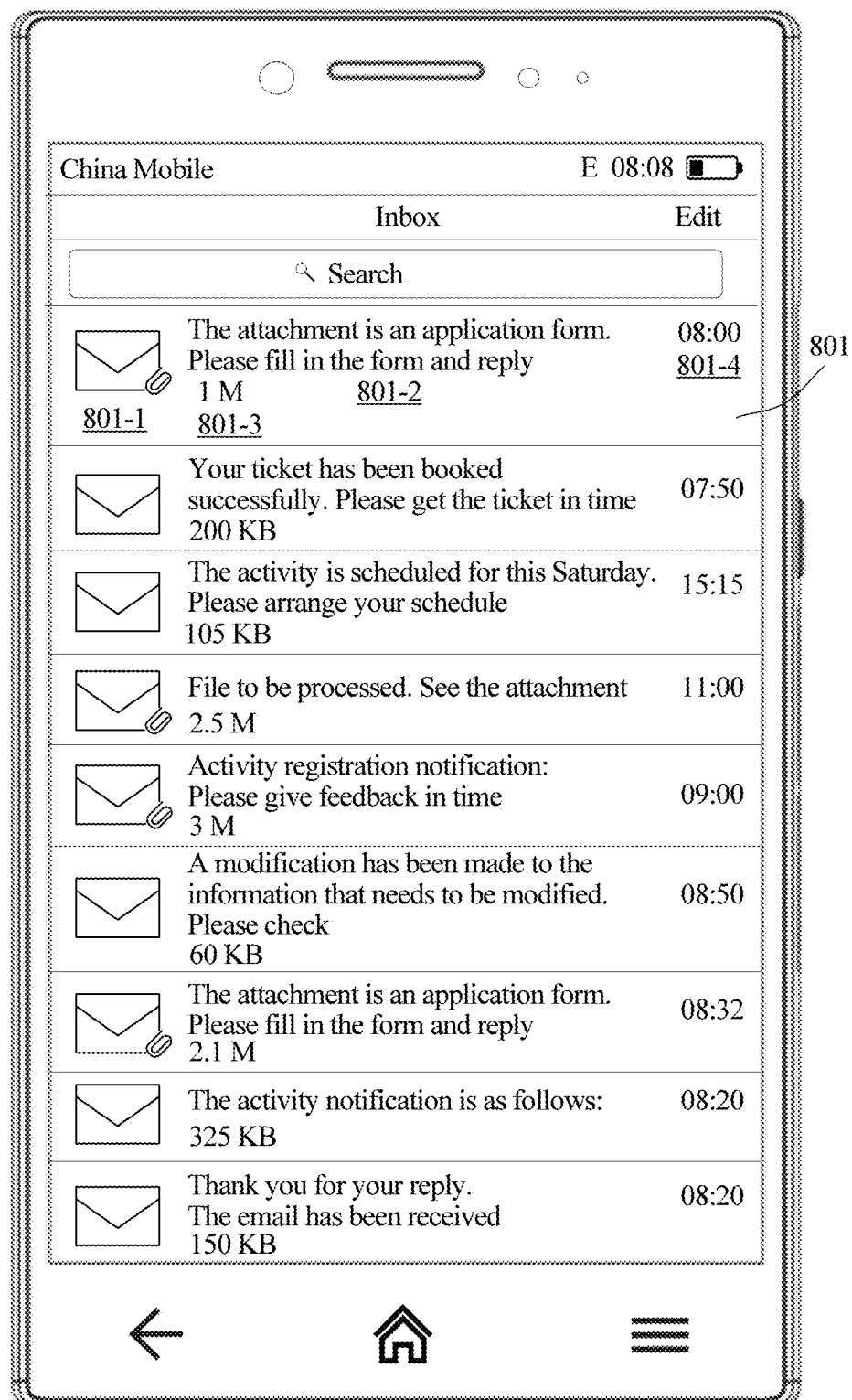
FIG. 8A to FIG. 8E are schematic diagrams of a series of graphical user interfaces displayed in Email of an electronic device according to some embodiments.
Figure 8B:
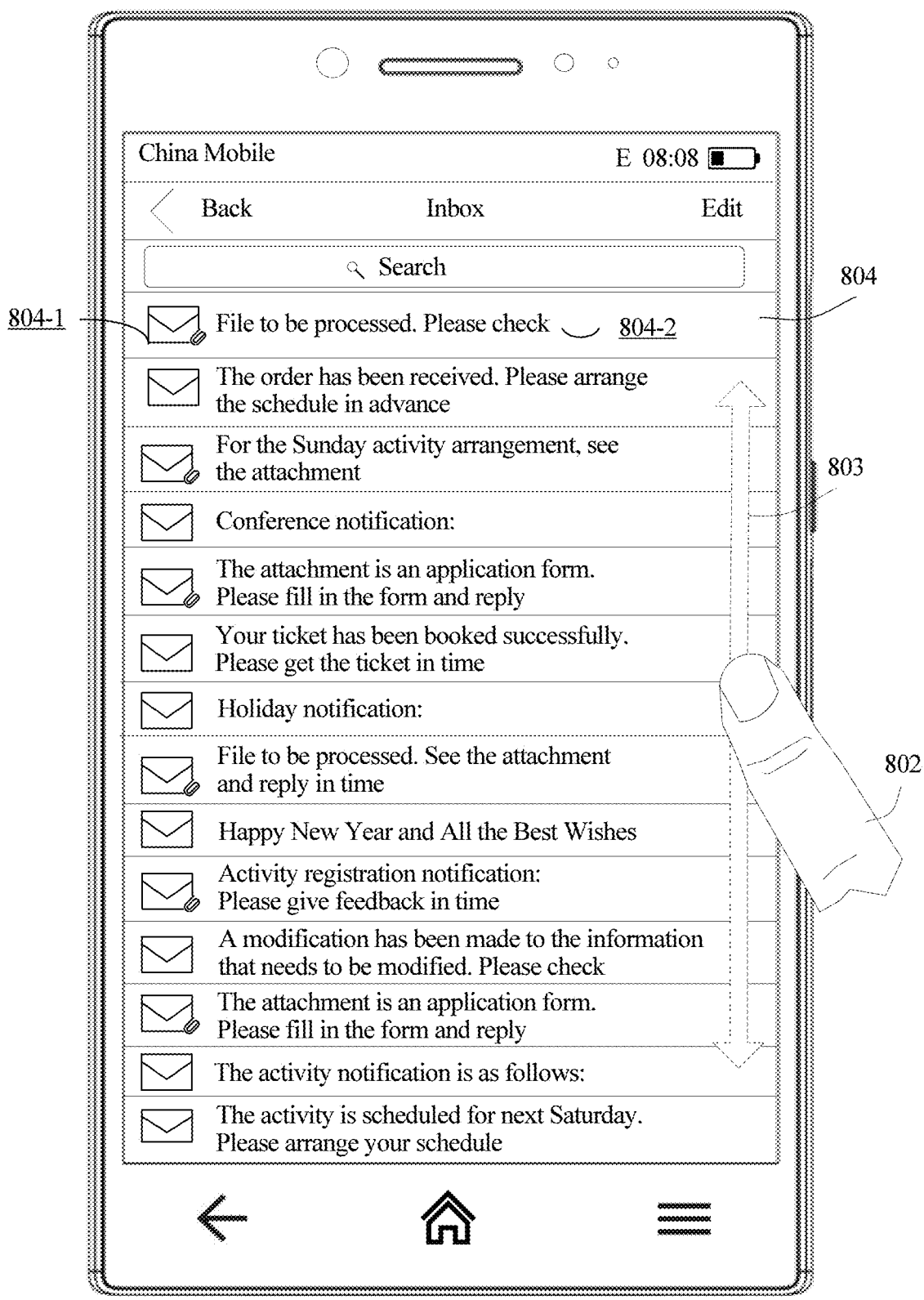

The electronic device 100 detects a touch operation of a finger of a user on the touchscreen 115, and in response to the touch operation, the electronic device 100 opens the Email App represented by an icon 404 in FIG. 4. A home page of opened Email is shown in FIG. 8A. In the first GUI, a status bar in the upper part is displayed, and a plurality of emails are further displayed. The plurality of emails may be considered as an email list, and the email list includes rows of emails. All the emails may have a same display size on the touchscreen 115, and a same quantity of interface elements may be displayed in all the emails. A plurality of interface elements are displayed in each email. For example, an email 801 includes an icon (801-1), a subject (801-2), a size (801-3), and a received time (801-4) of the email. The electronic device 100 detects a first gesture 803 of the finger 802 of the user on the touchscreen 115, and displays a second GUI of the Email App on the touchscreen 115 in response to the first gesture 803, as shown in FIG. 8B. In the second GUI, more emails than those in the first GUI are displayed. All the emails have a same display size on the touchscreen 115, and a same quantity of interface elements may be displayed in all the emails. Each email includes fewer interface elements than those in FIG. 8A. For example, an email 804 includes two interface elements: an icon (804-1) and a subject (804-2) of the email. In the case of the first gesture 803, the user needs to quickly search for a related email. Therefore, as many emails as possible are displayed on the touchscreen 115, so that the user can quickly find the related email. In addition, in FIG. 8B, because all the emails have a same display size on the touchscreen 115, more emails are displayed in FIG. 8B, and the display region (namely, the display) of the touchscreen 115 is fixed, a display size of each email in FIG. 8B is less than a display size of each email in the first GUI in FIG. 8A. In addition, a quantity of interface elements displayed in each email is less than a quantity of interface elements displayed in each email in FIG. 8A.

Figure 8C:
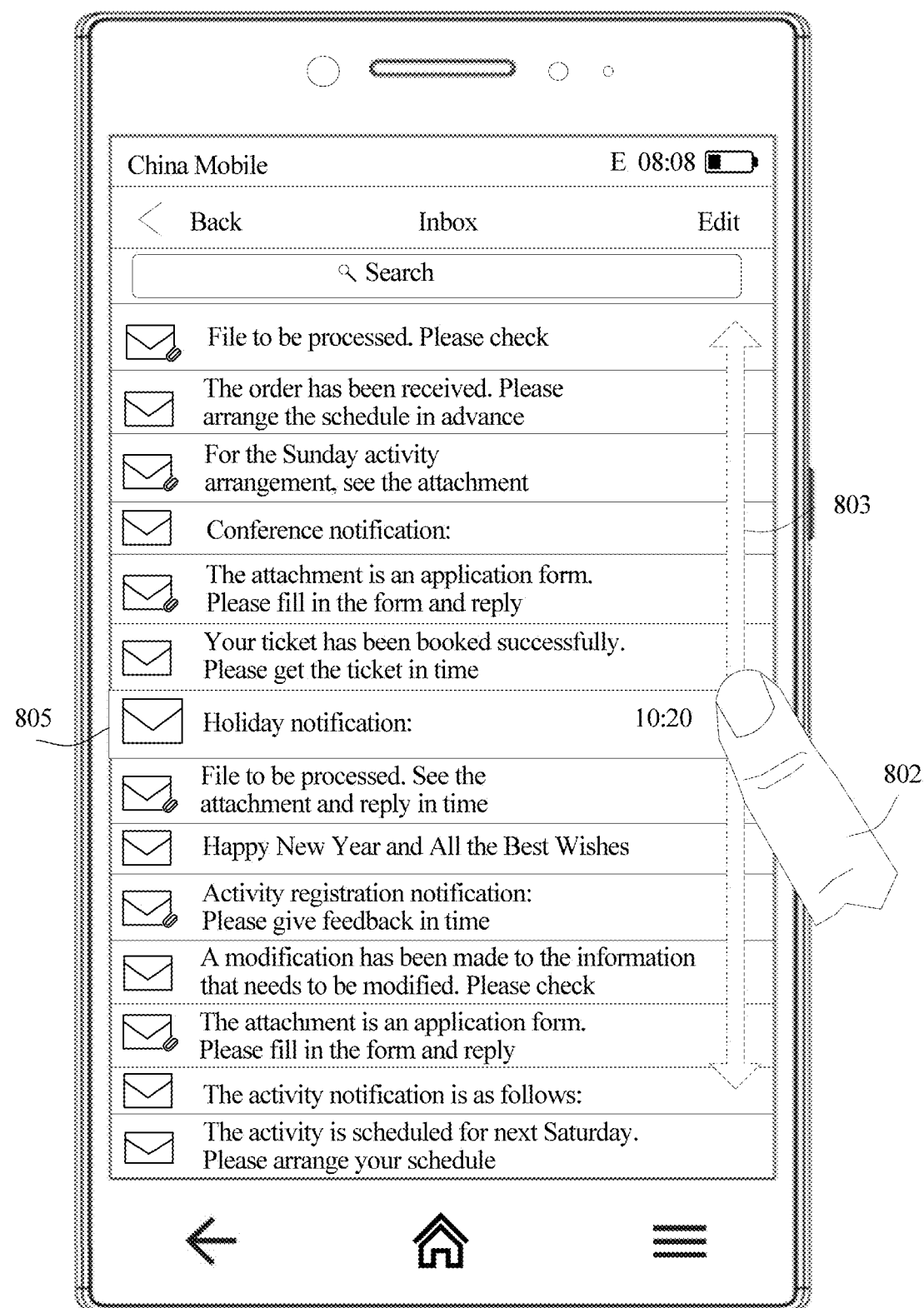

In some embodiments of this application, in the second GUI, an email 805 touched by the finger 802 of the user may be enlarged for display. For example, as shown in FIG. 8C, the email 805 that is currently touched by the finger 802 of the user is enlarged for display, and more interface elements are displayed in the email 805 that is enlarged for display: an icon 805-1, a subject (805-2), and a received time (805-3) of the email. Interface elements in another email that is not enlarged include only an icon and a subject of the email. Such a display processing manner further helps the user quickly search for a related email. In addition, in FIG. 8C, because the email 805 is enlarged for display, two emails adjacent to the email 805 may be partially blocked, so that a quantity of emails displayed in FIG. 8C is the same as a quantity of emails displayed in FIG. 8B.

In some other embodiments of this application, a plurality of entries in the Email App may be displayed on the touchscreen 115 through scrolling in response to a velocity of the first gesture 803. A graphical user interface displayed through scrolling may have a same layout as an entry in the second GUI and an element interface in the entry at each moment. Duration of the scrolling display may be determined based on the velocity of the first gesture 803.

Figure 8D:
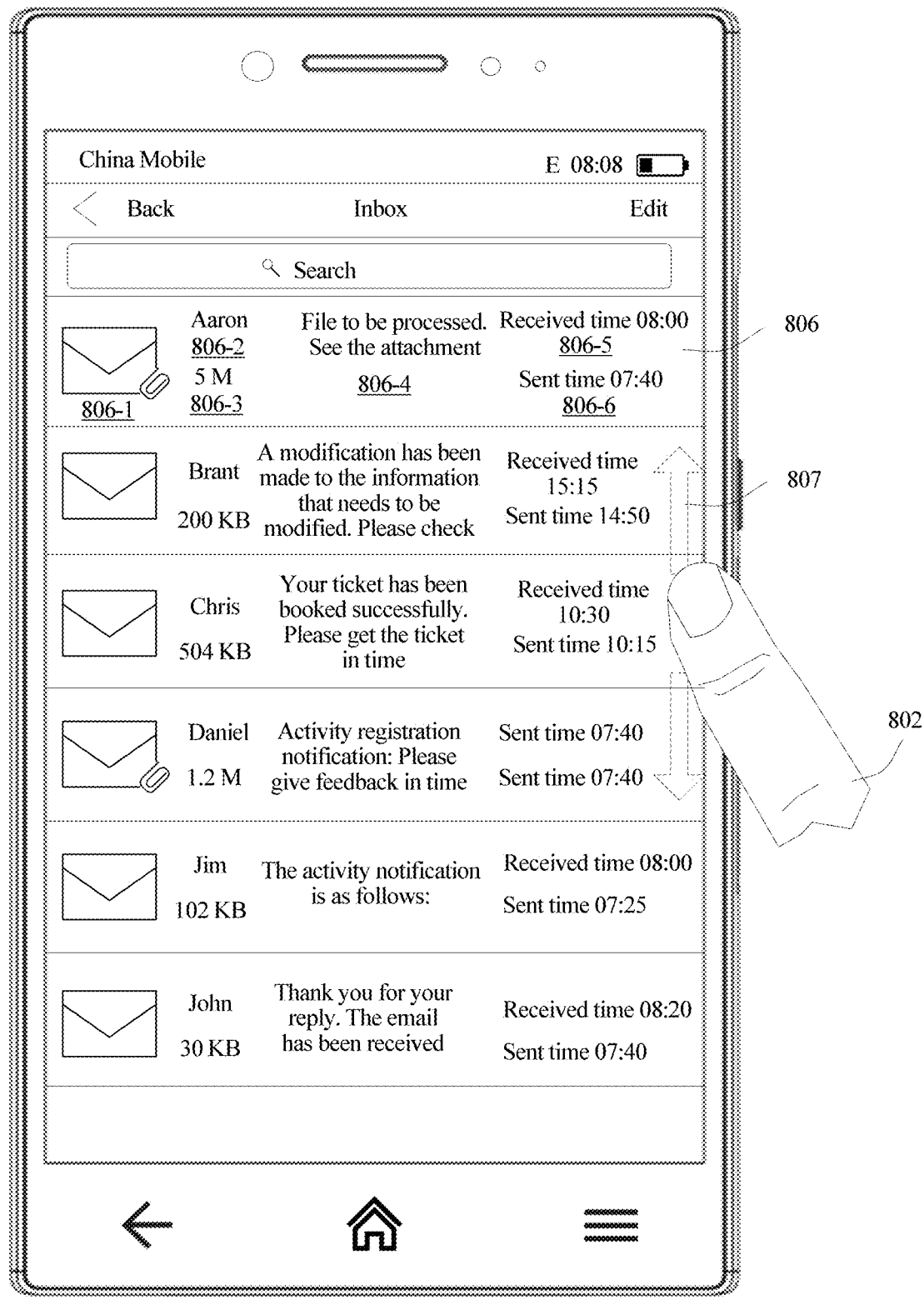

When detecting a second gesture 807 of the finger 802 of the user on the touchscreen 115, the electronic device 100 displays a third GUI of the Email App on the touchscreen 115 in response to the second gesture 807, as shown in FIG. 8D. A velocity of the second gesture 807 may be less than the velocity of the first gesture 803, and this indicates that the user is currently slowly searching for an email. More details of each email are displayed in the third GUI. As shown in FIG. 8D, a quantity of emails displayed in the third GUI is less than a quantity of emails displayed in FIG. 8A, FIG. 8B, and FIG. 8C, and all the emails may have a same display size on the touchscreen 115. In addition, the size of the display region (namely, the display) of the touchscreen 115 is fixed. In this case, a display size of each email in FIG. 8D is greater than a display size of each email in FIG. 8A and FIG. 8B. In addition, a quantity of interface elements displayed in each email in FIG. 8D is greater than a quantity of interface elements displayed in FIG. 8A and FIG. 8B. This further helps the user carefully search for an email. For example, a plurality of interface elements are displayed in an email 806: an icon (806-1), a sender name (806-2), a size (806-3), a subject (806-4), a received time (806-5), and a sent time (806-6) of the email. Same interface elements may also be displayed in another email.

Figure 8E:
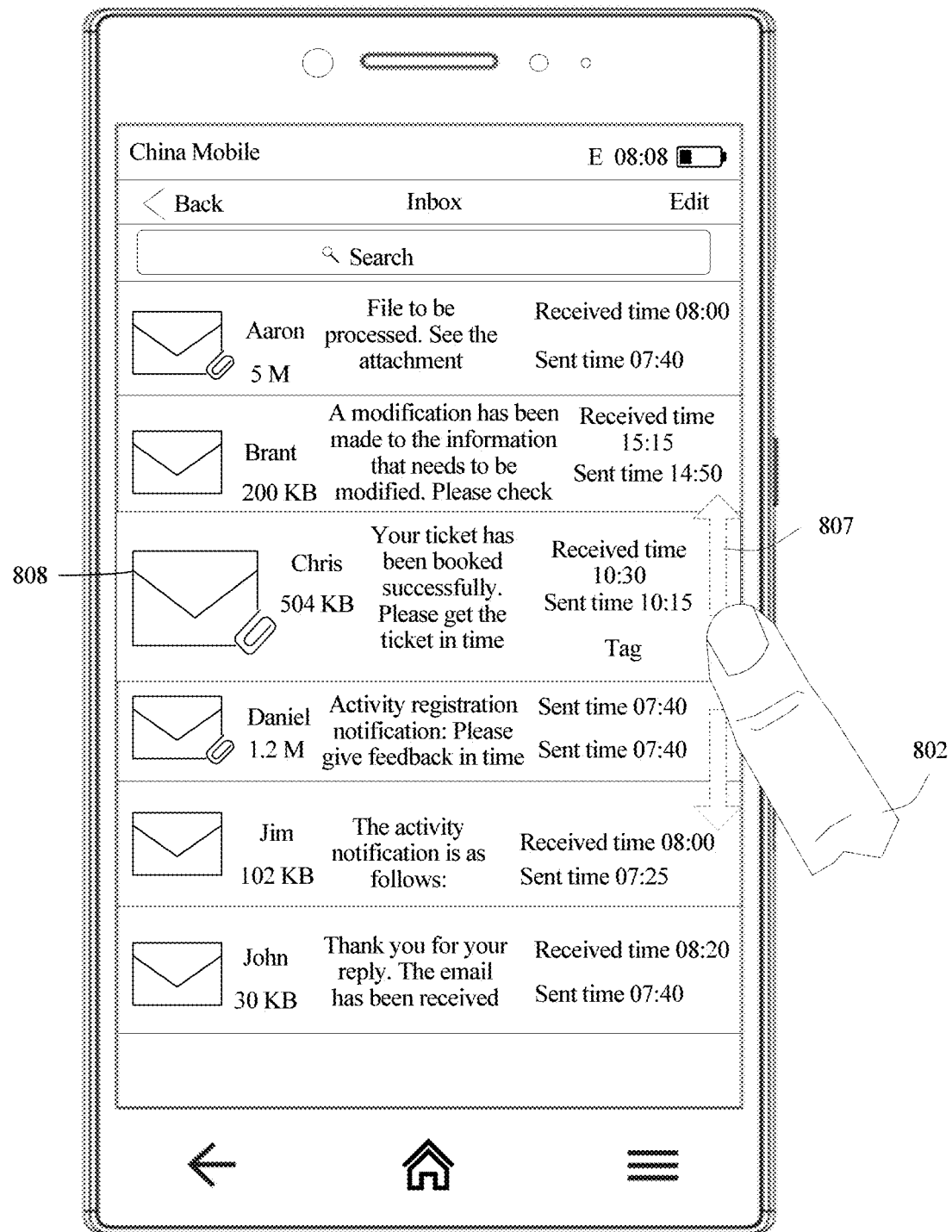

In some embodiments of this application, in the third GUI, an email 808 touched by the finger 802 of the user may be enlarged for display. As shown in FIG. 8E, the email 808 touched by the finger 802 of the user is enlarged for display. When the email 808 is enlarged for display, more interface elements may be displayed, so that the user can conveniently view the interface elements. The user may also tap the enlarged email, to display detailed content of the email on the entire touchscreen 115. In addition, in FIG. 8E, because the email 808 is enlarged for display, two emails adjacent to the email 808 may be partially blocked, so that a quantity of emails displayed in FIG. 8E is the same as a quantity of emails displayed in FIG. 8D.

Example Graphical User Interfaces Related to Settings

Figure 9A:
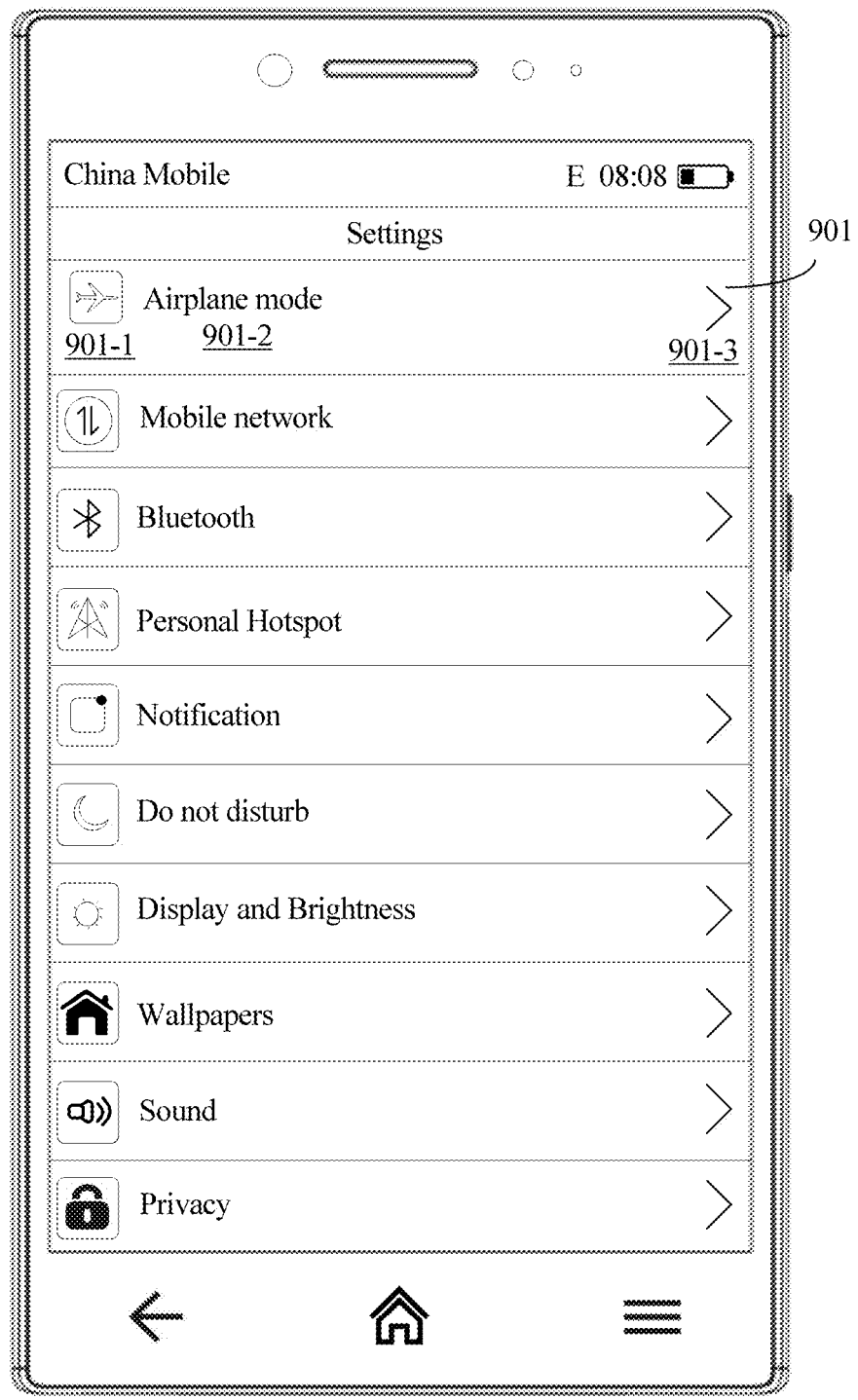
FIG. 9A to FIG. 9E are schematic diagrams of a series of graphical user interfaces displayed in Settings of an electronic device according to some embodiments.
Figure 9B:
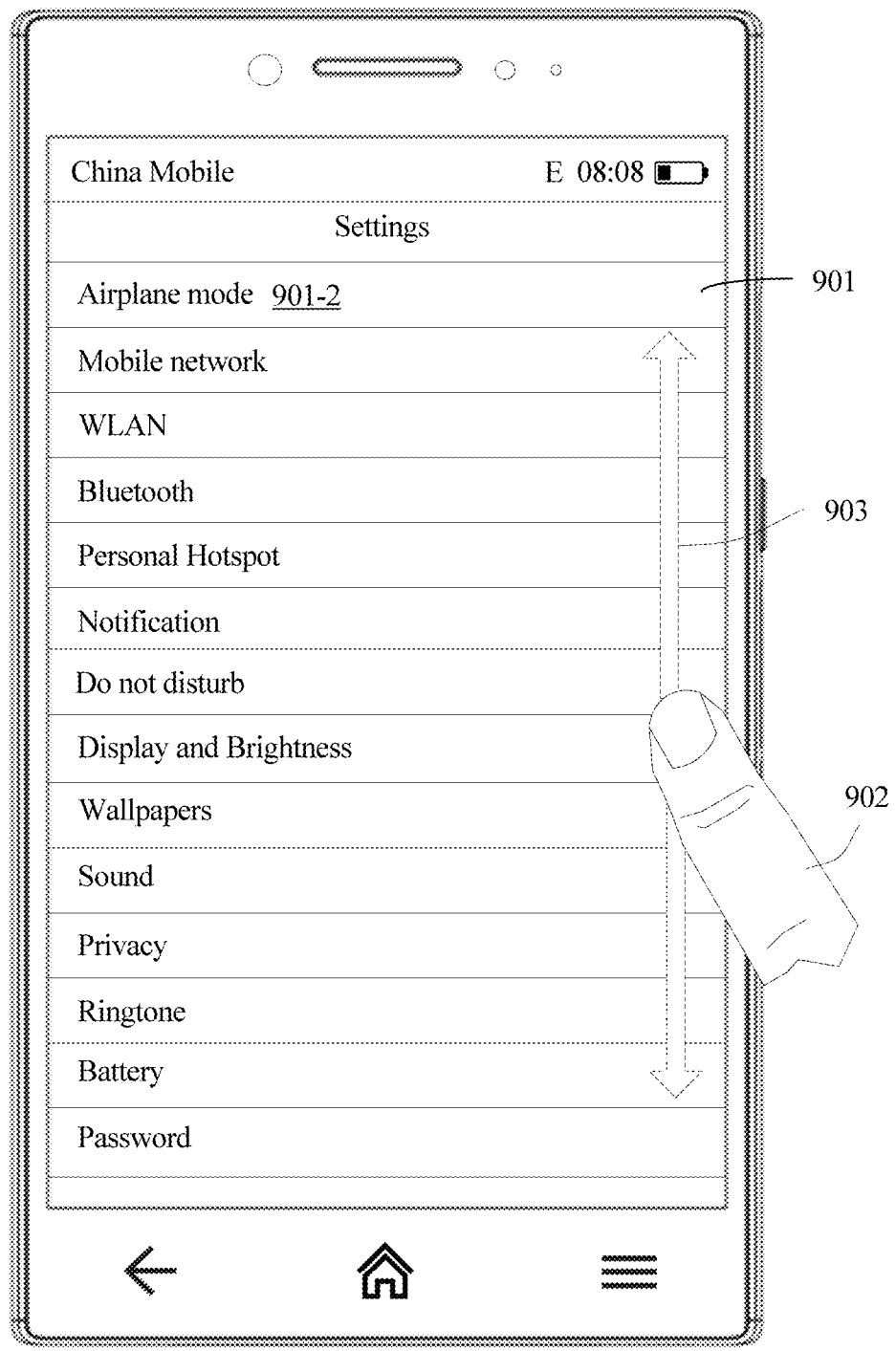

The electronic device 100 detects a touch operation of a finger of a user on the touchscreen 115, and in response to the touch operation, the electronic device 100 opens Settings represented by an icon 406 in FIG. 4. A home page of Settings is shown in FIG. 9A. On the home page, a status bar in the upper part is displayed, a plurality of setting menus may be displayed in Settings, and each setting menu may include a plurality of interface elements. For example, a setting menu 901 includes an icon (901-1), a menu name (901-2), and an icon (901-3) for entering a submenu. In FIG. 9A, all the setting menus may have a same display size on the touchscreen 115, and a same quantity of interface elements may be displayed in all the setting menus. The electronic device 100 detects a first gesture 903 of the finger 902 of the user on the touchscreen 115, and displays a second GUI of Settings on the touchscreen 115 in response to the first gesture 903, as shown in FIG. 9B. In the second GUI, more setting menus than those in FIG. 9A are displayed on the touchscreen 115, all the setting menus may have a same display size, and a same quantity of interface elements may be displayed in all the setting menus. Fewer interface elements than those in FIG. 9A are displayed in each setting menu. In other words, a quantity of interface elements displayed in each setting menu in FIG. 9B is less than a quantity of interface elements displayed in each setting menu in FIG. 9A. For example, only the menu name (901-2) is displayed in the setting menu 901 in FIG. 9B, but the icon (901-1), the menu name (901-2), and the icon (901-3) for entering a submenu are displayed in the setting menu 901 in FIG. 9A. In the second GUI, all the setting menus may have a same display size on the touchscreen 115, and a same quantity of interface elements may be displayed in all the setting menus. In addition, in FIG. 9B, because all the setting menus have a same display size on the touchscreen 115, more setting menus are displayed in FIG. 9B, and the display region (namely, the display) of the touchscreen 115 is fixed, a display size of each setting menu in FIG. 9B is less than a display size of each setting menu in the first GUI in FIG. 9A.

Figure 9C:
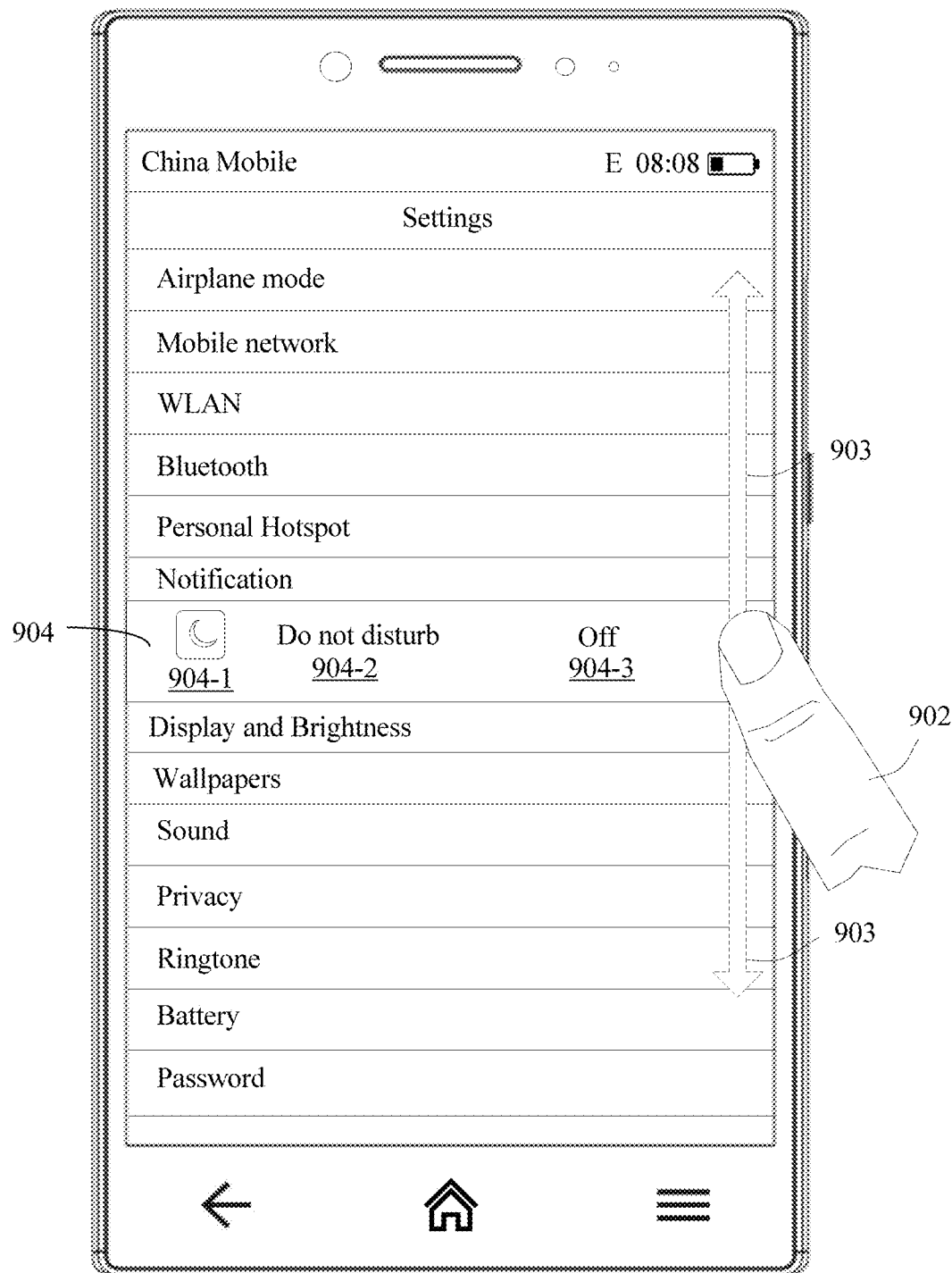

In some embodiments of this application, in the second GUI, a setting menu 904 touched by the finger 902 of the user may be enlarged for display. For example, as shown in FIG. 9C, the setting menu 904 (namely, Do not disturb) that is currently touched by the finger 902 of the user is enlarged for display, and more interface elements are displayed in the setting menu 904 that is enlarged for display: an icon (904-1), a menu name (904-2), and a quick operation icon (904-3). An interface element displayed in another setting menu that is not enlarged includes only the menu name.

Such a display processing manner further helps the user quickly search for a related setting menu. In addition, in FIG. 9C, because the setting menu 904 is enlarged for display, two setting menus (Notification, and Display and Brightness) adjacent to the setting menu 904 may be partially blocked, so that a quantity of setting menus displayed in FIG. 9C is the same as a quantity of setting menus displayed in FIG. 9B.

In some other embodiments of this application, a plurality of entries in the application may be displayed on the touchscreen 115 through scrolling in response to a velocity of the first gesture 903. A graphical user interface displayed through scrolling may have a same layout as an entry in the second GUI and an element interface in the entry at each moment. Duration of the scrolling display may be determined based on the velocity of the first gesture 903.

Figure 9D:
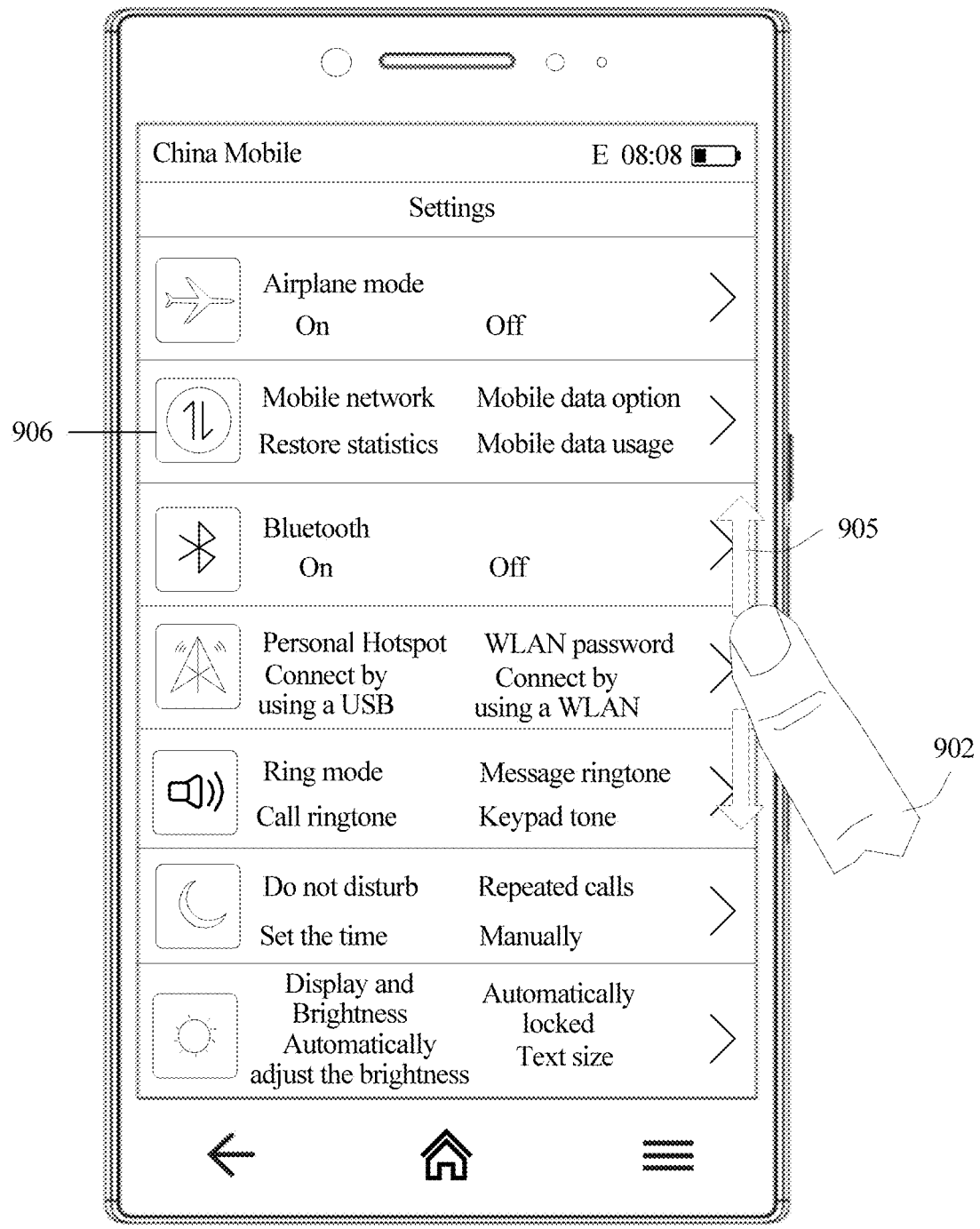

In some other embodiments of this application, the electronic device 100 detects a second gesture 905 of the finger 902 of the user on the touchscreen 115, where a velocity of the second gesture 905 may be less than the velocity of the first gesture 903, and displays a third GUI on the touchscreen 115 in response to the second gesture 905, as shown in FIG. 9D. This indicates that the finger of the user starts to slide slowly, and the user starts to carefully search for a related system setting. In the third GUI, fewer setting menus than those in FIG. 9A, FIG. 9B, and FIG. 9C are displayed, all the setting menus may have a same display size, and a quantity of interface elements displayed in each setting menu is greater than a quantity of interface elements displayed in each setting menu in the second GUI. For example, a setting menu 906 includes a menu icon, a name, and some other menu options (for example, Mobile data option, Restore statistics, and Mobile data usage). Displaying more interface elements helps the user search for a related system setting more quickly. In addition, in FIG. 9D, because all the setting menus have a same display size on the touchscreen 115, fewer setting menus are displayed in FIG. 9D, and the display region (namely, the display) of the touchscreen 115 is fixed, a display size of each setting menu in FIG. 9D is greater than a display size of each setting menu in FIG. 9A, FIG. 9B, and FIG. 9C.

Figure 9E:
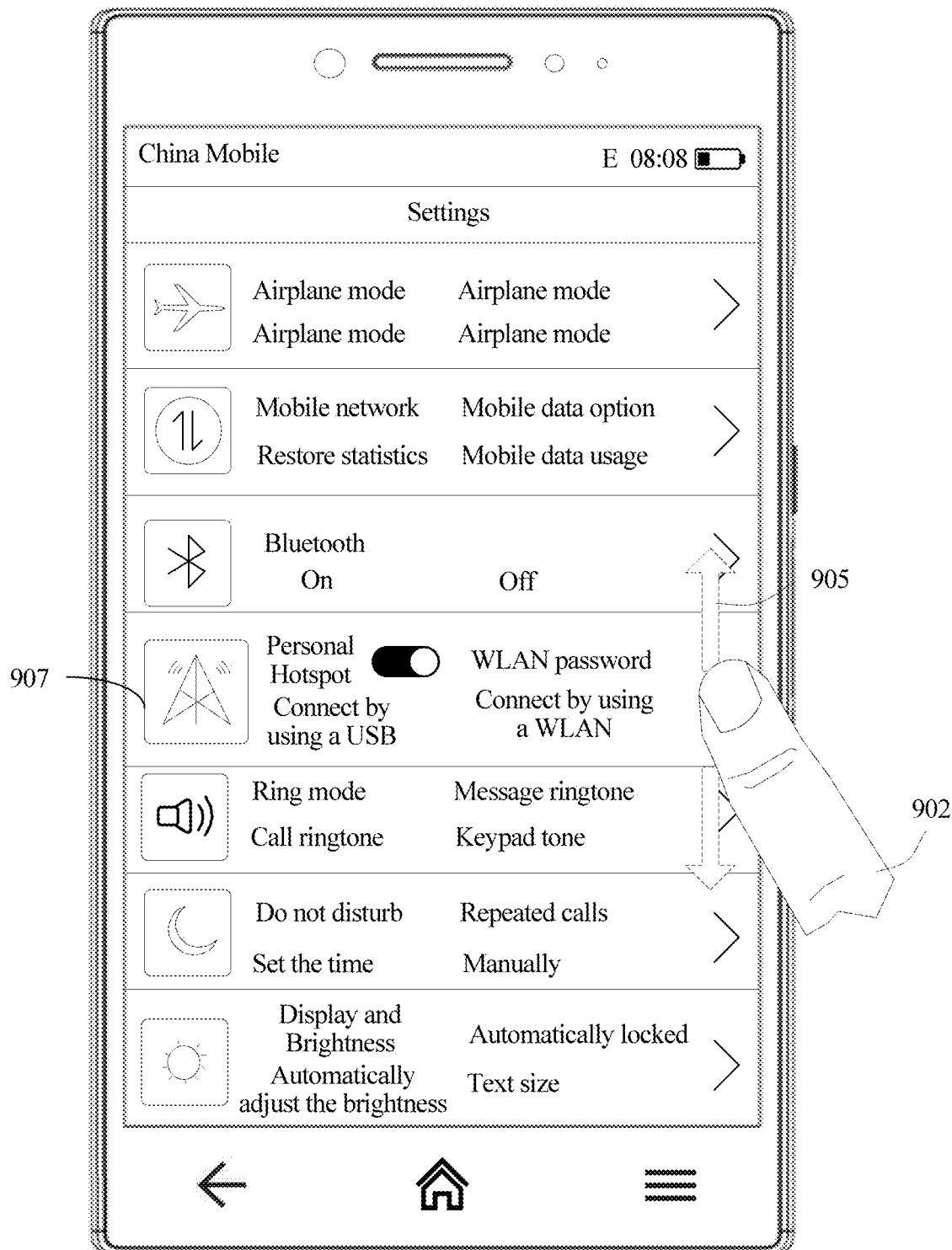

In some other embodiments of this application, in the third GUI, a setting menu 907 touched by the finger 902 of the user may be enlarged for display. As shown in FIG. 9E, more interface elements are displayed in the enlarged setting menu 907. These interface elements include a control and a link, so that the user can directly perform a specific operation in the GUI without entering a submenu for setting, thereby improving user experience. In addition, in FIG. 9E, because the setting menu 907 is enlarged for display, two setting menus adjacent to the setting menu 907 may be partially blocked, so that a quantity of setting menus displayed in FIG. 9E is the same as a quantity of setting menus displayed in FIG. 9D.

Example Graphical User Interfaces Related to Calendar

Figure 10A:
FIG. 10A to FIG. 10D are schematic diagrams of a series of graphical user interfaces displayed in Calendar of an electronic device according to some embodiments.
Figure 10B:
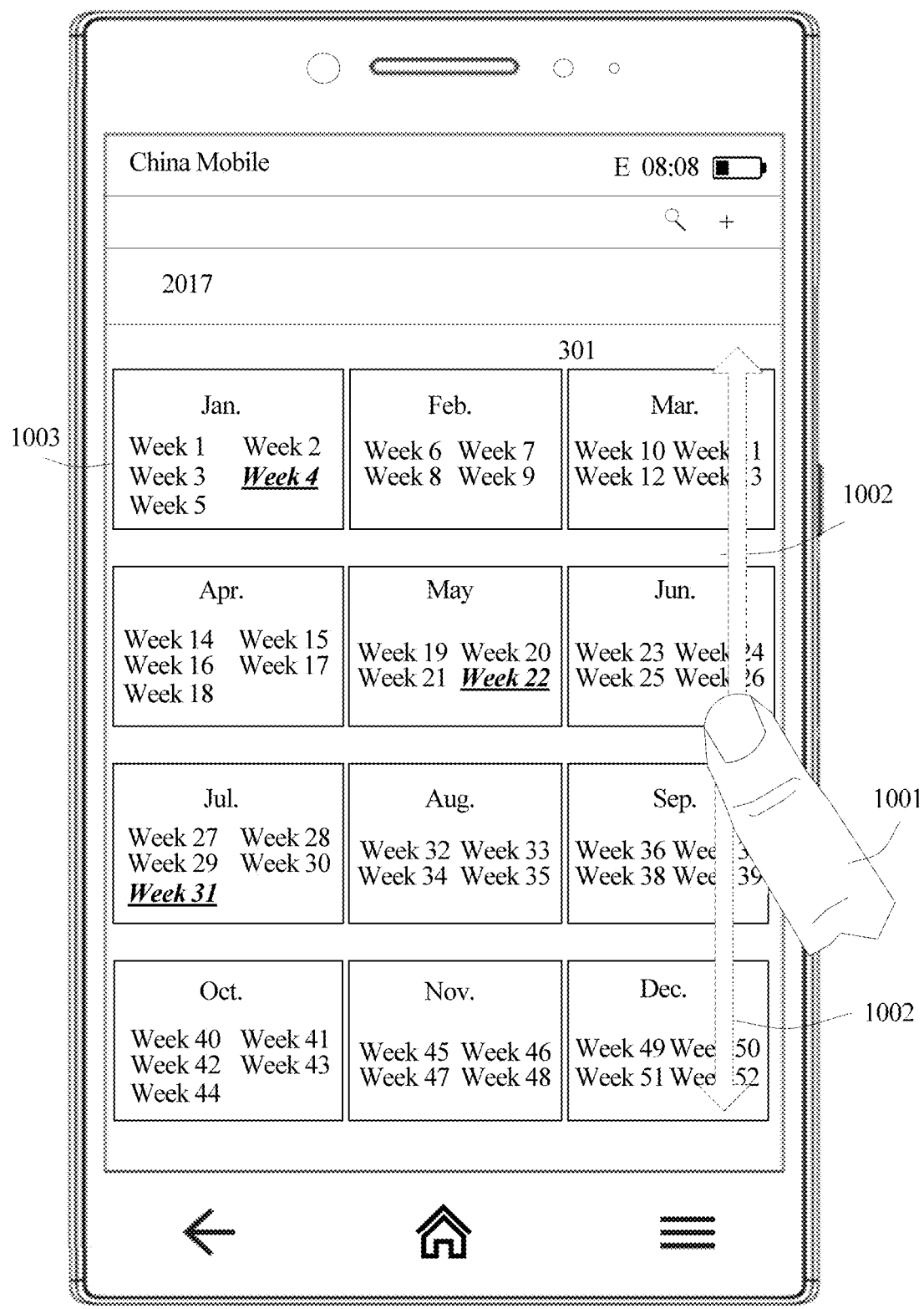

The electronic device 100 detects a touch operation of a finger of a user on the touchscreen 115, and in response to the touch operation, the electronic device 100 opens the Calendar App represented by an icon 405 in FIG. 4. FIG. 10A shows a first GUI of the Calendar App, and a solar calendar in January in 2017 and Chinese lunar calendar are displayed in the first GUI. A first gesture 1002 of the finger 1001 of the user on the touchscreen 115 is detected, and a second GUI of the Calendar App is displayed on the touchscreen 115 in response to the first gesture 1002. As shown in FIG. 10B, because the first gesture 1002 is a quick flick gesture, more months are displayed in the Calendar App. Week calendars are displayed in each month. For example, an interface element 1003 includes a month calendar and also includes week calendars of the month, so that the user can have a quick view. In some other embodiments, a week calendar marked with a calendar event may be further displayed in Calendar. For example, in a month calendar 1003, a fourth week is bold, italic, and underlined, and this indicates that the fourth week has a calendar event. Therefore, the user can quickly and intuitively view some calendar events in a current calendar.

Figure 10C:
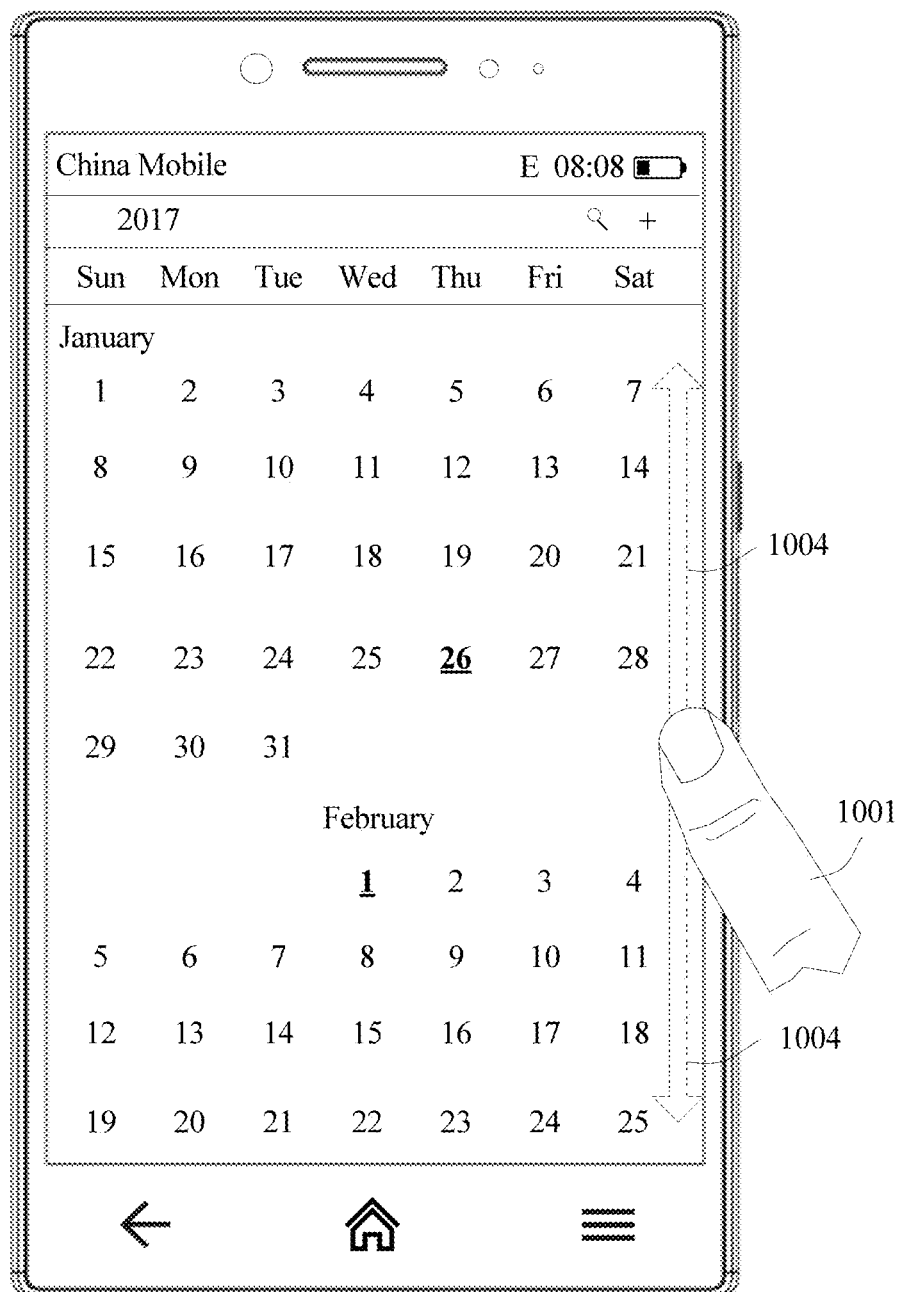
Figure 10D:
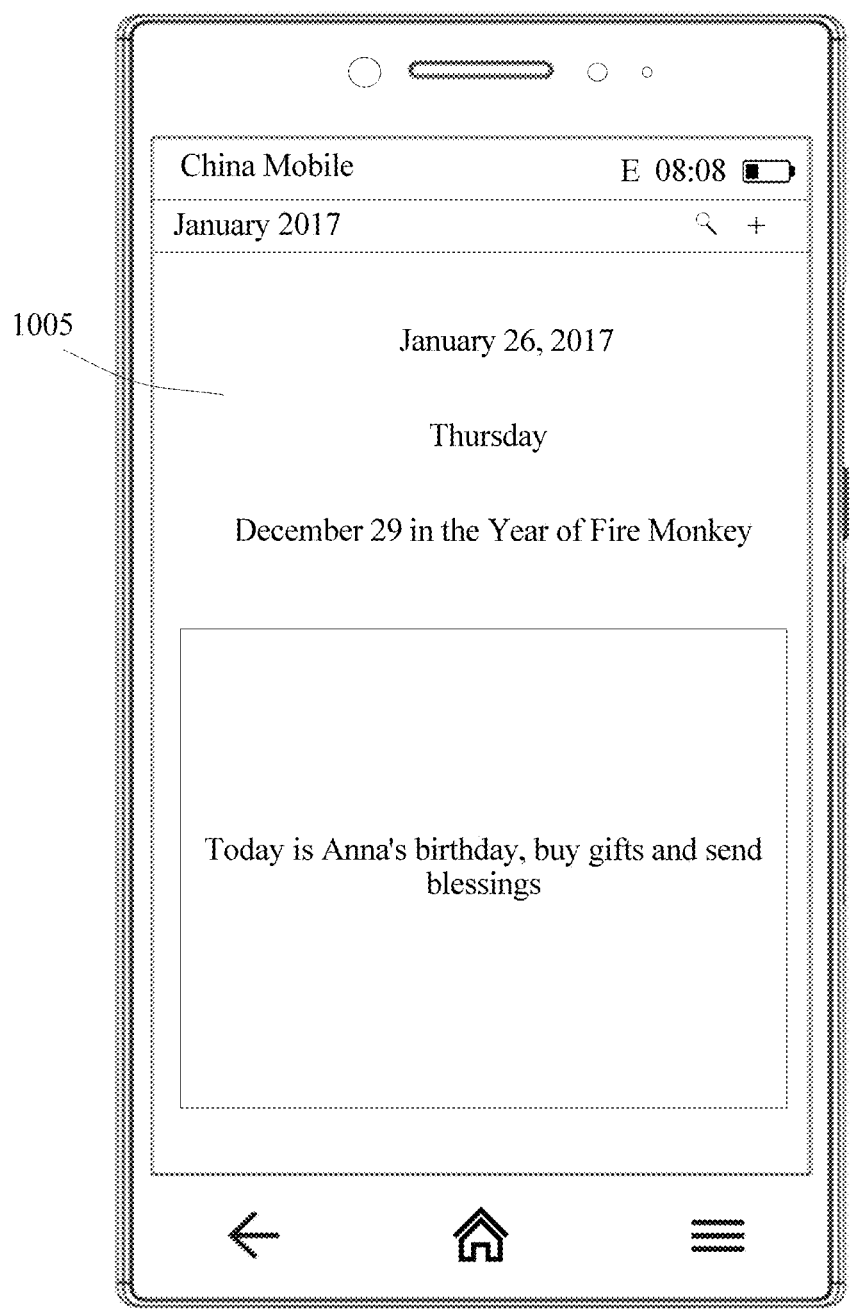

In some embodiments of this application, when detecting a second gesture 1004 of the finger 1001 of the user on the touchscreen 115, the electronic device 100 displays a third GUI of the Calendar App on the touchscreen 115 in response to the second gesture 1004, as shown in FIG. 10C. A velocity of the second gesture 1004 may be less than a velocity of the first gesture 1002. The third GUI is displayed in a month form. A date with a calendar event is bold and underlined. When the finger 1001 of the user stops sliding, the user may tap a related date with a calendar event, so that the related calendar event is displayed on the touchscreen 115. For example, when the user taps 26 January, as shown in FIG. 10D, detailed content 1005 of a calendar event of the date is displayed on the touchscreen 115.

Example graphical User Interfaces Related to File Manager

Figure 11A:
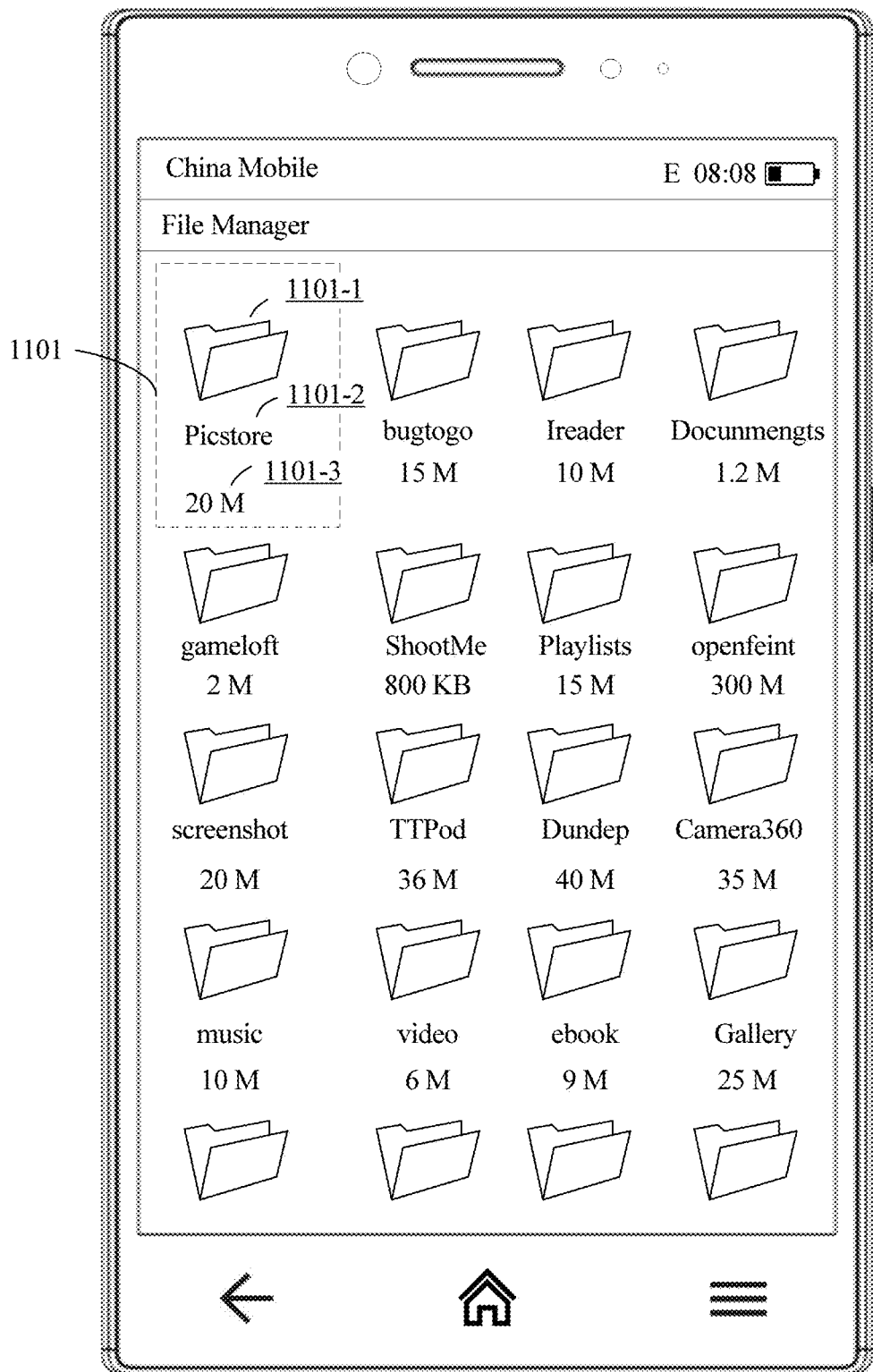
FIG. 11A to FIG. 11D are schematic diagrams of a series of graphical user interfaces displayed in File Manager of an electronic device according to some embodiments.
Figure 11B:
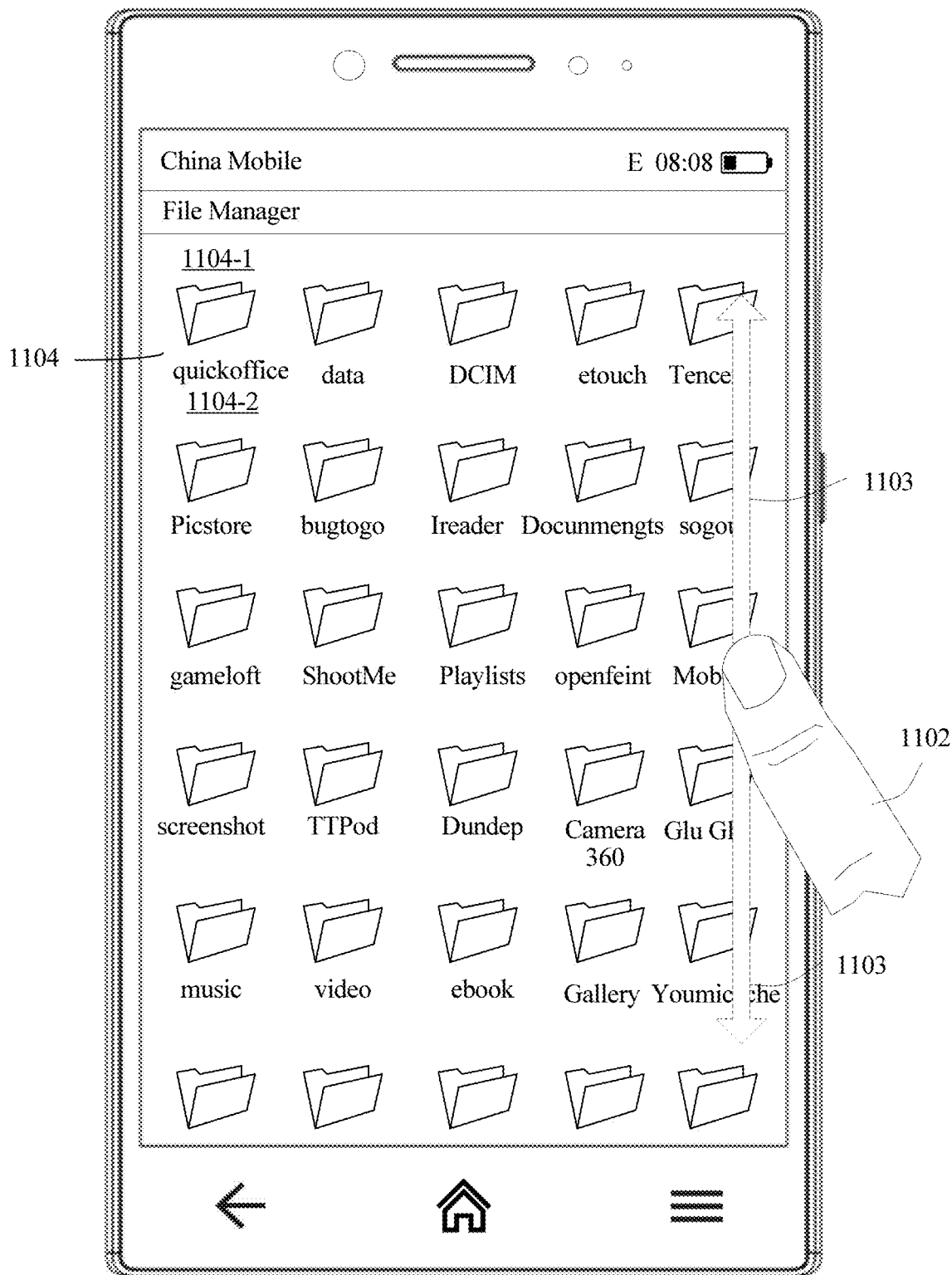

The electronic device 100 detects a touch operation of a finger of a user on the touchscreen 115, and in response to the touch operation, the electronic device 100 opens the File Manager App. FIG. 11A shows a first GUI of the File Manager App. In the first GUI, a status bar in the upper part is displayed, a plurality of folders are further displayed, and all the folders may have a same display size on the touchscreen 115. Each folder includes a plurality of interface elements, and a same quantity of interface elements may be displayed in all the folders. For example, three interface elements are displayed in a folder 1101: an icon 1101-1, a name 1101-2, and a size 1101-3 of the folder. The electronic device 100 detects a first gesture 1103 of the finger 1102 of the user on the touchscreen 115, and displays a second GUI of the File Manager App on the touchscreen 115 in response to the first gesture 1103, as shown in FIG. 11B. In FIG. 11B, all folders may have a same display size, and the size is less than a display size of each folder in FIG. 11A. A quantity of folders displayed in each row is increased, but interface elements displayed in each folder are reduced, and a same quantity of interface elements may be displayed in all the folders. For example, interface elements in a folder 1104 include an icon 1104-1 and a name 1104-2 of the folder, and another folder is displayed in the second GUI in a similar manner. In this way, more folders are displayed on one screen, so that the user can perform a quick search and the like.

In some embodiments of this application, in the second GUI, a folder touched by the finger 1102 of the user may be enlarged for display, and more interface elements may be displayed in the folder that is enlarged for display. Such a display processing manner further helps the user quickly search for a related folder.

Figure 11C:
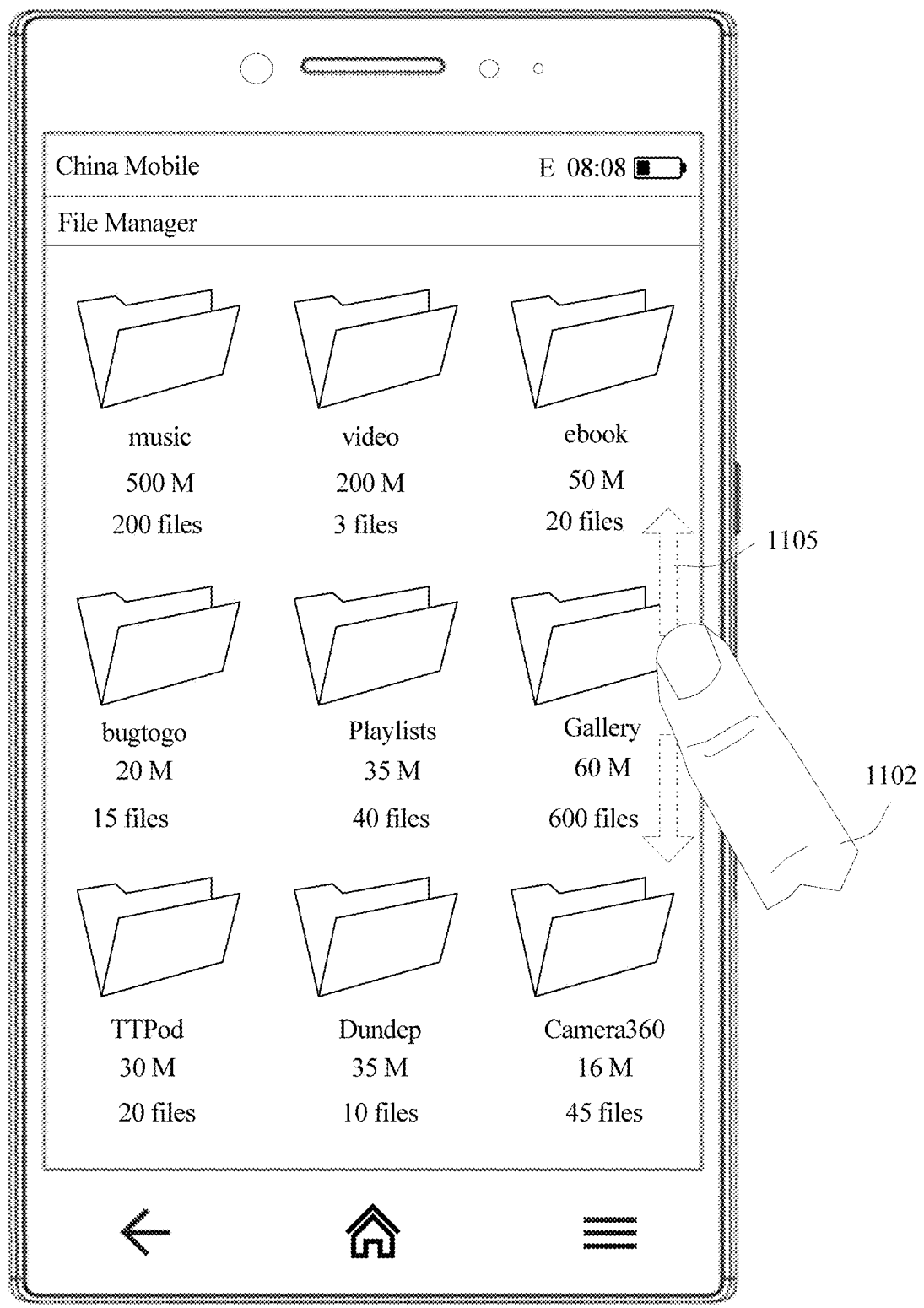

In some other embodiments of this application, the electronic device 100 detects a second gesture 1105 of the finger 1102 of the user on the touchscreen 115, where a velocity of the second gesture 1105 may be less than a velocity of the first gesture 1103, and displays a third GUI on the touchscreen 115 in response to the second gesture 1105, as shown in FIG. 11C. This indicates that the finger 1102 of the user starts to slide slowly, and the user starts to carefully search for a related folder. Because the second gesture 1105 is a slow slide gesture, in the third GUI, all displayed folders are enlarged, all the folders may have a same display size, and a same quantity of interface elements may be displayed in all the folders. More interface elements are displayed in each folder, so that the user can perform a careful search. For example, interface elements such as an icon, a name, a size, and a quantity of files of a "Gallery" folder are displayed in the folder. In other words, a quantity of folders displayed in the third GUI is less than a quantity of folders displayed in the first GUI and the second GUI, and in addition, a quantity of interface elements displayed in each folder in the third GUI is greater than a quantity of interface elements displayed in each folder in the first GUI and the second GUI.

Figure 11D:
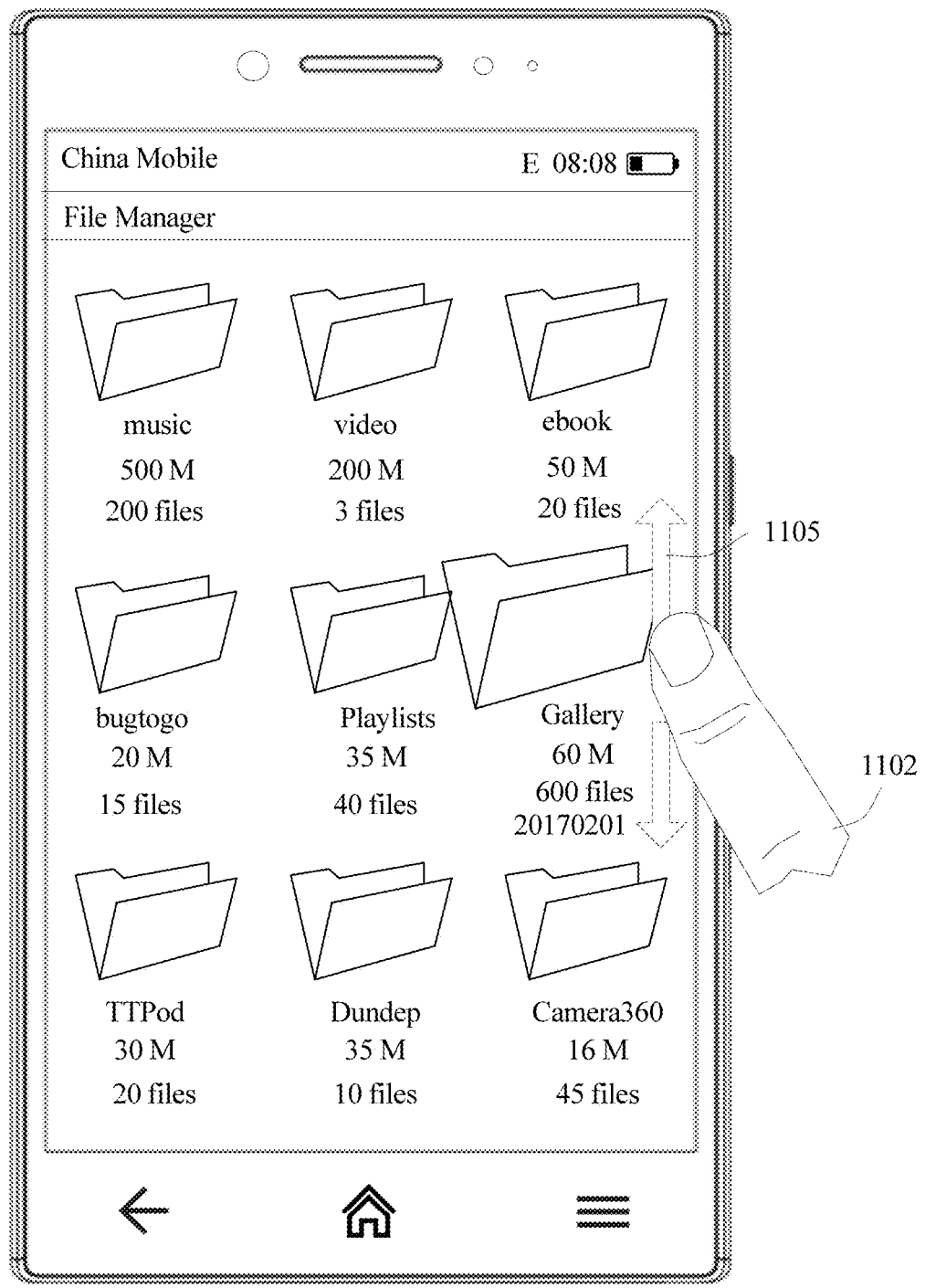

In some other embodiments of this application, in the third GUI, a folder touched by the finger 1102 of the user may be enlarged for display. As shown in FIG. 11D, more interface elements are displayed in the enlarged folder "Gallery", for example, a creation time of the folder is further displayed compared with FIG. 11C, so that the user can perform a further view. Once the user considers that the folder (for example, Gallery) is a folder for which the user needs to search, the user may tap the touchscreen 115 with the finger. In response to the touch operation, the electronic device 100 may open the folder (Gallery), and a graphical user interface of Gallery may be displayed on the touchscreen 115.

Example Graphical User Interfaces Related to App Store

Figure 12A:
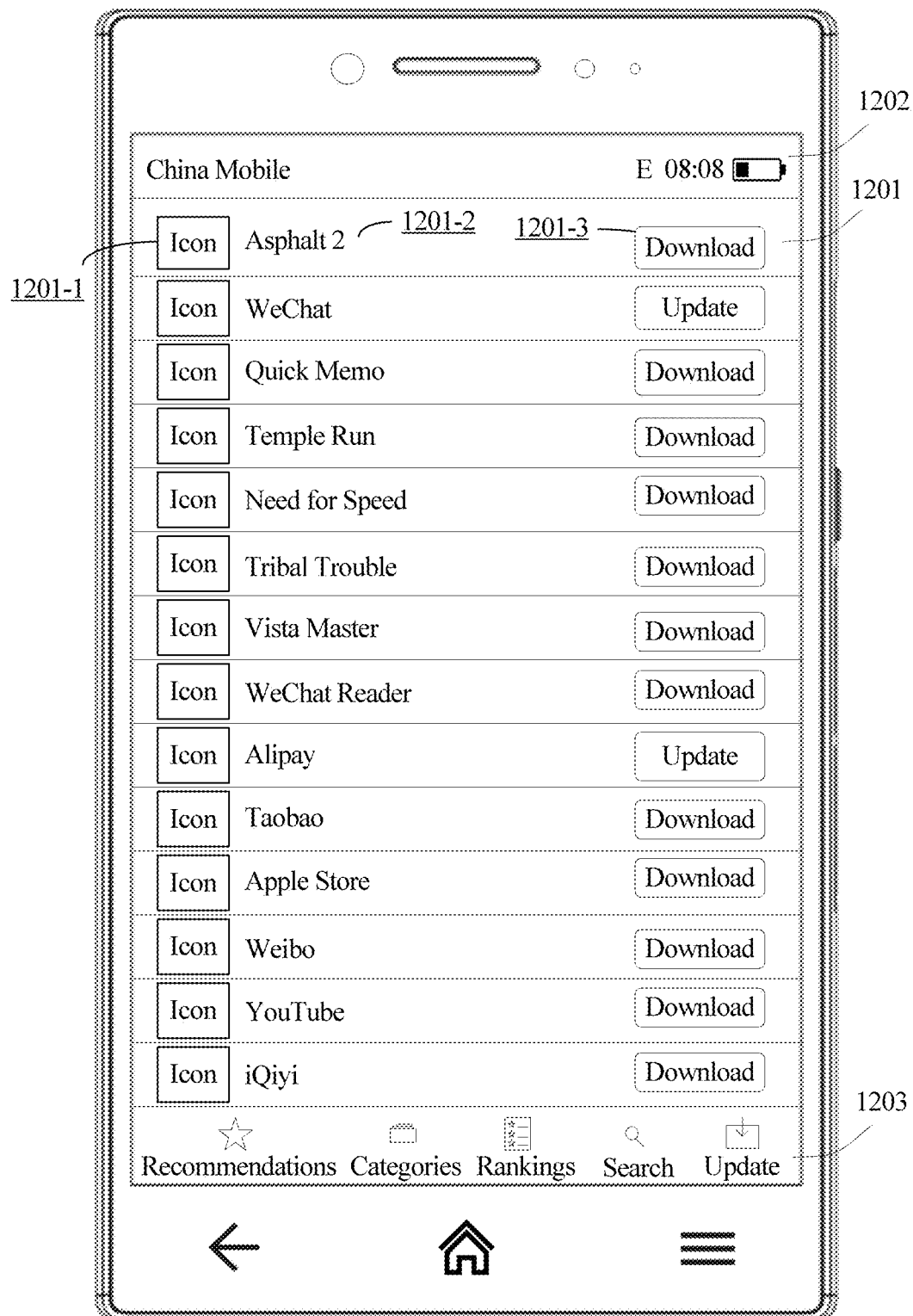
FIG. 12A to FIG. 12E are schematic diagrams of a series of graphical user interfaces displayed in App Store of an electronic device according to some embodiments.

The electronic device 100 detects a touch operation of a finger of a user on the touchscreen 115, and in response to the touch operation, the electronic device 100 opens the App Store App represented by an icon 414 in FIG. 4. As shown in FIG. 12A, the App Store App is mainly used for previewing and downloading various applications. FIG. 12A shows a first GUI of App Store, and in the GUI, a status bar 1202 in the upper part and a dock bar 1203 at the bottom are displayed, and a plurality of application-related entries are further displayed. The plurality of entries may be considered as an application list, and the application list includes rows of applications. For example, an entry 1201 includes many interface elements: an icon 1201-1, a name 1201-2, and a quick operation 1201-3 of the application. All application entries may have a same display size, and a same quantity of interface elements may be displayed in all the entries. For example, three interface elements are displayed in each entry in FIG. 12A.

Figure 12B:
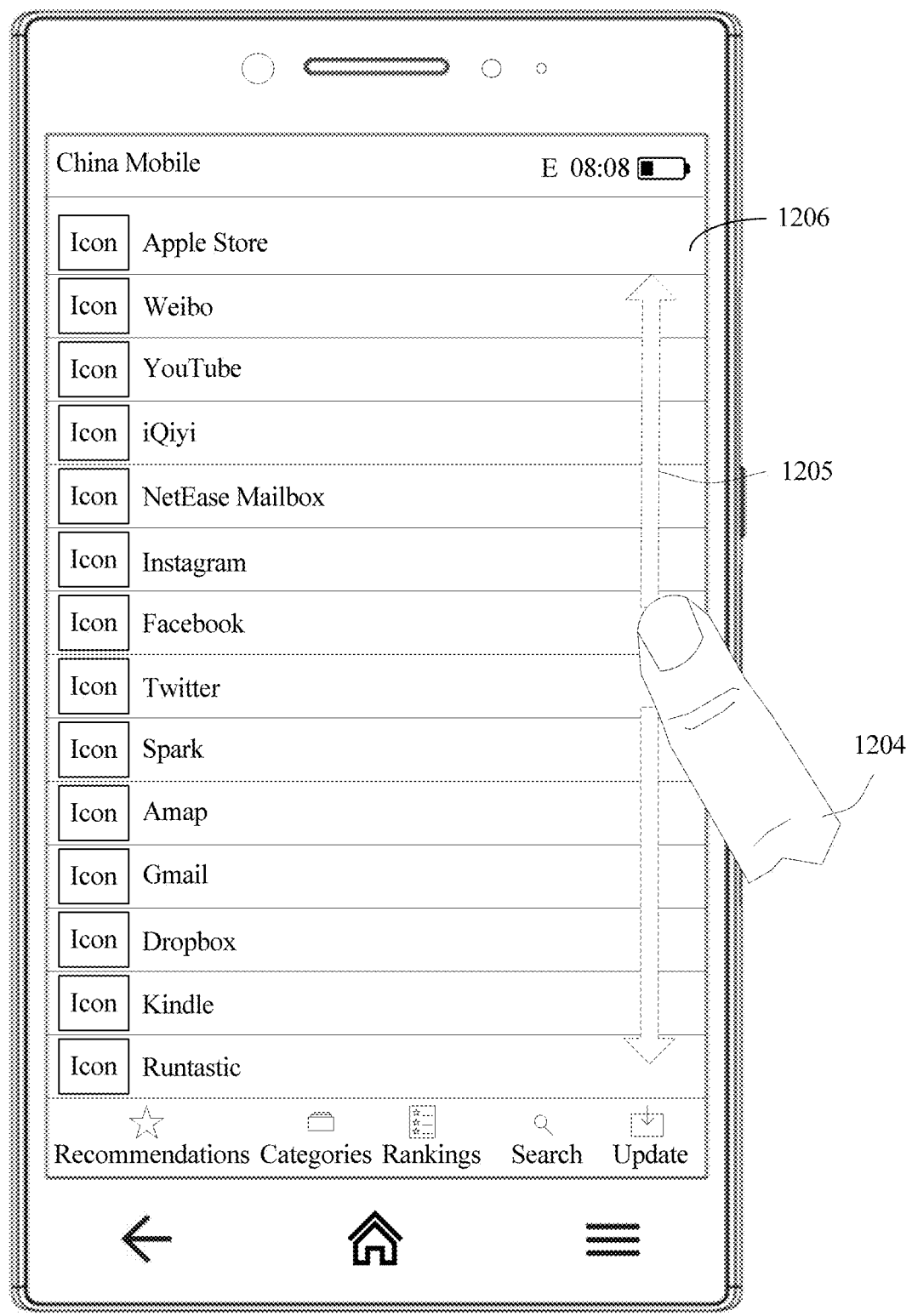

In some embodiments of this application, when detecting a first gesture 1205 of the finger 1204 of the user on the touchscreen 115, the electronic device 100 displays a second GUI of the App Store App on the touchscreen 115 in response to the first gesture 1205, as shown in FIG. 12B. More application entries are displayed in the second GUI, but fewer interface elements are displayed in each application. For example, interface elements displayed in an entry 1206 include only an icon and a name of the application, and are less than those shown in FIG. 12A. In FIG. 12B, all the application entries may have a same display size, and a same quantity of interface elements may be displayed in all the entries. Compared with FIG. 12A, more entries are displayed in FIG. 12B, but fewer interface elements are displayed in each entry in FIG. 12B. In this way, when the user performs a quick slide, the user can focus on a main interface element, so as to find a related application as soon as possible.

Figure 12C:
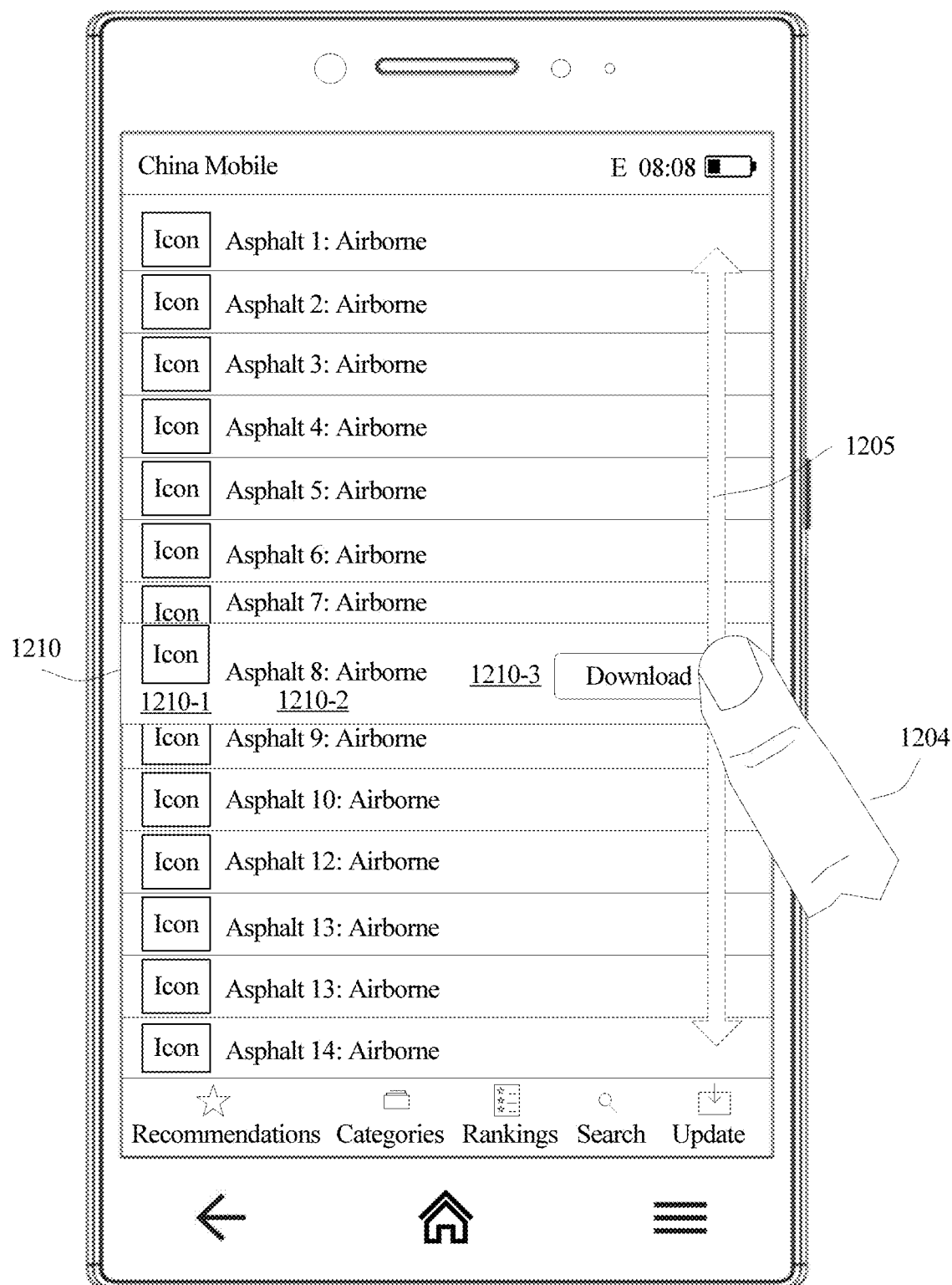

In some other embodiments of this application, in the second GUI, an entry touched by the finger 1204 of the user may be enlarged for display, and more interface elements such as a quick operation may be displayed in the entry that is enlarged for display. As shown in FIG. 12C, an application entry 1210 includes the following interface elements: an icon 1210-1, a name 1210-2, and a quick operation 1210-3 of the application. Such a display processing manner further helps the user quickly search for a related application.

In some other embodiments of this application, a plurality of entries in the App Store may be displayed on the touchscreen 115 through scrolling in response to a velocity of the first gesture 1205. A graphical user interface displayed through scrolling may have a same layout as an entry in the second GUI and an element interface in the entry at each moment. Duration of the scrolling display may be determined based on the velocity of the first gesture 1205.

Figure 12D:
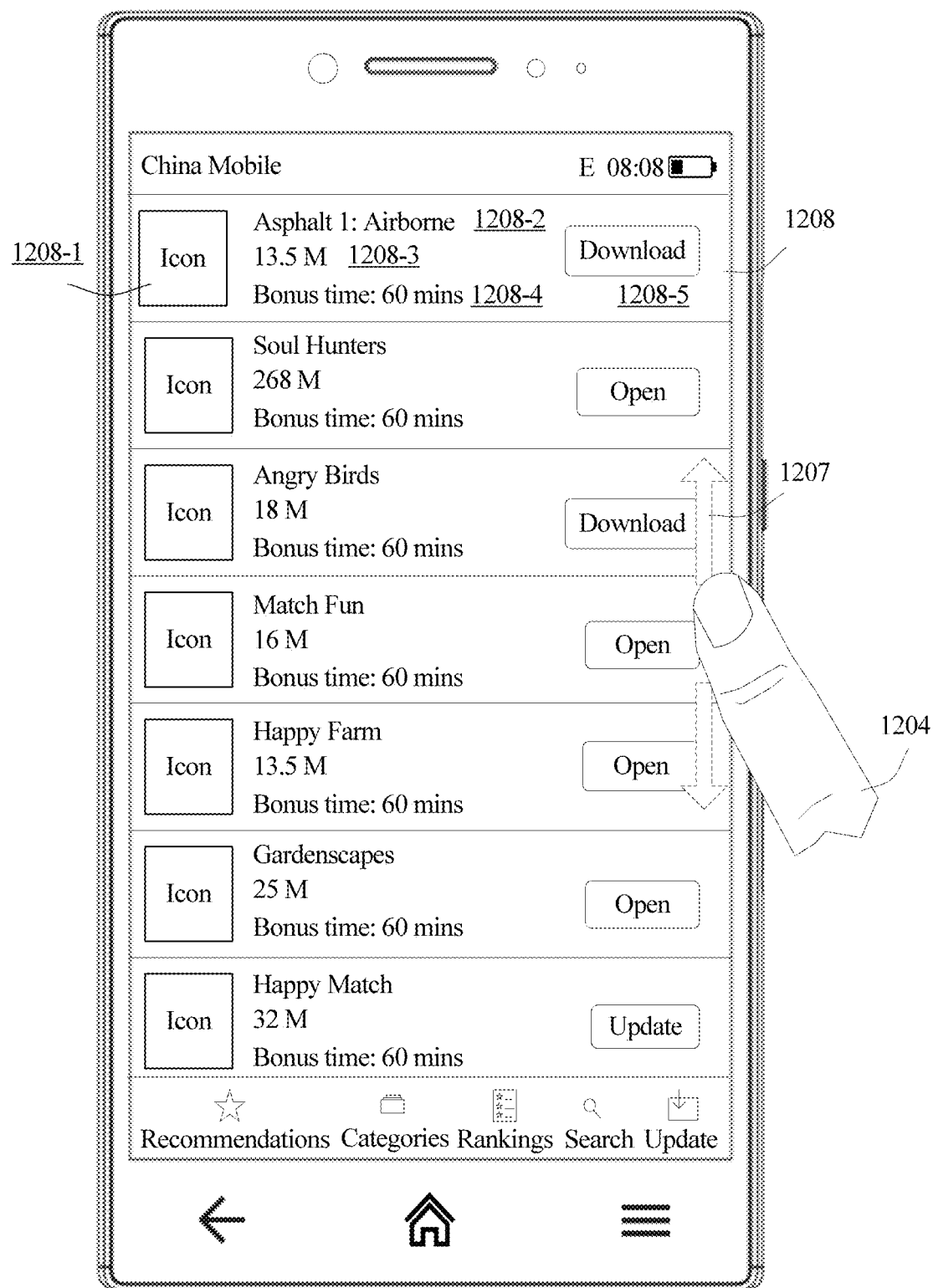

The electronic device 100 detects a second gesture 1207 of the finger 1204 of the user on the touchscreen 115, where a velocity of the second gesture 1207 may be less than the velocity of the first gesture 1205, and displays a third GUI of the App Store App on the touchscreen 115 in response to the second gesture 1207, as shown in FIG. 12D. This indicates that the finger of the user starts to slide slowly, and the user starts to carefully search for a related application. Compared with FIG. 12A, FIG. 12B, and FIG. 12C, in FIG. 12D, fewer application entries are displayed in the third GUI, and more interface elements are displayed in each entry. In addition, in FIG. 12D, all the entries may have a same display size, and a same quantity of interface elements may be displayed in all the entries. For example, an entry 1208 includes a plurality of interface elements: an icon 1208-1, a name 1208-2, a size 1208-3, a remark 1208-4, and a quick operation 1208-5 of the application. In this way, the user can determine, through learning of detailed information of the application, whether the application is content for which the user needs to search. In addition, a quantity of entries displayed in the third GUI is less than a quantity of entries displayed in the first GUI and the second GUI, and in addition, a quantity of interface elements displayed in each entry in the third GUI is greater than a quantity of interface elements displayed in each entry in the first GUI and the second GUI.

Figure 12E:
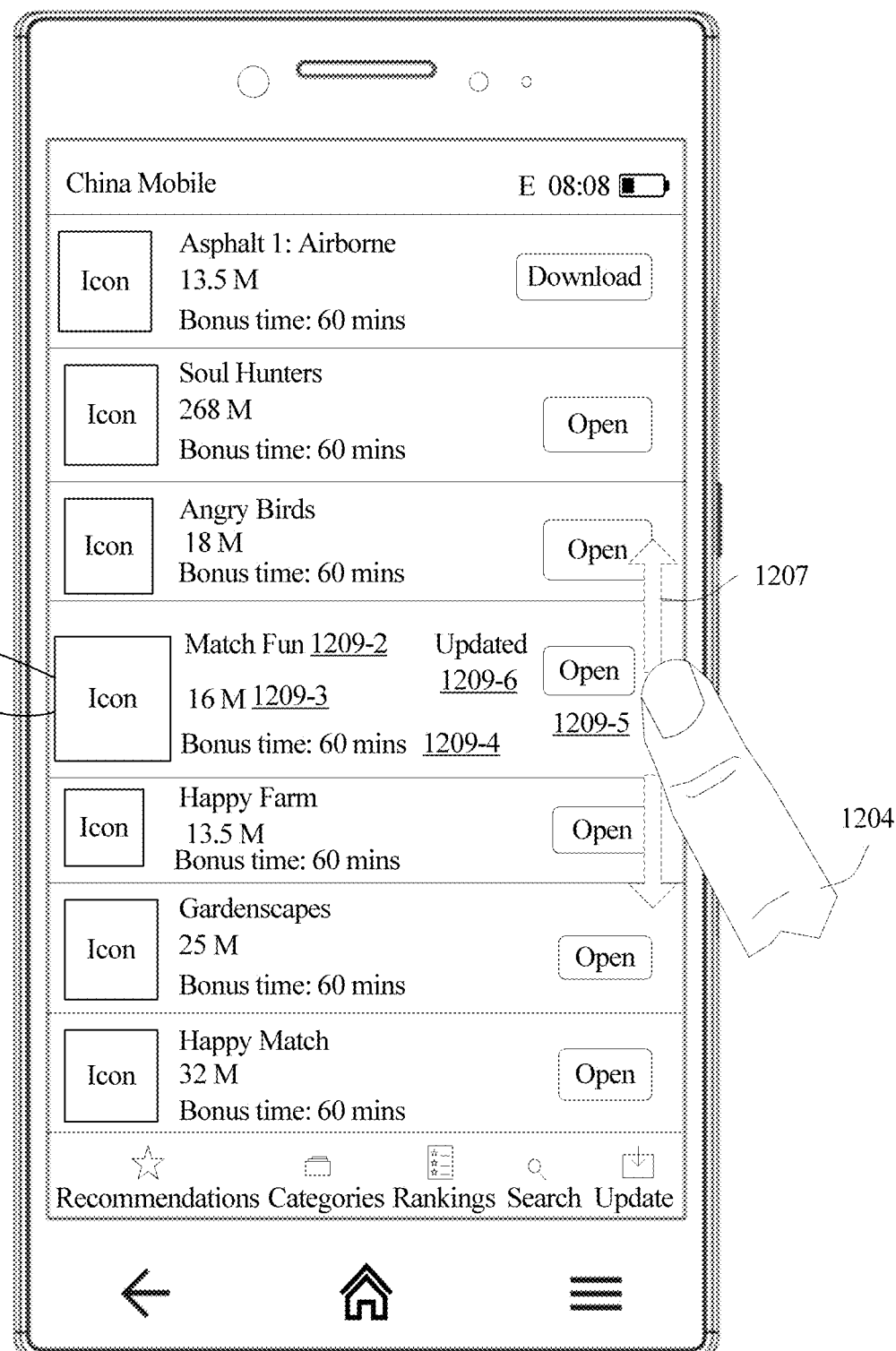

In some other embodiments of this application, an entry touched by the finger 1204 of the user may be enlarged for display in the third GUI. As shown in FIG. 12E, an application touched by the finger 1204 of the user is Match Fun, and an entry of the application is enlarged for display. More interface elements are displayed in the enlarged entry: an icon 1209-1, a name 1209-2, a size 1209-3, a remark 1209-4, a quick operation 1209-5, and status information 1209-6 of the application, so that the user can perform a further view. More interface elements than those in an entry that is not enlarged are displayed in the enlarged entry. When the user taps the icon 1209-5, the application may be opened. In addition, in FIG. 12E, because the entry 1209 is enlarged for display, two entries adjacent to the entry 1209 may be partially blocked, so that a quantity of entries displayed in FIG. 12E is the same as a quantity of entries displayed in FIG. 12D.

Example Graphical User Interfaces Related to Gallery

Figure 13A:
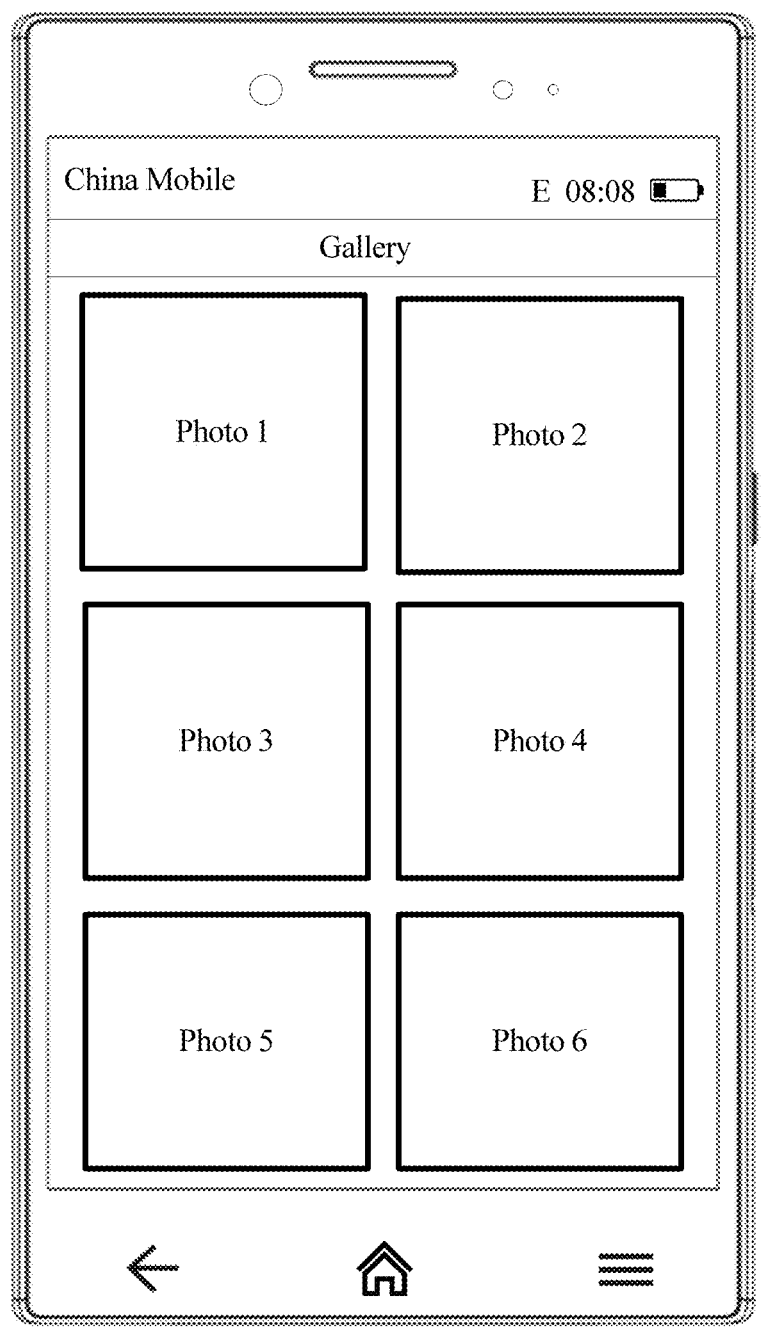
FIG. 13A to FIG. 13D are schematic diagrams of a series of graphical user interfaces displayed in Gallery of an electronic device according to some embodiments.
Figure 13B:
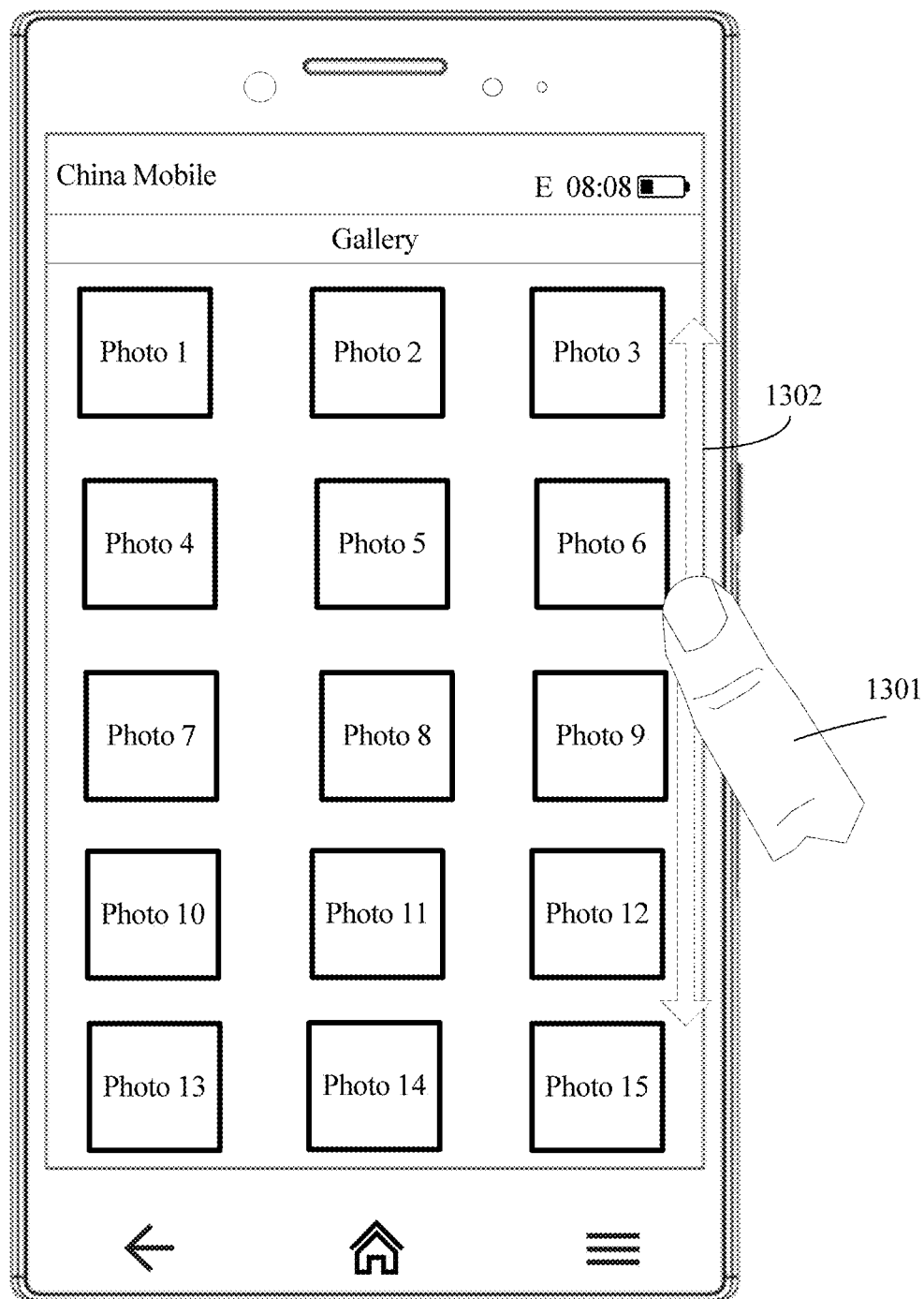
Figure 13C:
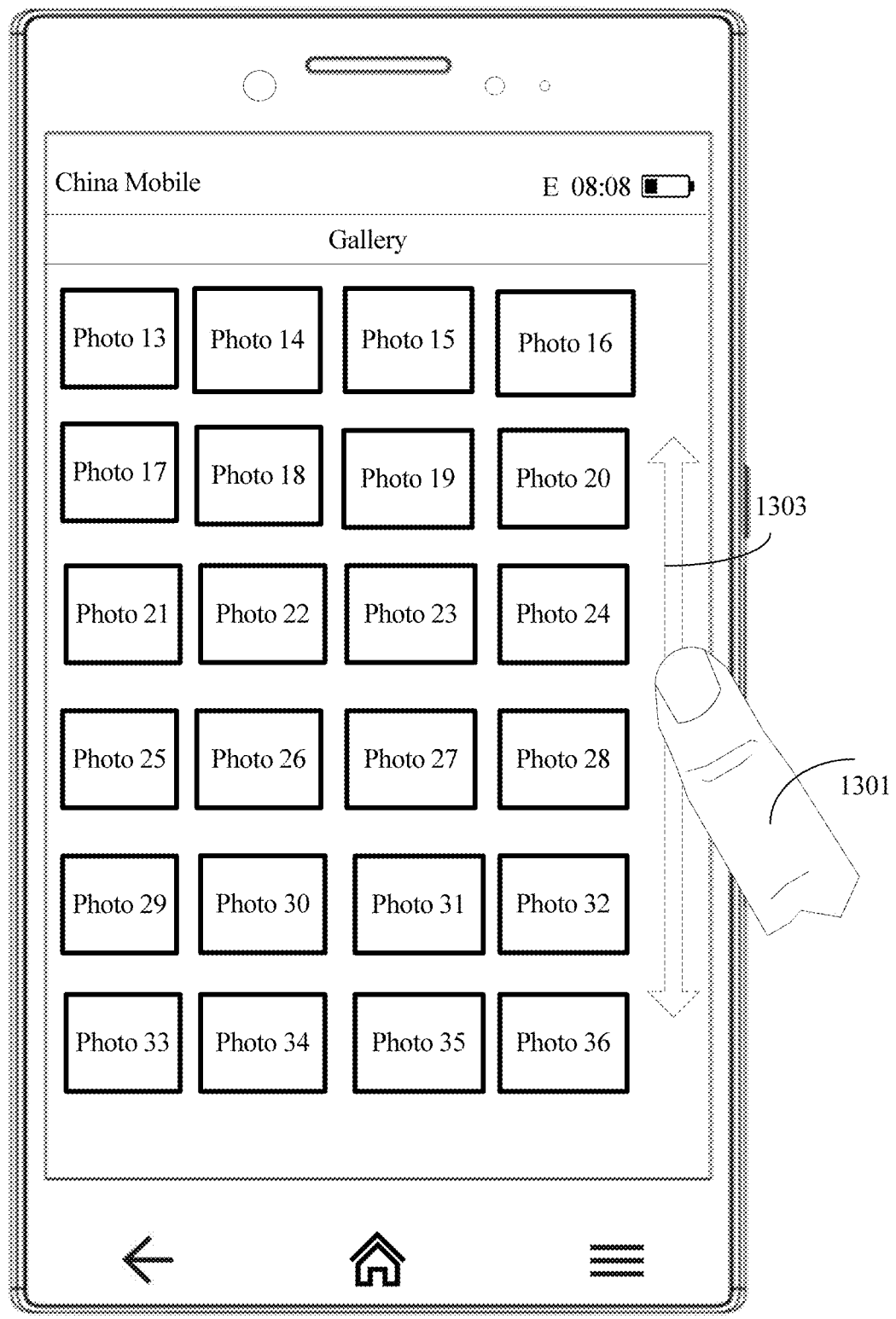
Figure 13D:
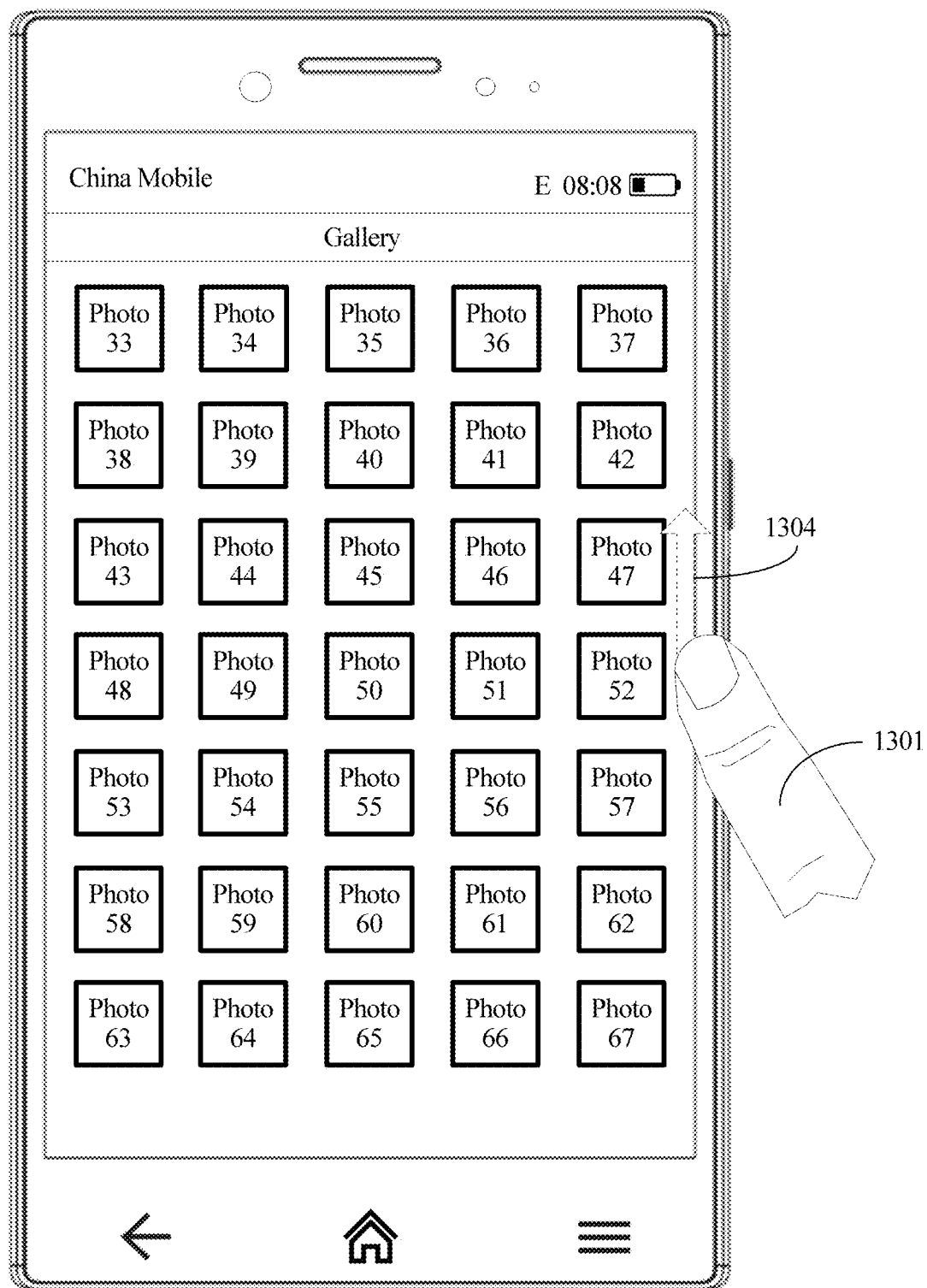

The electronic device 100 detects a touch operation of a finger of a user on the touchscreen 115, and in response to the touch operation, the electronic device 100 opens the Gallery App represented by an icon 411 in FIG. 4, as shown in FIG. 13A. In a first GUI of Gallery shown in FIG. 13A, each screen displays 2×3 photos (or images), in other words, a total of six images in three rows, where each row includes two images. The electronic device 100 detects a first gesture 1302 of the finger 1301 of the user on the touchscreen 115, and displays a second GUI shown in FIG. 13B on the touchscreen 115 in response to the first gesture 1302. The second GUI displays 3×5 photos, in other words, a total of 15 images in five rows, where each row includes three images. The electronic device 100 detects a second gesture 1303 on the touchscreen 115, and displays a third GUI shown in FIG. 13C on the touchscreen 115 in response to the second gesture 1303. The third GUI displays 4×6 photos, in other words, a total of 24 images in six rows, where each row includes four images. The electronic device 100 detects a third gesture 1304 on the touchscreen 115, and displays a fourth GUI shown in FIG. 13D on the touchscreen 115 in response to the third gesture 1304. The fourth GUI displays 5×7 photos, in other words, a total of 35 images in seven rows, where each row includes five images. In some other embodiments of this application, the user may touch a photo in the fourth GUI with the finger. In response to the touch operation, the electronic device 100 may open the photo, and may display the photo on the touchscreen in full screen.

It may be understood that a velocity of the first gesture 1302 may be less than a velocity of the second gesture 1303, and the velocity of the second gesture 1303 may be less than a velocity of the third gesture 1304. Therefore, graphical user interfaces corresponding to all gestures also have different layouts, in other words, the electronic device may dynamically display different graphical user interfaces based on different gestures (gesture velocities), so that the graphical user interface can adapt to a current user requirement, and also adapt to the display region (namely, the display) of the touchscreen.

In some other embodiments of this application, the velocity of the third gesture 1304 may be less than the velocity of the second gesture 1303. Correspondingly, the third GUI may be automatically displayed as a fifth GUI, and a quantity of photos displayed in the fifth GUI may be greater than that in the third GUI, because display is performed based on different gestures.

The foregoing embodiment merely describes examples of content of this application. It may be understood that the technical solution in the foregoing embodiment may also be applied to a graphical user interface of another application. For example, a technical solution that is the same as or similar to that in the foregoing embodiment may be used for Instant Message or Messages.

Figure 14:
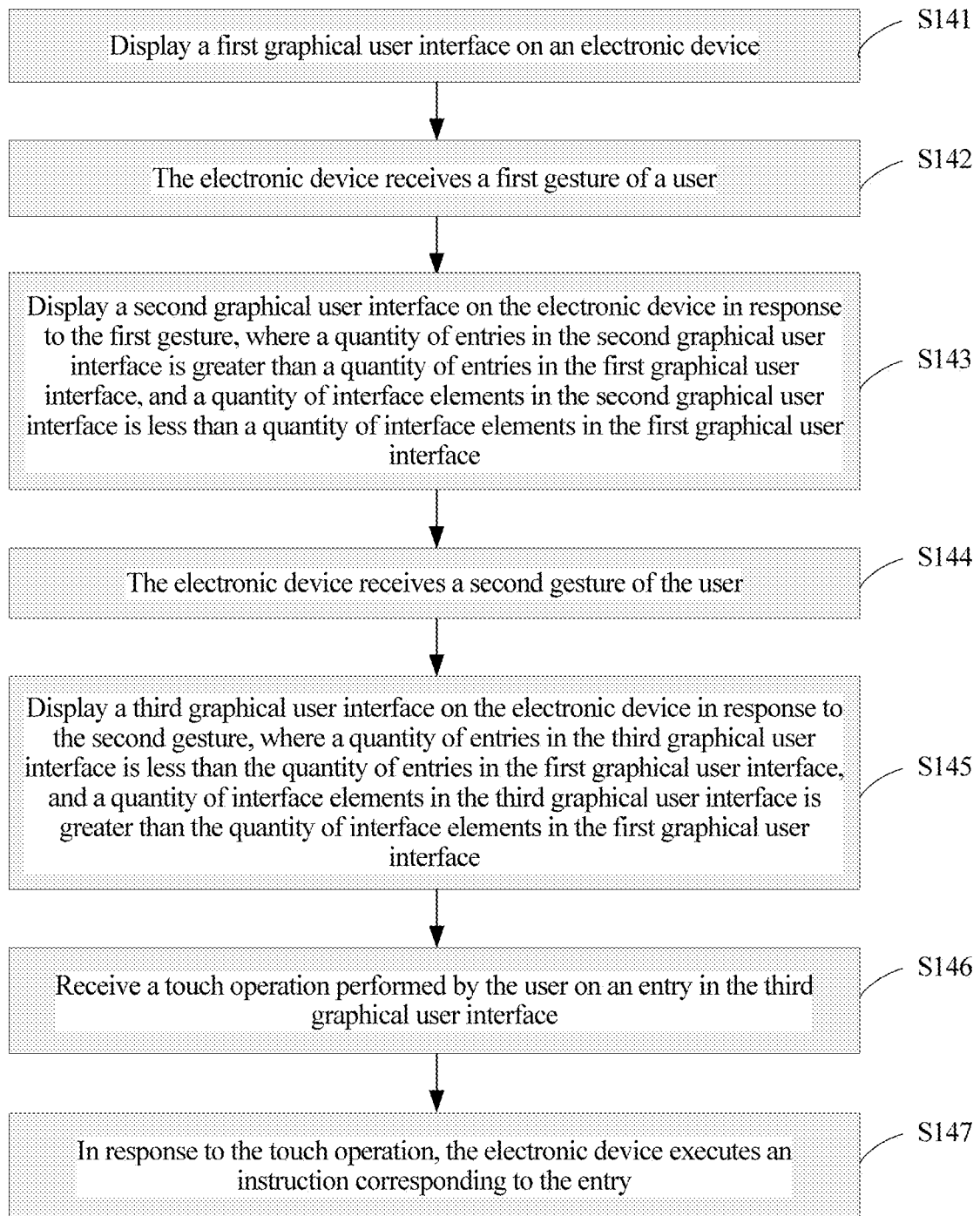
FIG. 14 is a schematic flowchart of a method according to some embodiments.

As shown in FIG. 14, an embodiment provides a method for displaying a graphical user interface based on a gesture, and the method may be implemented in the electronic device 100. The method includes the following steps.

Step S141: Display a first graphical user interface (GUI) on the electronic device.

Generally, the first GUI may be displayed on the touchscreen 115 of the electronic device 100, a plurality of entries may be displayed in the first GUI, and the plurality of entries may be considered as an entry list, in other words, the entry list includes the plurality of displayed entries. The first GUI may be an initial home page of a specific application, for example, a home page of Contacts or a home page of Email. The application may include K entries, $K_1$ entries may be displayed in the first GUI, and $M_1$ interface elements may be displayed in each entry, where K and $K_1$ are natural numbers, $K > K_1 \geq 2$, and $M_1$ is a natural number and $M_1 \geq 2$. In addition, all the entries in the first GUI may have a same display size $S_1$ on the touchscreen 115, and $S_1 > 0$.

Step S142: The electronic device receives a first gesture of a user.

As described in the foregoing embodiments, the first gesture may be a touch of a finger of the user on the touchscreen 115 (or near the touchscreen 115), and the first gesture may have a velocity (including a direction). In this embodiment, the first gesture may be a swipe gesture, a tap gesture, a drag gesture, or another type of gesture.

Step S143: Display a second graphical user interface on the electronic device in response to the first gesture.

$K_2$ entries may be displayed in the second GUI, $M_2$ interface elements may be displayed in each entry, and all the entries in the second GUI may have a same display size $S_2$ on the touchscreen 115, where $K_2$ is a natural number and $K_2 \geq 2$, $M_2$ is a natural number and $M_2 \geq 1$, and $S_2 > 0$. Compared with the first GUI, the quantity $K_2$ of entries displayed in the second GUI may be greater than the quantity $K_1$ of entries displayed in the first GUI, that is, $K_2 > K_1$. The quantity $M_2$ of interface elements displayed in each entry in the second GUI may be less than or equal to the quantity $M_1$ of interface elements displayed in each entry in the first GUI, that is, $M_2 \leq M_1$. Because $K_2 > K_1$, all the entries displayed in the second GUI have a same size $S_2$, and a size of a display region (namely, a display) of the touchscreen 115 is fixed, the size $S_2$ of each entry displayed in the second GUI is less than the size $S_1$ of each entry displayed in the first GUI, that is, $S_2 < S_1$.

The second GUI may be displayed based on the velocity of the first gesture. In some embodiments of this application, the velocity of the first gesture may be greater than or equal to a predetermined threshold, and this indicates that the user is quickly searching for a related entry. In some other embodiments of this application, the second GUI is displayed based on a type of the first gesture.

In the technical solution of displaying a graphical user interface based on a gesture, the user can quickly locate a related entry in a process of quickly searching content. Therefore, the foregoing embodiment describes a quite flexible method for displaying a graphical user interface, and a capability of intelligent interaction between the electronic device and the user is greatly improved.

In some other embodiments of this application, a plurality of entries in an application may be displayed on the touchscreen through scrolling in response to the velocity of the first gesture. A graphical user interface displayed through scrolling may have a same layout as an entry in the second GUI and an element interface in the entry at each moment. Duration of the scrolling display may be determined based on the velocity of the first gesture. A higher velocity of the first gesture indicates longer duration of the scrolling display, and on the contrary, a lower velocity of the first gesture indicates shorter duration of the scrolling display. In whatever case, the scrolling display gradually slows down until scrolling stops and a static graphical user interface is displayed. The graphical user interface may be the same as the second GUI.

In some other embodiments of this application, the method may further include the following steps:

Step S144: The electronic device receives a second gesture of the user.

Step S145: Display a third graphical user interface on the electronic device in response to the second gesture.

$K_3$ entries are displayed in the third GUI, $M_3$ interface elements are displayed in each entry, and all the entries may have a same display size $S_3$ on the touchscreen 115, where $K_3$ is a natural number and $K_3 \geq 2$, $M_3$ is a natural number and $M_3 \geq 2$, and $S_3 > 0$. The quantity $K_3$ of entries displayed in the third GUI is less than the quantity $K_1$ of entries displayed in the first GUI, that is, $K_3 < K_1$. Because $K_3 < K_1$, all the entries displayed in the third GUI have a same size $S_3$, and the size of the display region (namely, the display) of the touchscreen 115 is fixed, the size $S_3$ of each entry displayed in the third GUI is greater than the size $S_1$ of each entry displayed in the first GUI, that is, $S_3>S_1$.

In some embodiments of this application, the quantity $K_3$ of entries displayed in the third GUI may be less than the quantity $K_2$ of entries displayed in the second GUI, that is, $K_3<K_2$. Because $K_3<K_2$, all the entries displayed in the third GUI have a same size $S_3$, and the size of the display region (namely, the display) of the touchscreen 115 is fixed, the size $S_3$ of each entry displayed in the third GUI is less than the size $S_2$ of each entry displayed in the second GUI, that is, $S_3>S_2$.

In some embodiments of this application, the quantity $M_3$ of interface elements displayed in the third GUI may be greater than or equal to the quantity $M_1$ of interface elements displayed in the first GUI, that is $M_3 \geq M_1$. In some other embodiments of this application, the quantity $M_3$ of interface elements displayed in the third GUI may be greater than or equal to the quantity $M_2$ of interface elements displayed in the second GUI, that is, $M_3 \geq M_2$.

The third GUI may be displayed based on a velocity of the second gesture. The velocity of the second gesture is less than the velocity of the first gesture, and this indicates that the user is slowly searching for a related entry. In some other embodiments, the velocity of the second gesture may be less than the predetermined threshold. Therefore, fewer entries than those in the first GUI and the second GUI may be displayed in the third GUI.

In some other embodiments of this application, after step S145, the method may further include the following steps.

Step S146: Receive a touch operation performed by the user on an entry in the third graphical user interface.

For example, the touch operation may be tapping, by the finger of the user when the user finds content (for example, an entry) for which the user needs to search the third GUI, a location corresponding to the content on the touchscreen 115. For another example, the touch operation may be an operation of tapping, by the finger of the user, an interface element in an entry in the third graphical user interface.

Step S147: In response to the touch operation, the electronic device executes an instruction corresponding to the entry.

For example, if the touch operation is performed on an entry in the third GUI, in response to the touch operation, the electronic device may open the entry, and display a graphical user interface of the entry on the touchscreen. In some embodiments, the graphical user interface of the entry may be superimposed on the third GUI for display. To be specific, a part of the third GUI is covered (or blocked) by the graphical user interface of the entry and cannot be displayed, and another region that is of the third GUI and that is not covered (or blocked) by the graphical user interface of the entry is still displayed on the touchscreen. In some other embodiments, the graphical user interface of the entry may be displayed in the entire display region (namely, the display) of the touchscreen 115, and therefore the third GUI is not displayed because the third GUI is all covered (or blocked) by the graphical user interface of the entry. For another example, if the touch operation is performed on an interface element (for example, one-touch easy dialing) in an entry, the electronic device executes an instruction corresponding to the interface element, for example, makes a call.

In the foregoing embodiments of this application, the first GUI, the second GUI, and the third GUI may be different graphical user interface of one application (or widget or system program or a setting interface or the like) in different cases. The application may be one of the following applications: Contacts, Gallery, Calendar, Messages, File Manager, Email, App Store, and the like. The widget (Widget) may be one of the following widgets: an email widget, a contact widget, a short message service message widget, a weather widget, and the like.

In the foregoing embodiments of this application, the interface element may be at least one of the following elements: a control, a link, an icon, a button, a text box, a menu, and the like. It may be understood that the interface element in this application may be any visible element that can be displayed on the touchscreen 115. Therefore, the interface element may include but is not limited to the elements listed above.

In the foregoing embodiments of this application, a plurality of entries displayed in the first GUI, the second GUI, and the third GUI may be entries of a same type. For example, the entry may be one of the following entries: a Contacts entry, an Email entry, an Instant Message entry, a Recent Calls entry, a Folder entry, a Settings entry, an App Store entry, and the like. An entry list includes a plurality of entries displayed on the touchscreen 115. For example, the entry list may be one of the following lists: a Contacts list, an Email list, an Instant Message list, a Recent Calls list, a Folder list, a Settings list, an application list in App Store, and the like.

In some other embodiments of this application, the velocity of the first gesture may be greater than the velocity of the second gesture.

In some other embodiments of this application, the electronic device 100 may preset at least one threshold. When it is detected that a first velocity of a gesture of the user is greater than (or equal to) the predetermined threshold, a first graphical user interface is displayed on the touchscreen to adapt to the first velocity of the current gesture. In the first graphical user interface, a display size of each entry may be displayed based on the first velocity of the gesture. If the first velocity of the gesture is higher, the display size of each entry may be smaller, so that more entries can be displayed on the touchscreen, and the user can perform a quick search. When it is detected that a second velocity of a gesture of the user is less than the predetermined threshold, a second graphical user interface is displayed on the touchscreen to adapt to the second velocity of the current gesture. In the second graphical user interface, a display size of each entry may be displayed based on the second velocity of the gesture. If the second velocity of the gesture is lower, the display size of each entry may be larger, so that fewer entries can be displayed on the touchscreen, and the user can perform a careful search.

In the foregoing embodiments of this application, the finger of the user may first slide slowly on the touchscreen, and then slide quickly. In addition, to help the user search for an entry, the electronic device 100 may preset a correspondence between velocities and graphical user interfaces of different layouts. Therefore, related graphical user interfaces in the foregoing embodiments may also be displayed as different graphical user interfaces based on gestures with different velocities.

In some other embodiments of this application, a quantity of interface elements displayed in each entry may not depend on a velocity of a gesture, in other words, a quantity of interface elements in each entry in a graphical user interface may be unchanged regardless of the velocity of the gesture.

In some other embodiments, a quantity of interface elements displayed in each entry may be changed based on a velocity of a gesture. For example, a higher first velocity of the gesture (greater than or equal to the predetermined threshold) indicates a smaller quantity of interface elements displayed in each entry, and a lower second velocity of the gesture (less than the predetermined threshold) indicates a larger quantity of interface elements displayed in each entry.

It should be noted that, in the foregoing embodiments of this application, the first gesture, the second gesture, and the third gesture may be gestures, with different velocities, of moving quickly or slowly by the finger of the user when the finger of the user does not leave a touch-sensitive surface of the touchscreen. In this case, the first gesture may mean moving quickly at a first velocity when the finger does not leave the touch-sensitive surface of the touchscreen, the second gesture may mean moving slowly at a second velocity when the finger does not leave the touch-sensitive surface of the touchscreen, and the third velocity may mean moving slowly at a third velocity when the finger does not leave the touch-sensitive surface of the touchscreen. Apparently, the first velocity is greater than the second velocity, and the second velocity is greater than the third velocity.

In some other embodiments of this application, a virtual button for scrolling entries may be displayed on the touchscreen of the electronic device. In this case, the first gesture, the second gesture, and the third gesture may be gestures of touching the virtual button by the finger of the user in different touch times. For example, if a touch time is long (for example, the first gesture), it indicates that the user wants to quickly scroll entries, and the electronic device displays entries on the touchscreen through quick scrolling. In the case of quick scrolling, more entries are displayed on the touchscreen, and a display size of each entry becomes smaller. For another example, a time of touching the virtual button is short (for example, the second gesture), it indicates that the user wants to slowly scroll entries, and the electronic device displays entries on the touchscreen through slow scrolling. In the case of slow scrolling, fewer entries are displayed on the touchscreen, and a display size of each entry becomes larger. In some other embodiments of this application, the electronic device may display different graphical user interfaces on the touchscreen based on a time of touching the virtual button by the finger of the user. For example, if the time of touching the virtual button by the finger of the user is longer, it indicates that the user wants to quickly scroll (or flick through) entries, so that more entries are displayed on the touchscreen, a display size of each entry is smaller, and fewer interface elements are displayed in each entry. For another example, if the time of touching the virtual button by the finger of the user is shorter, it indicates that the user wants to slowly scroll (or flick through) entries, so that fewer entries are displayed on the touchscreen, a display size of each entry is larger, and more interface elements are displayed in each entry.

In some other embodiments of this application, a virtual button for scrolling entries may be displayed on the touchscreen of the electronic device. In this case, the first gesture, the second gesture, and the third gesture may be gestures of touching the virtual button by the finger of the user with different pressure applied to the touchscreen. For example, if pressure that the gesture applies to the touchscreen is greater than a predetermined threshold (for example, the first gesture), it indicates that the user wants to quickly scroll entries, and the electronic device displays entries on the touchscreen through quick scrolling. In the case of quick scrolling, more entries are displayed on the touchscreen, a display size of each entry becomes smaller, and fewer interface elements are displayed in each entry. For another example, if pressure that the gesture applies to the touchscreen is less than the predetermined threshold (for example, the second gesture), it indicates that the user wants to slowly scroll entries, and the electronic device displays entries on the touchscreen through slow scrolling. In the case of slow scrolling, fewer entries are displayed on the touchscreen, a display size of each entry becomes larger, and more interface elements are displayed in each entry.

In some other embodiments of this application, the first gesture, the second gesture, the third gesture, and the like may be gestures of different types. For example, the first gesture may be a flick gesture, to be specific, the finger of the user taps the touch-sensitive surface of the touchscreen, quickly slides, and then quickly leaves the touch-sensitive surface, for example, the finger scrolls the touchscreen up and down. The second gesture may be a drag gesture, to be specific, the finger of the user taps the touch-sensitive surface, and moves slowly without leaving the touch-sensitive surface. In this implementation, the graphical user interfaces of the application are displayed based on gestures of different types. For example, the second GUI in the foregoing embodiment is displayed on the touchscreen in response to the first gesture (for example, a flick gesture), and the third GUI in the foregoing embodiment is displayed on the touchscreen in response to the second gesture (for example, a drag gesture).

In some other embodiments of this application, the user may preset, by using a related graphical user interface, that different GUI effects are displayed on the touchscreen for one application in the case of different velocities (for example, a high velocity and a low velocity), or may preset that different GUI effects are displayed on the touchscreen for different applications in the case of different velocities.

In some other embodiments of this application, the electronic device may dynamically display different graphical user interfaces based on a slide distance of the gesture of the user on the touchscreen. For example, the electronic device receives the first gesture of the user, then determines a slide distance of the first gesture on the touchscreen, and determines a layout of a to-be-displayed graphical user interface based on the slide distance. For example, if the slide distance is 6 cm, 18 entries may be displayed in the graphical user interface, and fewer interface elements are displayed in each entry. For another example, if the slide distance is 3 cm, nine entries may be displayed in the graphical user interface, and more interface elements are displayed in each entry. In some other embodiments of this application, the electronic device may dynamically display different graphical user interfaces based on a slide distance and a velocity of the gesture of the user on the touchscreen.

In some embodiments of this application, an electronic device is disclosed. The electronic device may include: a touchscreen including a touch-sensitive surface and a display; one or more processors; a memory; a plurality of applications; and one or more programs. The one or more programs are stored in the memory and are configured to be executed by the one or more processors, the one or more programs include an instruction, and the instruction may be used to perform the steps in the foregoing embodiment.

Figure 15:
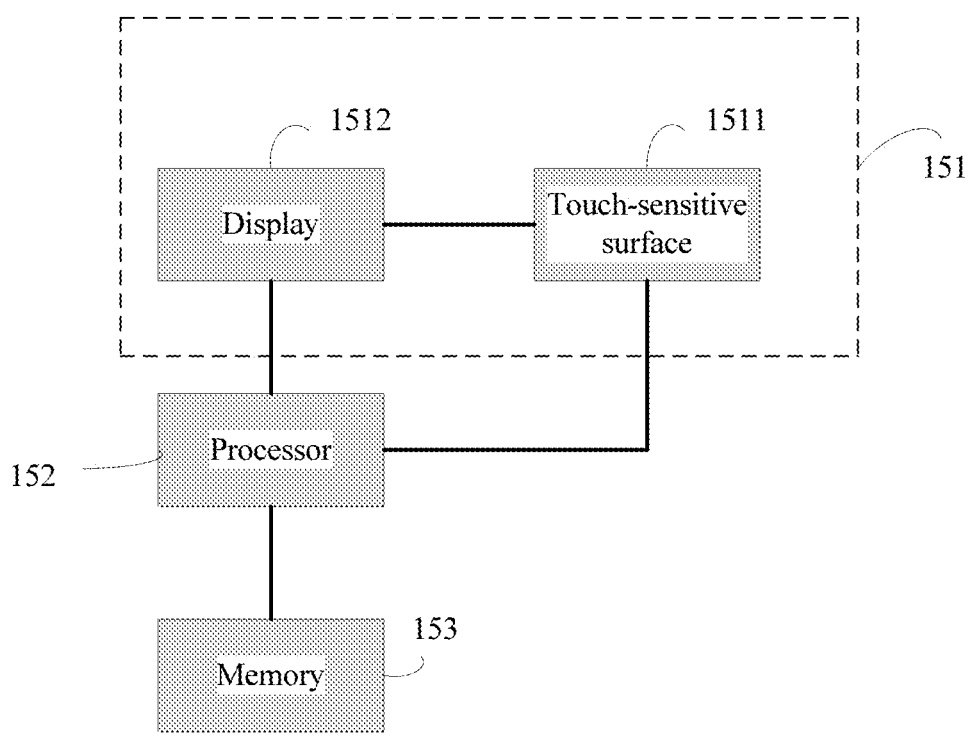
FIG. 15 is a schematic structural diagram of hardware of an electronic device according to some embodiments.

As shown in FIG. 15, in some other embodiments of this application, an electronic device 200 is disclosed. The electronic device 200 may include a touchscreen 151, a processor 152, a memory 153, and the like. The touchscreen 151 may specifically include a touch-sensitive surface 1511 and a display 1512. The touch-sensitive surface 1511 is configured to receive a touch (or approach) operation of a finger of a user, the display 1512 is configured to display some graphical user interfaces, other data, and the like stored in the memory 153, and the processor 152 is configured to: process the touch operation of the user, and determine a graphical user interface that is to be displayed on the display 1512. It may be understood that hardware in this embodiment may have a function that is the same as or similar to that of related hardware in the foregoing embodiment. Therefore, the hardware is not specifically described in this embodiment. The electronic device 200 provided in this embodiment may perform the technical solutions in the foregoing embodiments.

It should be noted that a person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may include a magnetic disk, an optical disc, a read-only memory, a random access memory, or the like.

For a purpose of explanation, the foregoing description is described with reference to a specific embodiment. However, the foregoing example discussion is not intended to be detailed, and is not intended to limit this application to a disclosed precise form. According to the foregoing teaching content, many modification forms and variation forms are possible. Embodiments are selected and described to fully illustrate the principles of this application and practical application of the principles, so that other persons skilled in the art can make full use of this application and various embodiments that have various modifications applicable to conceived specific usage.

The invention claimed is:

1. An electronic device, comprising:
a touchscreen comprising:
  a touch-sensitive surface; and
  a display;
a processor coupled to the touchscreen;
a memory coupled to the processor and configured to store instructions, which, when executed by the processor, cause the processor to be configured to:
  display a first graphical user interface (GUI) of an application on the touchscreen, wherein the first GUI comprises $K_1$ entries, wherein each of the $K_1$ entries comprises $M_1$ interface elements, wherein $K_1$ is a natural number and $K_1 \geq 2$, and wherein $M_1$ is a natural number and $M_1 \geq 2$;
  receive a first gesture of a user on the touchscreen; and
  display a second GUI of the application on the touchscreen in response to the first gesture,
  wherein the second GUI comprises $K_2$ entries,
  wherein each of the $K_2$ entries comprises $M_2$ interface elements,
  wherein $K_2$ is a natural number and $K_2 \geq 2$,
  wherein $M_2$ is a natural number and $M_2 \geq 1$, and
  wherein $K_2 > K_1$ and $M_2 \leq M_1$.

2. The electronic device of claim 1, wherein the instructions further cause the processor to be configured to:
receive a second gesture of the user on the touchscreen; and
display a third GUI of the application on the touchscreen in response to the second gesture, wherein the third GUI comprises $K_3$ entries, wherein each of the $K_3$ entries comprises $M_3$ interface elements, wherein $K_2$ is a natural number and $K_3 \geq 2$, wherein $M_3$ is a natural number and $M_3 \geq 2$, and wherein either $K_3 < K_2$ and $M_3 \geq M_2$, or $K_3 < K_1$ and $M_3 \geq M_1$.

3. The electronic device of claim 2, wherein the $K_1$ entries have a same display size $S_1$, and wherein $S_1 > 0$.

4. The electronic device of claim 3, wherein the $K_2$ entries have a same display size $S_2$, wherein $S_2 > 0$, and wherein $S_2 < S_1$.

5. The electronic device of claim 4, wherein the $K_3$ entries have a same display size $S_3$, wherein $S_3 > 0$, and wherein $S_3 > S_1$ or $S_3 > S_2$.

6. The electronic device of claim 1, wherein each of the $K_1$ entries or the $K_2$ entries comprises a contact entry, an electronic message entry, an instant message entry, a recent calls entry, a folder entry, a setting entry, or an application store entry.

7. The electronic device of claim 1, wherein a first velocity of the first gesture is greater than a second velocity of the second gesture.

8. The electronic device of claim 1, wherein the first gesture is different from the second gesture.

9. The electronic device of claim 1, wherein the application comprises at least one of a contact application, a gallery application, a calendar application, a messaging application, a file manager application, an electronic messaging application, or an application store application.

10. A method implemented by an electronic device to display a graphical user interface (GUI) based on a gesture, wherein the method comprises:
displaying a first GUI of an application on a touchscreen of the electronic device, wherein the first GUI comprises $K_1$ entries, wherein each of the $K_1$ entries comprises $M_1$ interface elements, wherein $K_1$ is a natural number and $K_1 \geq 2$, and wherein $M_1$ is a natural number and $M_1 \geq 2$;
receiving a first gesture of a user on the touchscreen; and
displaying a second GUI of the application on the touchscreen in response to receiving the first gesture,
wherein the second GUI comprises $K_2$ entries,
wherein each of the $K_2$ entries comprises $M_2$ interface elements,
wherein $K_2$ is a natural number and $K_2 \geq 2$,
wherein $M_2$ is a natural number and $M_2 \geq 1$, and
wherein $K_2 > K_1$ and $M_2 \leq M_1$.

11. The method of claim 10, further comprising:
receiving, by the electronic device, a second gesture of the user on the touchscreen; and
displaying a third GUI of the application on the touchscreen in response to receiving the second gesture, wherein the third GUI comprises $K_3$ entries, wherein each of the $K_3$ entries comprises $M_3$ interface elements, wherein $K_3$ is a natural number and $K_3 \geq 2$, wherein $M_3$ is a natural number and $M_3 \geq 2$, and wherein either $K_3 < K_2$ and $M_3 \geq M_2$ or $K_3 < K_1$ and $M_3 \geq M_1$.

12. The method of claim 11, wherein the $K_1$ entries have a same display size $S_1$, and wherein $S_1 > 0$.

13. The method of claim 12, wherein the $K_2$ entries have a same display size $S_2$, wherein $S_2 > 0$, and wherein $S_2 < S_1$.

14. The method of claim 13, wherein the $K_3$ entries have a same display size $S_3$, wherein $S_3 > 0$, and wherein $S_3 > S_1$ or $S_3 > S_2$.

15. The method of claim 11, wherein a first velocity of the first gesture is greater than a second velocity of the second gesture.

16. The method of claim 15, wherein the first velocity is greater than a predetermined threshold, and wherein the second velocity is less than the predetermined threshold.

17. The method of claim 11, wherein the first gesture is different from the second gesture.

18. The method of claim 10, wherein each of the $K_1$ entries or the $K_2$ entries comprises a contact entry, an electronic message entry, an instant message entry, a recent calls entry, a folder entry, a setting entry, or an application store entry.

19. The method of claim 10, wherein the $M_1$ interface elements or the $M_2$ interface elements comprises a control, a link, an icon, a button, a text box, or a menu.

20. The method of claim 10, wherein the application comprises at least one of a contact application, a gallery application, a calendar application, a messaging application, a file manager application, an electronic messaging application, or an application store application.

* * * * *